United States Patent
Kuwahara et al.

(10) Patent No.: US 8,409,056 B2
(45) Date of Patent: Apr. 2, 2013

(54) VEHICLE DRIVING FORCE CONTROL DEVICE

(75) Inventors: Seiji Kuwahara, Toyota (JP); Hideaki Otsubo, Nishikamo-gun (JP); Masato Kaigawa, Toyota (JP); Shogo Matsumoto, Toyota (JP); Masayuki Baba, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 418 days.

(21) Appl. No.: 12/452,094

(22) PCT Filed: Nov. 6, 2008

(86) PCT No.: PCT/IB2008/002976
§ 371 (c)(1),
(2), (4) Date: Dec. 15, 2009

(87) PCT Pub. No.: WO2009/060293
PCT Pub. Date: May 14, 2009

(65) Prior Publication Data
US 2010/0197457 A1    Aug. 5, 2010

(30) Foreign Application Priority Data
Nov. 9, 2007  (JP) ................................ 2007-292630

(51) Int. Cl.
*B60W 10/04* (2006.01)
*B60W 10/10* (2006.01)
(52) U.S. Cl. ...................................... 477/110; 477/180
(58) Field of Classification Search .................. 477/107, 477/109–111, 180, 181
See application file for complete search history.

(56) References Cited

U.S. PATENT DOCUMENTS

| | | | |
|---|---|---|---|
| 4,515,040 A * | 5/1985 | Takeuchi et al. | 477/43 |
| 5,879,266 A | 3/1999 | Sawamura et al. | |
| 6,371,884 B1 | 4/2002 | Channing | |
| 2001/0051847 A1 | 12/2001 | Murakami | |
| 2002/0035010 A1* | 3/2002 | Kobayashi | 477/54 |
| 2005/0001480 A1 | 1/2005 | Tabata et al. | |
| 2009/0227409 A1* | 9/2009 | Ito et al. | 475/5 |

FOREIGN PATENT DOCUMENTS

| JP | B2 2929396 | 8/1999 |
|---|---|---|
| JP | A 2005-016439 | 1/2005 |

OTHER PUBLICATIONS

Office Action issued in corresponding German Patent Application No. 11 2008 003 259.9-51, issued Sep. 14, 2010. (with English-language translation).
English-language Translation and Japanese Office Action issued in corresponding Japanese Application No. 2007-292630 on Nov. 6, 2009.
International Search Report issued in International Application No. PCT/IB2008/002976, mailed Aug. 4, 2008.
Written Opinion of ISA issued in International Application No. PCT/IB2008/002976, mailed Aug. 4, 2008.

* cited by examiner

*Primary Examiner* — Justin Holmes
(74) *Attorney, Agent, or Firm* — Oliff & Berridge, PLC

(57) ABSTRACT

A shift output torque control unit executes a shift output torque control to control an engine torque so as to reduce a driving force difference, which is a variation width of a driving force due to downshift of an automatic transmission. Thus, in comparison with the case in which the shift output torque control is not executed, it is possible to smooth a variation in driving force associated with the downshift. As a result, occupants' comfort and controllability to driving operation may be improved.

15 Claims, 28 Drawing Sheets

FIG.2

| | C1 | C2 | C3 | C4 | B1 | B2 | F1 |
|---|---|---|---|---|---|---|---|
| P | | | | | | | |
| Rev1 | | | ○ | | | ○ | |
| Rev2 | | | | ○ | | ○ | |
| N | | | | | | | |
| 1st | ○ | | | | | (○) | ○ |
| 2nd | ○ | | | | ○ | | |
| 3rd | ○ | | ○ | | | | |
| 4th | ○ | | | ○ | | | |
| 5th | ○ | ○ | | | | | |
| 6th | | ○ | | ○ | | | |
| 7th | | ○ | ○ | | | | |
| 8th | | ○ | | | ○ | | |

○ ENGAGED

VEHICLE DRIVING FORCE CONTROL DEVICE

BACKGROUND OF THE INVENTION

1. Field of the Invention

The present invention relates to a vehicle driving force control device that improves occupants' comfort in a vehicle provided with an engine and an automatic transmission having fixed gears ratios.

2. Description of the Related Art

In a vehicle provided with an engine and an automatic transmission having fixed gear ratios, when a throttle valve and an acceleration pedal, which adjust output of the engine, are connected mechanically through a wire, or the like, an accelerator operation amount, which is an amount by which the acceleration pedal is depressed, is in one-to-one correspondence with an opening degree of the throttle valve (throttle valve opening degree). The above one-to-one correspondence basically also applies to an electronic throttle valve in which the throttle valve is electrically interlocked with the accelerator pedal. However, in a vehicle having the electronic throttle valve, some vehicle driving force control devices temporarily execute electronic throttle control that does not follow a throttle valve reference characteristic, which is a predetermined relationship between an accelerator operation amount and a throttle opening degree. For example, Japanese Patent No. 2929396 describes one of the above described vehicle driving force control devices. In this vehicle driving force control device, in order to avoid frequent gear shift in an automatic transmission having fixed gear ratios, when a necessary driving force that will be obtained through gear shift according to a predetermined shift pattern (shift line map) can be output by adjusting the throttle valve opening degree without that gear shift, the gear shift is not performed and the throttle valve opening degree is adjusted to obtain the necessary driving force irrespective of the throttle valve reference characteristic.

However, the vehicle driving force control device of Japanese Patent No. 2929396 executes adjustment of the throttle valve opening degree in order to avoid frequent gear shift in the automatic transmission having fixed gear ratios, that is, in order to avoid gear shift. Thus, when shift control is actually executed, the shift control is executed as usual. Thus, in the vehicle driving force control device of the Japanese Patent No. 2929396, when the shift control of the automatic transmission is executed, the driving force inevitably varies in a stepped manner.

SUMMARY OF THE INVENTION

The invention provides a vehicle driving force control device that smoothes a variation in driving force in a vehicle provided with an engine and an automatic transmission having fixed gear ratios.

An aspect of the invention provides a vehicle driving force control device for a vehicle that includes an engine that is varied in output torque by an electronic throttle valve, of which opening and closing are electrically controllable, and an automatic transmission having fixed gear ratios, wherein shift output torque control is executed to control the output torque of the engine so as to reduce a driving force difference, which is a variation width of a driving force due to gear shift of the automatic transmission.

According to the above vehicle driving force control device, because the shift output torque control is executed to control the output torque of the engine so as to reduce a driving force difference due to gear shift of the automatic transmission, in comparison with the case in which the shift output torque control is not executed, it is possible to smooth a variation in driving force associated with the gear shift. As a result, occupants' comfort may be improved.

In addition, the shift output torque control may be executed before gear shift of the automatic transmission, and when it is determined that the driving force difference due to the gear shift is larger than or equal to a predetermined driving force difference determination value, the shift output torque control may be executed again after the gear shift so as to reduce the driving force difference.

According to the above vehicle driving force control device, the shift output torque control is executed before gear shift of the automatic transmission, and when it is determined that the driving force difference due to the gear shift is larger than or equal to a predetermined driving force difference determination value, the shift output torque control is executed again after the gear shift so as to reduce the driving force difference. Thus, in comparison with the case in which the shift output torque control is executed only either before or after gear shift of the automatic transmission, it is possible to further reduce the driving force difference.

Moreover, where a gear to which the automatic transmission is actually shifted is an nth gear, when a downshift point that indicates an accelerator operation amount at which the automatic transmission downshifts from an (n+1)th gear to the nth gear is compared with an upshift point that indicates an accelerator operation amount at which the automatic transmission upshifts from an (n−1)th gear to the nth gear, and when the upshift point is smaller in accelerator operation amount than the downshift point, the shift output torque control at the nth gear may be initiated from the downshift point.

According to the above vehicle driving force control device, where a gear to which the automatic transmission is actually shifted is an nth gear, when a downshift point that indicates an accelerator operation amount at which the automatic transmission downshifts from an (n+1)th gear to the nth gear is compared with an upshift point that indicates an accelerator operation amount at which the automatic transmission upshifts from an (n−1)th gear to the nth gear, and when the upshift point is smaller in accelerator operation amount than the downshift point, the shift output torque control at the nth gear is initiated from the downshift point. Thus, by preventing the shift output torque control at the nth gear from influencing the upshift from the (n−1)th gear to the nth gear, it is possible to smooth a variation in driving force due to the downshift.

Furthermore, where a gear to which the automatic transmission is actually shifted is an n nth gear, when a downshift point that indicates an accelerator operation amount at which the automatic transmission downshifts from an (n+1)th gear to the nth gear is compared with an upshift point that indicates an accelerator operation amount at which the automatic transmission upshifts from an (n−1)th gear to the nth gear, and when the upshift point is larger in accelerator operation amount than the downshift point, the shift output torque control at the nth gear may be initiated from the upshift point.

According to the above vehicle driving force control device, where a gear to which the automatic transmission is actually shifted is an nth gear, when a downshift point that indicates an accelerator operation amount at which the automatic transmission downshifts from an (n+1)th gear to the nth gear is compared with an upshift point that indicates an accelerator operation amount at which the automatic transmission upshifts from an (n−1)th gear to the nth gear, and when the upshift point is larger in accelerator operation amount than the downshift point, the shift output torque control at the nth gear is initiated from the upshift point. Thus, it is possible to avoid an influence of the shift output torque control at the nth gear on the upshift from the (n−1)th gear to the nth gear.

In addition, where a gear to which the automatic transmission is actually shifted is an nth gear, when the automatic transmission downshifts from the nth gear to an (n−2)th gear, the shift output torque control may be initiated from a downshift point that indicates an accelerator operation amount at which the automatic transmission downshifts from the nth gear to an (n−1)th gear.

According to the above vehicle driving force control device, where a gear to which the automatic transmission is actually shifted is an nth gear, when the automatic transmission downshifts from the nth gear to an (n−2)th gear, the shift output torque control may be initiated from the downshift point that indicates an accelerator operation amount at which the automatic transmission downshifts from the nth gear to an (n−1)th gear. Thus, for multiple downshift, such as downshift from the nth gear to the (n−2)th gear, as well, it is possible to smooth a variation in driving force due to the multiple downshift by executing the shift output torque control.

Moreover, where a gear to which the automatic transmission is actually shifted is an nth gear, in the shift output torque control that is executed, after the automatic transmission downshifts from an (n+1)th gear to the nth gear, to reduce the driving force difference due to the downshift, a driving force at the nth gear, at which the automatic transmission upshifts from the nth gear to the (n+1)th gear, may be set for a lower limit of the driving force in the shift output torque control.

According to the above vehicle driving force control device, where a gear to which the automatic transmission is actually shifted is an nth gear, in the shift output torque control that is executed, after the automatic transmission downshifts from an (n+1)th gear to the nth gear, to reduce the driving force difference due to the downshift, a driving force at the nth gear, at which the automatic transmission upshifts from the nth gear to the (n+1)th gear, is set for a lower limit of the driving force in the shift output torque control. Even when an accelerator operation amount decreases during the shift output torque control, by preventing the shift output torque control executed at the nth gear after the downshift from influencing the upshift from the nth gear to the (n+1)th gear, it is possible to achieve the upshift according to driver's intention.

Furthermore, when the accelerator pedal is returned to reduce the accelerator operation amount during the shift output torque control that is executed, after the automatic transmission downshifts, to reduce the driving force difference due to the downshift, a driving force at the time when the accelerator pedal is returned may be set for an upper limit of the driving force in the shift output torque control.

According to the above vehicle driving force control device, when the accelerator pedal is returned to reduce the accelerator operation amount during the shift output torque control that is executed, after the automatic transmission downshifts, to reduce the driving force difference due to the downshift, a driving force at the time when the accelerator pedal is returned is set for an upper limit of the driving force in the shift output torque control. Thus, when the accelerator pedal is returned, it is possible to avoid a variation in driving force against driver's intention, that is, an increase in the driving force despite the accelerator pedal being returned.

In addition, the driving force control device may further include an accelerator depression speed detector that detects an accelerator depression speed which is a rate of change at which the accelerator pedal is depressed, wherein a downshift point that indicates an accelerator operation amount at which the automatic transmission downshifts may be changed on the basis of the detected accelerator depression speed.

According to the above vehicle driving force control device, a downshift point that indicates an accelerator operation amount at which the automatic transmission downshifts is changed on the basis of the detected accelerator depression speed. Thus, it is possible to early obtain a driving force requested by the driver.

Moreover, where a gear to which the automatic transmission is actually shifted is an nth gear, within a shift point variation range that has an upper limit set to an accelerator operation amount at which, when the automatic transmission downshifts from the nth gear to an (n−1)th gear, a driving force at the time when gear shift is performed at the (n−1)th gear takes a maximum driving force that can be generated at the nth gear, and that has a lower limit set to the larger one of an accelerator operation amount at which the automatic transmission upshifts from the (n−1)th gear to the nth gear or an accelerator operation amount at which the automatic transmission downshifts from the (n+1)th gear to the nth gear, the downshift point may be shifted so as to reduce the accelerator operation amount as the accelerator depression speed increases.

According to the above vehicle driving force control device, where a gear to which the automatic transmission is actually shifted is an nth gear, within a shift point variation range that has an upper limit set to an accelerator operation amount at which, when the automatic transmission downshifts from the nth gear to an (n−1)th gear, a driving force at the time when gear shift is performed at the (n−1)th gear takes a maximum driving force that can be generated at the nth gear, and that has a lower limit set to the larger one of an accelerator operation amount at which the automatic transmission upshifts from the (n−1)th gear to the nth gear or an accelerator operation amount at which the automatic transmission downshifts from the (n+1)th gear to the nth gear, the downshift point may be shifted so as to reduce the accelerator operation amount as the accelerator depression speed increases. It is possible to reduce the frequency of gear shift owing to the shift output torque control executed before downshift from the nth gear to the (n−1)th gear. Thus, it is possible to avoid an influence of shift in the downshift point on the upshift from the (n−1)th gear to the nth gear.

Furthermore, the shift output torque control may not be executed during a manual range operation in which a gear of the automatic transmission is manually fixed or a high-speed side shiftable gear of the automatic transmission is manually set.

According to the above vehicle driving force control device, the shift output torque control is not executed during a manual range operation in which a gear of the automatic transmission is manually fixed or a high-speed side shiftable gear of the automatic transmission is manually set. Thus, it is possible to provide operational feeling such that a driving force directly varies in response to driver's operation according to driver's intention.

Moreover, the shift output torque control may be executed so that, as an accelerator operation amount increases, a driving force variation gradient which is a variation in driving force is equal to or smaller than the variation in accelerator operation amount.

According to the above vehicle driving force control device, the shift output torque control is executed so that, as an accelerator operation amount increases, a driving force variation gradient which is a variation in driving force is equal to or smaller than the variation in accelerator operation amount. Thus, when the accelerator operation amount is large, that is, when the output torque of the engine is large, a variation in driving force relative to operation of the accelerator pedal is gentle and, therefore, the controllability of the vehicle may be ensured.

Furthermore, the driving force control device may further include: a torque converter that has a lock-up mechanism provided between the engine and the automatic transmission; and a lock-up determination unit that determines whether to be switched to a lock-up on state in which the lock-up mechanism is engaged or to a lock-up off state in which the lock-up mechanism is released, wherein in the lock-up on state, when the lock-up determination unit determines to be switched to the lock-up off state, lock-up switching output torque control may be executed to control an output torque of the engine so as to reduce the driving force difference due to switching from the lock-up on state of the lock-up mechanism to the lock-up off state of the lock-up mechanism.

According to the above vehicle driving force control device, in the lock-up on state, when the lock-up determination unit determines to be switched to the lock-up off state, lock-up switching output torque control is executed to control an output torque of the engine so as to reduce the driving force difference due to switching from the lock-up on state of the lock-up mechanism to the lock-up off state of the lock-up mechanism. Thus, in comparison with the case in which the lock-up switching output torque control is not executed, it is possible to smooth a variation in driving force associated with switching of the lock-up state. As a result, occupants' comfort may be improved.

In addition, in the lock-up switching output torque control, a driving force in the lock-up on state may be increased to reach a driving force in the lock-up off state at the time when switching from the lock-up on state to the lock-up off state.

According to the above vehicle driving force control device, in the lock-up switching output torque control, a driving force in the lock-up on state is increased to reach a driving force in the lock-up off state at the time when switching from the lock-up on state to the lock-up off state. Thus, it is possible to further reduce the driving force difference due to switching from the lock-up on state to the lock-up off state.

Moreover, the driving force control device may further include an accelerator depression speed detector that detects an accelerator depression speed which is a rate of change at which the accelerator pedal is depressed, wherein a lock-up off point that indicates an accelerator operation amount at which the lock-up on state is switched to the lock-up off state may be changed on the basis of the detected accelerator depression speed.

According to the above vehicle driving force control device, a lock-up off point that indicates an accelerator operation amount at which the lock-up on state is switched to the lock-up off state is changed on the basis of the detected accelerator depression speed. Thus, it is possible to early obtain a driving force requested by the driver.

Furthermore, within a lock-up off point variation range that has an upper limit set to an accelerator operation amount at which, when the lock-up on state is switched to the lock-up off state, a driving force in the lock-up off state at the time of the switching takes a maximum driving force that can be generated in the lock-up on state, and that has a lower limit set to a predetermined accelerator operation amount at which the lock-up off state is switched to the lock-up on state, the lock-up off point may be shifted so as to reduce the accelerator operation amount as the accelerator depression speed increases.

According to the above vehicle driving force control device, within a lock-up off point variation range that has an upper limit set to an accelerator operation amount at which, when the lock-up on state is switched to the lock-up off state, a driving force in the lock-up off state at the time of the switching takes a maximum driving force that can be generated in the lock-up on state, and that has a lower limit set to a predetermined accelerator operation amount at which the lock-up off state is switched to the lock-up on state, the lock-up off point is shifted so as to reduce the accelerator operation amount as the accelerator depression speed increases. Thus, it is possible to reduce the frequency of switching of the lock-up state owing to the lock-up switching output torque control that is executed before the lock-up on state is switched to the lock-up off state. Hence, it is possible to prevent shifting of the lock-up off point from influencing the switching from the lock-up off state to the lock-up on state.

In addition, the lock-up switching output torque control may adjust a throttle valve opening degree which is a degree of opening of the electronic throttle valve.

According to the above vehicle driving force control device, the lock-up switching output torque control adjusts the throttle valve opening degree. Thus, it is possible to easily vary the driving force by adjusting an output torque of the engine through the lock-up switching output torque control.

In addition, the shift output torque control may adjust a throttle valve opening degree which is a degree of opening of the electronic throttle valve.

According to the above vehicle driving force control device, the shift output torque control adjusts the throttle valve opening degree. Thus, it is possible to easily vary the driving force by adjusting an output torque of the engine through the shift output torque control.

Here, a throttle valve reference characteristic may be a predetermined relationship between the accelerator operation amount and a throttle valve opening degree in one-to-one correspondence with each other, and the shift output torque control may adjust the throttle valve opening degree irrespective of the throttle valve reference characteristic so as to reduce the driving force difference that arises when the automatic transmission shifts gear. Specifically, in the shift output torque control that is executed so as to reduce the driving force difference generated due to downshift of the automatic transmission, an actual throttle valve opening degree may be set to be larger than a throttle valve opening degree that is determined on the basis of the throttle valve reference characteristic with reference to the same accelerator operation amount. In addition, in the shift output torque control that is executed after downshift of the automatic transmission so as to reduce the driving force difference generated due to the downshift, an actual throttle valve opening degree may be set to be smaller than a throttle valve opening degree that is determined on the basis of the throttle valve reference characteristic with reference to the same accelerator operation amount.

Furthermore, the lock-up switching output torque may adjust the throttle valve opening degree irrespective of the throttle valve reference characteristic so as to reduce the driving force difference that is generated due to switching from the lock-up on state of the lock-up mechanism to the lock-up off state of the lock-up mechanism Specifically, in the lock-up switching output torque control that is executed before switching from the lock-up on state to the lock-up off state, an actual throttle valve opening degree may be set to be larger than a throttle valve opening degree that is determined on the basis of the throttle valve reference characteristic with reference to the same accelerator operation amount.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is an operation table that illustrates operation of a hydraulic frictional engagement element when a plurality of gear ratios are established in the vehicle automatic transmission shown in FIG. 1;

DETAILED DESCRIPTION OF EMBODIMENTS

Example embodiments of the present invention will be described in greater detail below with reference to the accompanying drawings.

Figure 1:
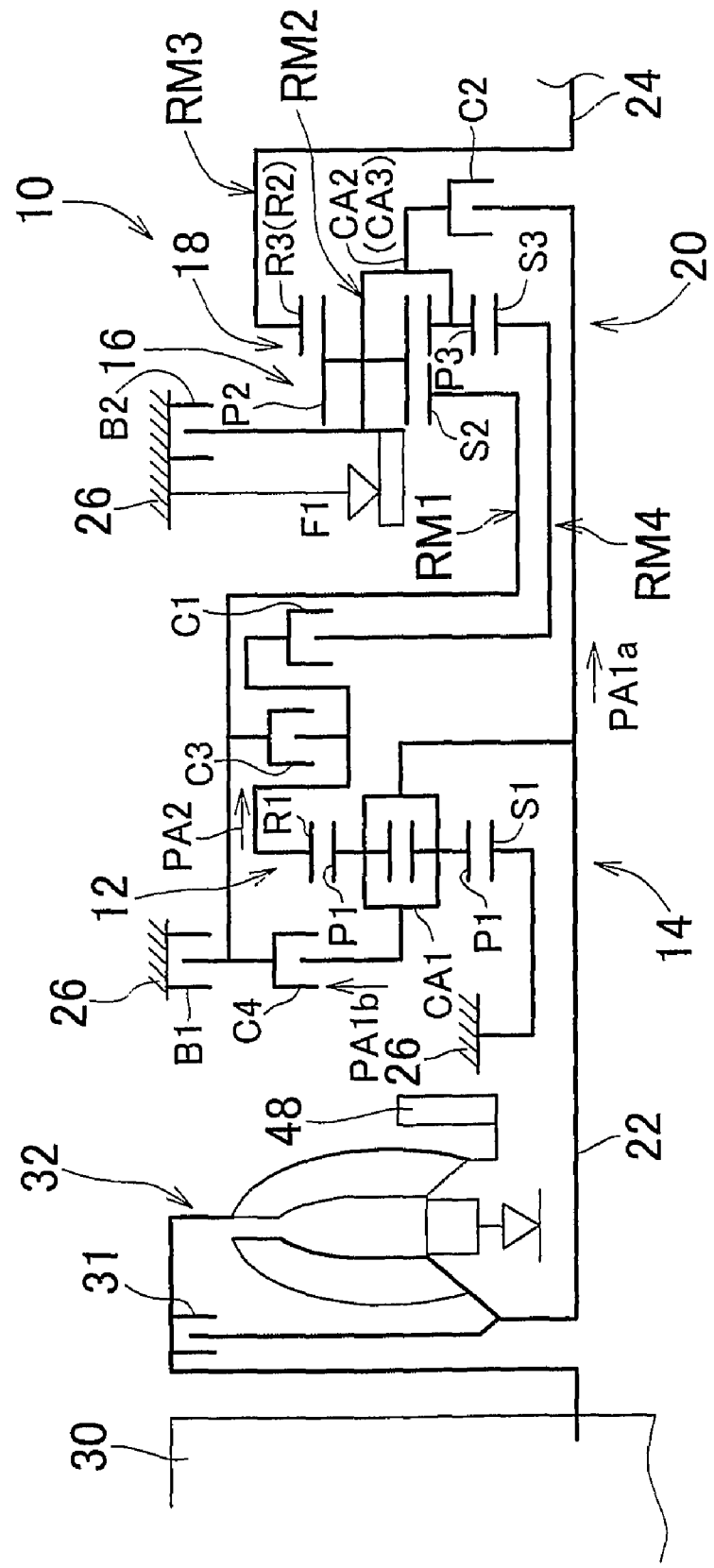
FIG. 1 is a skeleton diagram that illustrates a vehicle automatic transmission to which embodiments of the invention are applied.

A first embodiment of the invention will be described. FIG. 1 is a skeleton diagram that illustrates the structure of a vehicle automatic transmission (hereinafter, referred to as "automatic transmission") 10 according to embodiments of the invention. FIG. 2 is an operation table that illustrates operation of a hydraulic frictional engagement element (hereinafter, referred to as "engagement element") when a plurality of gear ratios are established in the automatic transmission 10. As shown in FIG. 1, a vehicle to which embodiments of the invention are applied includes an engine 30, a torque converter 32, and the automatic transmission 10 having fixed gear ratios. The torque converter 32 has a lock-up mechanism 31, which is a hydraulically controlled lock-up clutch. Then, the engine 30 is provided with an electronic throttle valve 56 (see FIG. 4), of which opening and closing are electrically controllable. An output torque $T_E$ of the engine 30 (hereinafter, referred to as "engine torque $T_E$") is adjusted using the electronic throttle valve 56. As the opening degree $\theta_{TH}$ of the electronic throttle valve 56 (hereinafter, referred to as "throttle valve opening degree $\theta_{TH}$") increases, the engine torque $T_E$ increases.

The automatic transmission 10 includes a first gear shift portion 14 and a second gear shift portion 20 that are coaxially arranged in a transmission case (hereinafter, referred to as "case") 26, which serves as a non-rotating member, secured to the vehicle body. The first gear shift portion 14 is mainly formed of a double pinion type first planetary gear set 12. The second gear shift portion 20 is mainly formed of a single pinion type second planetary gear set 16 and a double pinion type third planetary gear set 18. The automatic transmission 10 changes the speed of rotation input from an input shaft 22 thereof and outputs the rotation from an output shaft 24 thereof. The input shaft 22 corresponds to an input rotating member. In the present embodiment, the input shaft 22 is a turbine shaft of the torque converter 32, which is driven for rotation by the engine 30 that is a power source for propelling the vehicle. The output shaft 24 corresponds to an output rotating member, and, for example, drives right and left driving wheels for rotation through a differential gear (final reduction gear) (not shown) and a pair of axles. Note that the automatic transmission 10 is formed substantially symmetrically with respect to the axis thereof, and in the skeleton diagram of FIG. 1, the lower half below the axis is omitted.

The first planetary gear set 12 includes a sun gear S1, a plurality of pairs of mutually meshed pinions P1, a carrier CA1 that rotatably and revolvably supports the pinions P1, and a ring gear R1 meshed with the sun gear S1 via the pinions P1. The sun gear S1, carrier CA1 and ring gear R1 constitute three rotating elements, respectively. The carrier CA1 is coupled to the input shaft 22 and driven for rotation. The sun gear S1 is integrally fixed to the case 26 so that it is not rotatable. The ring gear R1 serves as an intermediate output member. The ring gear R1 is rotated at a lower speed than that of the input shaft 22, and transmits the rotation to the second gear shift portion 20. In the present embodiment, a first intermediate output path PA1 transmits the rotation of the input shaft 22 to the second gear shift portion 20 at the same speed and transmits the rotation at a predetermined constant gear ratio (=1.0). The first intermediate output path PA1 includes a direct path PA1a that transmits the rotation from the input shaft 22 to the second gear shift portion 20 without passing the first planetary gear set 12, and an indirect path PA1b that transmits the rotation from the input shaft 22 through the carrier CA1 of the first planetary gear set 12 to the second gear shift portion 20. In addition, a second intermediate output path PA2 transmits the rotation from the input shaft 22 through the carrier CA1, the pinions P1 arranged on the carrier CA1, and the ring gear R1 to the second gear shift portion 20 and changes (reduces) the speed of rotation of the input shaft 22 at a gear ratio (>1.0) higher than that of the first intermediate output path PA1 to transmit the rotation.

The second planetary gear set 16 includes a sun gear S2, pinions P2, a carrier CA2 that rotatably and revolvably supports the pinions P2, and a ring gear R2 meshed with the sun gear S2 via the pinions P2. The third planetary gear set 18 includes a sun gear S3, a plurality of pairs of mutually meshed pinions P2 and P3, a carrier CA3 that rotatably and revolvably supports the pinions P2 and P3, and a ring gear R3 meshed with the sun gear S3 via the pinions P2 and P3.

Portions of the second planetary gear set 16 and third planetary gear set 18 are connected to each other to constitute four rotating elements RM1 to RM4. Specifically, the sun gear S2 of the second planetary gear set 16 constitutes the first rotating element RM1. The carrier CA2 of the second planetary gear set 16 and the carrier CA 3 of the third planetary gear set 18 are integrally connected to each other to constitute the second rotating element RM2. The ring gear R2 of the second planetary gear set 16 and the ring gear R3 of the third planetary gear set 18 are integrally connected to each other to constitute the third rotating element RM3. The sun gear S3 of the third planetary gear set 18 constitutes the fourth rotating element RM4. The second planetary gear set 16 and the third planetary gear set 18 form a Ravigneaux planetary gear train in which the carriers CA2 and CA3 are formed of a common member, the ring gears R2 and R3 are formed of a common member and the pinions P2 of the second planetary gear set 16 also serve as second pinions of the third planetary gear set 18.

The first rotating element RM1 (sun gear S2) is rotated or stopped by being selectively coupled to the case 26 via a first brake B1, and is selectively coupled to the ring gear R1 of the first planetary gear set 12, which is the intermediate output member, via a third clutch C3 (that is, the second intermediate output path PA2), and, in addition, selectively coupled to the carrier CA1 of the first planetary gear set 12 (that is, the indirect path PA1b of the first intermediate output path PA1) via a fourth clutch C4. The second rotating element RM2 (carriers CA2 and CA3) are rotated or stopped by being selectively coupled to the case 26 via a second brake B2, and is selectively coupled to the input shaft 22 (that is, the direct path PA1a of the first intermediate output path PA1) via a second clutch C2. The third rotating element RM3 (ring gears R2 and R3) is integrally connected to the output shaft 24 to output rotation. The fourth rotating element RM4 (sun gear S3) is coupled to the ring gear R1 via a first clutch C1. Note that a one-way clutch F1 is provided between the second rotating element RM2 and the case 26 in parallel with the second brake B2. The one-way clutch F1 permits forward rotation (the same rotation direction as the input shaft 22) of the second rotating element RM2 and blocks reverse rotation.

Figure 3:
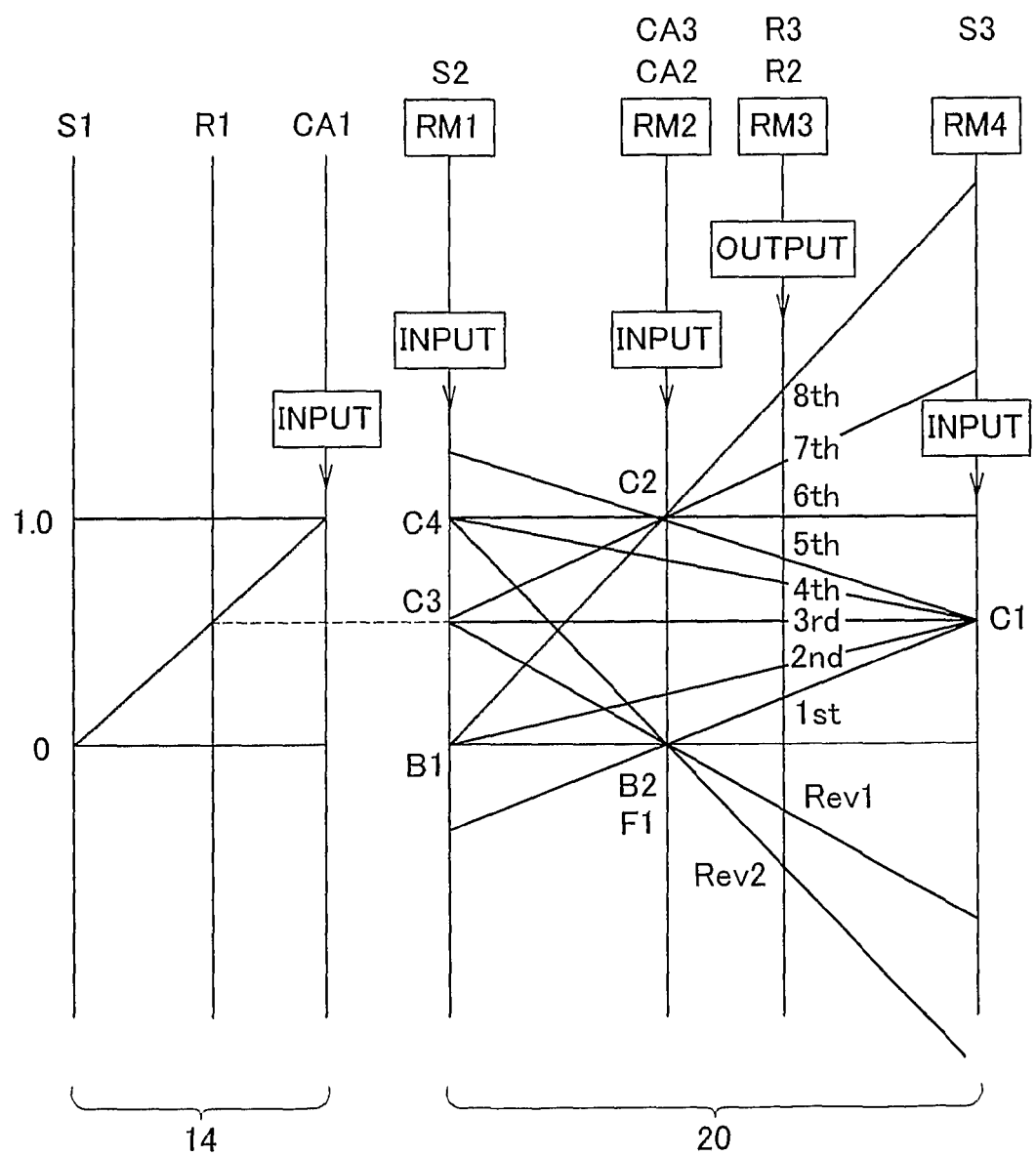
FIG. 3 is a nomograph that shows the rotation speed of each rotating element using a straight line for each gear ratio in the vehicle automatic transmission shown in FIG. 1.

FIG. 3 is a nomograph that shows the rotation speed of each rotating element of the first gear shift portion 14 and second gear shift portion 20 using a straight line, in which the lower horizontal line represents the rotation speed "0" and the upper horizontal line represents the rotation speed "1.0", that is, the same rotation speed as the input shaft 22. The vertical lines of the first gear shift portion 14 represent, starting from the left, the sun gear S1, the ring gear R1, and the carrier CA1. Intervals between the vertical lines are determined on the basis of a gear ratio ρ1 (=(the number of gears of the sun gear S1)/(the number of gears of the ring gear R1)) of the first planetary gear set 12. Four vertical lines of the second gear shift portion 20 represent, starting from the left toward the right, the first rotating element RM1 (sun gear S2), the second rotating element RM2 (carrier CA2 and carrier CA3), the third rotating element RM3 (ring gear R2 and ring gear R3), and the fourth rotating element RM4 (sun gear S3). Intervals between the four vertical lines are determined on the basis of a gear ratio ρ2 of the second planetary gear set 16 and a gear ratio ρ3 of the third planetary gear set 18.

As is apparent from the nomograph shown in FIG. 3, as the first clutch C1 and the second brake B2 are engaged, the fourth rotating element RM4 is rotated at a speed lower than that of the input shaft 22 through the first gear shift portion 14, and the rotation of the second rotating element RM2 is stopped. Thus, the third rotating element RM3 coupled to the output shaft 24 is rotated at a rotation speed indicated by "1st" and, hence, a first gear "1st", which has the highest gear ratio (=(rotation speed of the input shaft 22)/(rotation speed of the output shaft 24)), is established.

As the first clutch C1 and the first brake B1 are engaged, the fourth rotating element RM4 is rotated at a speed lower than that of the input shaft 22 through the first gear shift portion 14, and the rotation of the first rotating element RM1 is stopped. Thus, the third rotating element RM3 is rotated at a rotation speed indicated by "2nd" and, hence, a second gear "2nd", which has a gear ratio lower than that of the first gear "1st", is established.

As the first clutch C1 and the third clutch C3 are engaged, the fourth rotating element RM4 and the first rotating element RM1 are rotated at a speed lower than that of the input shaft 22 through the first gear shift portion 14, and the second gear shift portion 20 is integrally rotated. Thus, the third rotating element RM3 is rotated at a rotation speed indicated by "3rd" and, hence, a third gear "3rd", which has a gear ratio lower than that of the second gear "2nd", is established.

As the first clutch C1 and the fourth clutch C4 are engaged, the fourth rotating element RM4 is rotated at a speed lower than that of the input shaft 22 through the first gear shift portion 14, and the first rotating element RM1 is rotated integrally with the input shaft 22. Thus, the third rotating element RM3 is rotated at a rotation speed indicated by "4th" and, hence, a fourth gear "4th", which has a gear ratio lower than that of the third gear "3rd", is established.

As the first clutch C1 and the second clutch C2 are engaged, the fourth rotating element RM4 is rotated at a speed lower than that of the input shaft 22 through the first gear shift portion 14, and the second rotating element RM2 is rotated integrally with the input shaft 22. Thus, the third rotating element RM3 is rotated at a rotation speed indicated by "5th" and, hence, a fifth gear "5th", which has a gear ratio lower than that of the fourth gear "4th", is established.

As the second clutch C2 and the fourth clutch C4 are engaged, the second gear shift portion 20 is rotated integrally with the input shaft 22. Thus, the third rotating element RM3 is rotated at a rotation speed indicated by "6th", that is, the same rotation speed as the input shaft 22, and, hence, a sixth gear "6th", which has a gear ratio lower than that of the fifth gear "5th", is established. The gear ratio of the sixth gear "6th" is 1.

As the second clutch C2 and the third clutch C3 are engaged, the first rotating element RM1 is rotated at a speed lower than that of the input shaft 22 through the first gear shift portion 14 and the second rotating element RM2 is rotated integrally with the input shaft 22. Thus, the third rotating element RM3 is rotated at a rotation speed indicated by "7th" and, hence, a seventh gear "7th", which has a gear ratio lower than that of the sixth gear, is established.

As the second clutch C2 and the first brake B1 are engaged, the second rotating element RM2 is rotated integrally with the input shaft 22, and the rotation of the first rotating element RM1 is stopped. Thus, the third rotating element RM3 is rotated at a rotation speed indicated by "8th" and, hence, an eighth gear "8th", which has a gear ratio lower than that of the seventh gear "7th", is established.

As the third clutch C3 and the second brake B2 are engaged, the first rotating element RM1 is rotated at a lower speed through the first gear shift portion 14, and the rotation of the second rotating element RM2 is stopped. Thus, the third rotating element RM3 is rotated in the reverse direction at a rotation speed indicated by "Rev1" and, hence, a first reverse gear "Rev1", which has the highest gear ratio in the reverse rotation direction, is established. As the fourth clutch C4 and the second brake B2 are engaged, the first rotating element RM1 is rotated integrally with the input shaft 22, and the rotation of the second rotating element RM2 is stopped. Thus, the third rotating element RM3 is rotated in the reverse direction at a rotation speed indicated by "Rev2" and, hence, a second reverse gear "Rev2", which has a gear ratio lower than that of the first reverse gear "Rev1", is established. The first reverse gear "Rev1" and the second reverse gear "Rev2" correspond to the first gear and the second gear in the reverse rotation direction, respectively.

The operation graph illustrates the operation states of the clutches C1 to C4 and brakes B1 and B2 when the above described gears are established. In the graph, the circle represents an engaged state, the circle in parentheses represents an engaged state only during engine brake, and the blank represents a released state. Because the one-way clutch F1 is provided in parallel with the brake B2 that establishes the first gear "1st", it is not always necessary to engage the brake B2 at the time of start of running (accelerating) the vehicle. In addition, the gear ratio of each gear is appropriately determined by the gear ratios ρ1, ρ2 and ρ3 of the first planetary gear set 12, second planetary gear set 16 and third planetary gear set 18.

In this way, the automatic transmission 10 of the present embodiment achieves eight forward gears by the first gear shift portion 14 that has the two intermediate output paths PA1 and PA2 having different gear ratios and the second gear shift portion 20 having the two planetary gear sets 16 and 18 by switching engagement among the four clutches C1 to C4 and the two brakes B1 and B2. Thus, the automatic transmission 10 may be small in size and make it easier to be installed in a vehicle. In addition, as is apparent from the operation graph of FIG. 2, only any two of the clutches C1 to C4 and brakes B1 and B2 are changed for engagement to thereby make it possible to perform gear shift of each gear. Furthermore, the clutches C1 to C4 and brakes B1 and B2 (hereinafter, simply referred to as "clutch C" and "brake B" when it is not necessary to distinguish them from one another) are engagement elements that are hydraulically controlled for engagement, such as multiple disk clutches or multiple disk brakes, that is, hydraulic frictional engagement elements.

Figure 4:
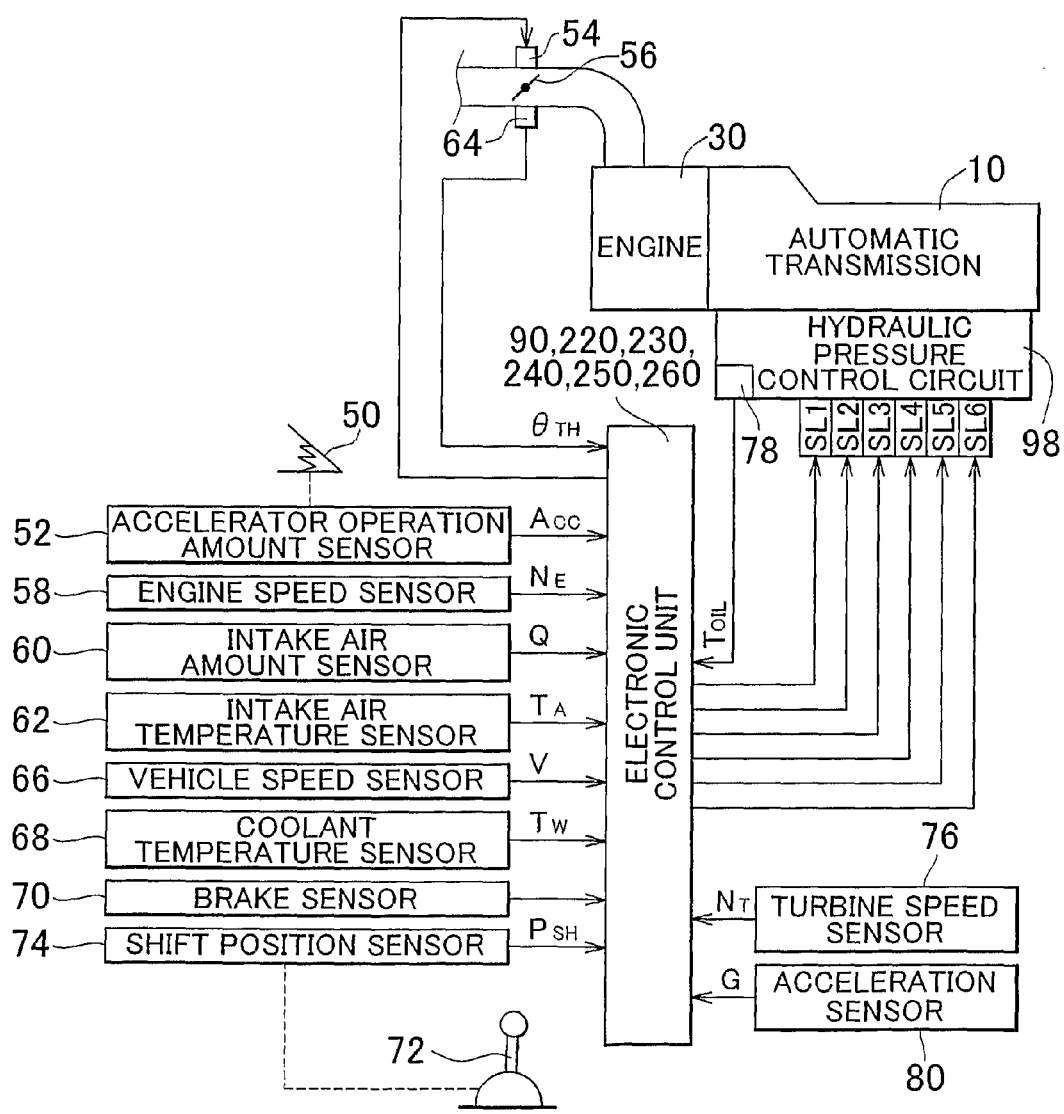
FIG. 4 is a block diagram that illustrates major portions of a control system provided in a vehicle for controlling the vehicle automatic transmission shown in FIG. 1.

FIG. 4 is a block diagram that illustrates major portions of a control system provided in the vehicle for controlling the automatic transmission 10 shown in FIG. 1. The electronic control unit 90 has functions of a driving force control device according to the aspects of the invention. The electronic control unit 90 is formed to include a so-called microcomputer provided with a CPU, a RAM, a ROM, an input/output interface, and the like. The CPU utilizes the temporary storage function of the RAM while handling signal processing in accordance with a program stored in the ROM beforehand to thereby execute an output power control of the engine 30, a gear shift control of the automatic transmission 10, and an engage/release control of the lock-up mechanism 31. The electronic control unit 90 is, where necessary, separately formed for engine control and for gear shift control.

As shown in FIG. 4, an accelerator operation amount Acc, which is an amount by which the accelerator pedal 50 is operated, is detected by an accelerator operation amount sensor (accelerator operation amount sensor) 52, and a signal that indicates the accelerator operation amount (accelerator operation amount) Acc is supplied to the electronic control unit 90. The accelerator pedal 50 is depressed largely depending on the output power requested by the driver, so that the accelerator pedal 50 corresponds to an accelerator operation member, and the accelerator operation amount Acc corresponds to the requested output power.

An engine speed sensor 58, an intake air amount sensor 60, an intake air temperature sensor 62, a throttle valve opening degree sensor 64, a vehicle speed sensor 66, a coolant temperature sensor 68, a brake sensor 70, a shift position sensor 74, a turbine speed sensor 76, an AT oil temperature sensor 78, an acceleration sensor 80, and the like, are provided. The engine speed sensor 58 detects the rotation speed $N_E$ of the engine 30. The intake air amount sensor 60 detects the intake air amount Q of the engine 30. The intake air temperature sensor 62 detects the temperature $T_A$ of intake air. The throttle valve opening degree sensor 64, having an idle switch, detects a fully closed state (idle state) and opening degree $\theta_{TH}$ of the electronic throttle valve 56 of the engine 30. The opening and closing of the electronic throttle valve 56 are electrically controllable through control of a throttle actuator 54. The vehicle speed sensor 66 detects a vehicle speed V (which corresponds to the rotation speed $N_{OUT}$ of the output shaft 24). The coolant temperature sensor 68 detects the coolant temperature $T_W$ of the engine 30. The brake sensor 70 detects whether a foot brake, or a service brake, is operated. The shift position sensor 74 detects the position (operation position) $P_{SH}$ of the shift lever 72. The turbine speed sensor 76 detects the turbine speed $N_T$ (=the rotation speed $N_{IN}$ of the input shaft 22). The AT oil temperature sensor 78 detects the AT oil temperature $T_{OIL}$ which is the temperature of a hydraulic fluid in a hydraulic pressure control circuit 98. The acceleration sensor 80 detects the acceleration (deceleration) G of the vehicle. From these sensors, signals that indicate the engine speed $N_E$, intake air amount Q, intake air temperature $T_A$, throttle valve opening degree $\theta_{TH}$, vehicle speed V, engine coolant temperature $T_W$, whether the foot brake is operated, position $P_{SH}$ of the shift lever 72, turbine speed $N_T$, AT oil temperature $T_{OIL}$ and acceleration (deceleration) G of the vehicle are supplied to the electronic control unit 90.

Figure 5:
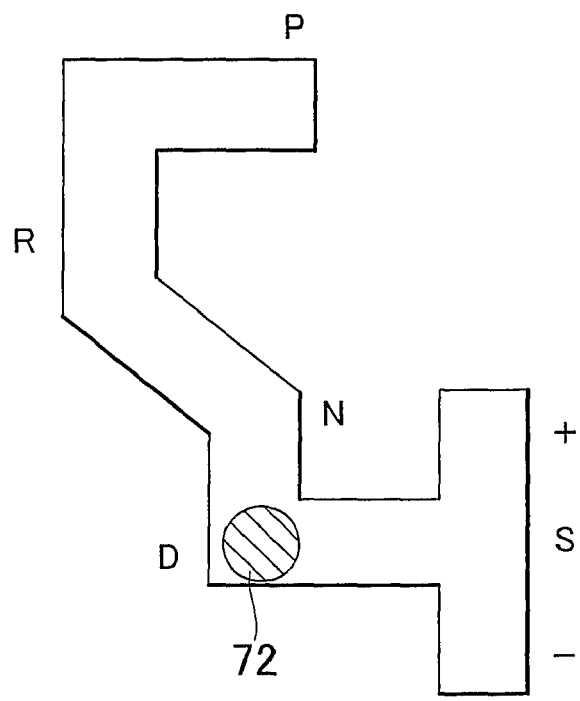
FIG. 5 is a view that illustrates operation positions of a shift lever shown in FIG. 4.

The shift lever 72 is, for example, arranged near the driver's seat, and is manually operated to one of five positions, that is, "P", "R", "N", "D" or "S", as shown in FIG. 5. The "P" position is a parking position at which a power transmission path in the automatic transmission 10 is released and the rotation of the output shaft 24 is mechanically locked by a mechanical parking mechanism. The "R" position is a reverse running position at which the output shaft 24 of the automatic transmission 10 is rotated in reverse. The "N" position is a power transmission cutoff position at which the power transmission path in the automatic transmission 10 is released. The "D" position is a forward running position at which automatic transmission control is performed within a range (D range) in which the automatic transmission 10 is allowed to shift gear from the first gear to the eighth gear. The "S" position is a forward running position at which manual gear shift is allowed in such a manner that a high-speed side shiftable gear is switched among a plurality of different gear shift ranges or a plurality of different gears. The "S" position is provided with "+" position for upshifting a gear shift range or a gear every time the shift lever 72 is operated and "−" position for downshifting a gear shift range or a gear every time the shift lever 72 is operated. The shift position sensor 74 detects which position (operation position) $P_{SH}$ the shift lever 72 is placed.

The hydraulic pressure control circuit 98 is, for example, provided with manual valves that are connected to the shift lever 72 via cables or links. The manual valves are mechanically operated in accordance with operation of the shift lever 72 to thereby switch a hydraulic circuit in the hydraulic pressure control circuit 98. For example, at the "D" position and "S" position, a forward running hydraulic pressure PD is output to mechanically form a forward running circuit. Thus, forward running is allowed while gear shift is allowed among the forward running gears, that is, the first gear "1st" to the eighth gear "8th". When the shift lever 72 is operated to the "D" position, the electronic control unit 90 recognizes the gear shift operation from the signal of the shift position sensor 74 to establish an automatic transmission mode and then controls gear shift using all the forward running gears, that is, the first gear "1st" to the eighth gear "8th".

Figure 8:
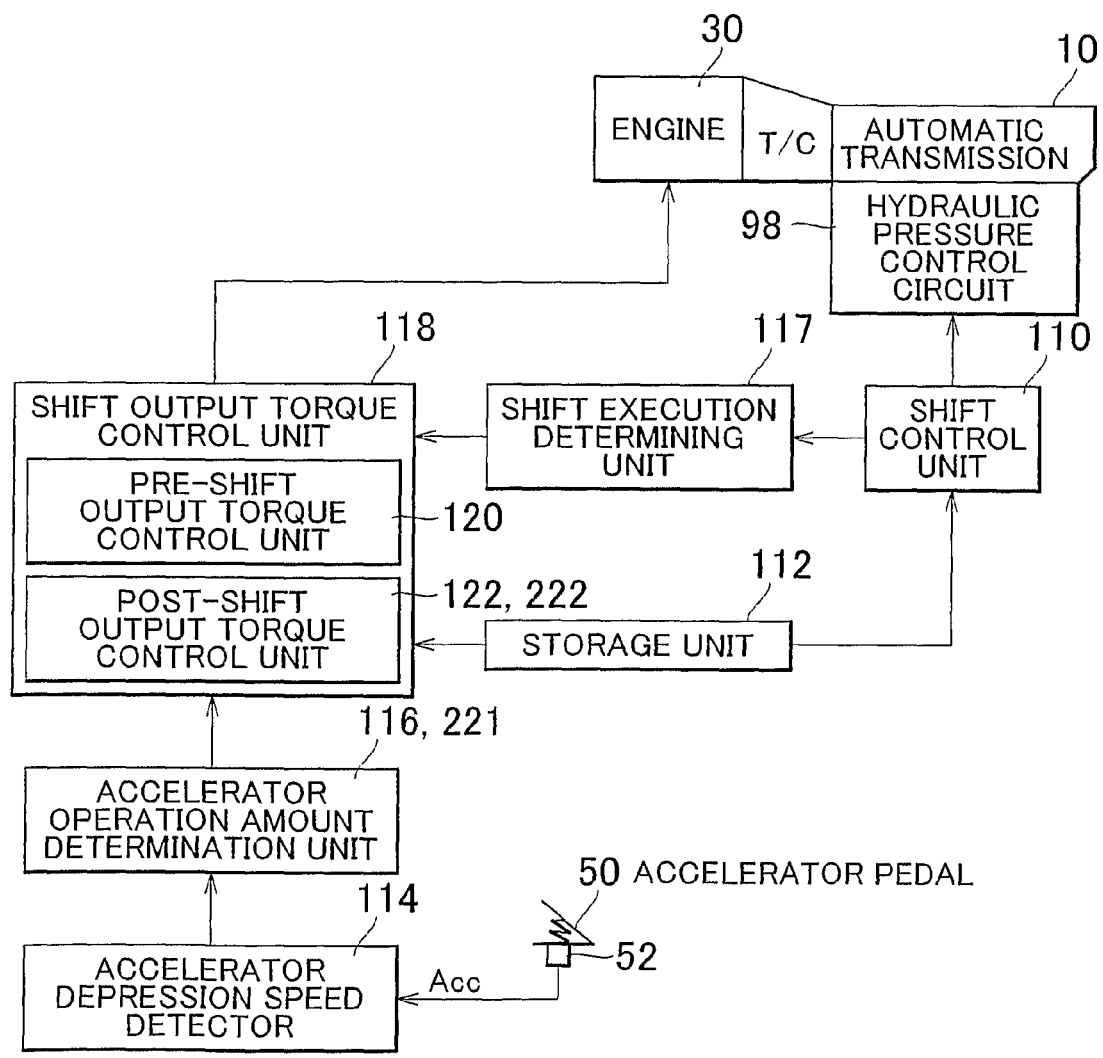
FIG. 8 is a functional block diagram that illustrates major control functions of the electronic control device shown in FIG. 4 according to a first embodiment of the invention.

The electronic control unit 90 includes a shift control unit 110 (see FIG. 8). The shift control unit 110 determines whether to shift gear on the basis of an actual vehicle speed V and an actual accelerator operation amount Acc against the relationship (shift line map), shown in FIG. 6, that is stored beforehand using the vehicle speed V and the accelerator operation amount Acc as parameters, for example, and controls gear shift so as to obtain the determined gear. For example, in accordance with a decrease in vehicle speed V or an increase in accelerator operation amount Acc, a low-speed side gear having a large gear ratio is established. In the gear shift control, so as to establish the determined gear, linear solenoid valves SL1 to SL6 in the hydraulic pressure control circuit 98 for gear shift are energized or de-energized or controlled in electric current to thereby switch engage/release states of the clutches C and brakes B while transitional hydraulic pressures, and the like, during gear shift are controlled. That is, energization and de-energization of the linear solenoid valves SL1 to SL6, which are electromagnetic valves, are respectively controlled to switch engage/release states of the clutches C and brakes B, thus establishing any one of the forward running gears from among the first gear "1st" to the eighth gear "8th". Note that various modes are possible, for example, gear shift control may be performed on the basis of a throttle valve opening degree $\theta_{TH}$, an intake air amount Q, or a road gradient.

Figure 6:
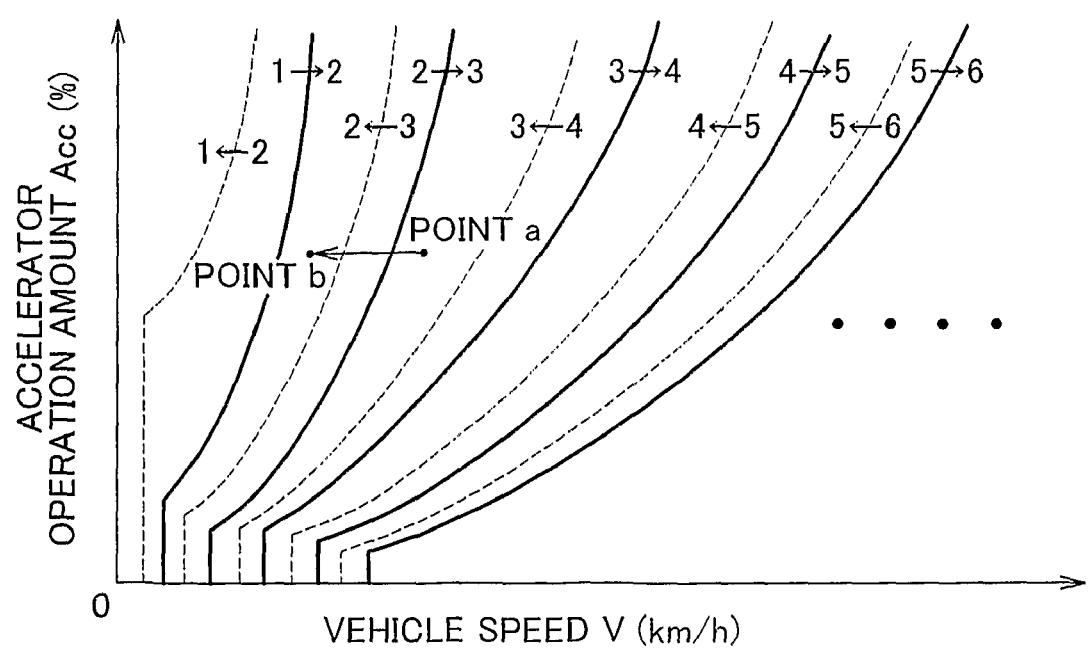
FIG. 6 is a view that shows an example of a shift line map used in gear shift control of an electronic control device shown in FIG. 4.

In the shift line map shown in FIG. 6, the solid lines are shift lines (upshift lines) at which it is determined to upshift, and the broken lines are shift lines (downshift lines) at which it is determined to downshift. In addition, the shift lines in the shift line map shown in FIG. 6 are used to determine whether, on a horizontal line that represents an actual accelerator operation amount Acc (%), an actual vehicle speed V crosses a shift line, that is, whether an actual vehicle speed V exceeds a value (gear shift point vehicle speed) VS on the shift line, at which gear shift should be performed. The shift lines are stored beforehand as a range of the values VS, that is, a range of the gear shift point vehicle speeds. Note that the shift line map shown in FIG. 6 exemplifies the shift lines for the first gear to the sixth gear from among the first gear to the eighth gear within which the automatic transmission 10 shifts gear.

Figure 7:
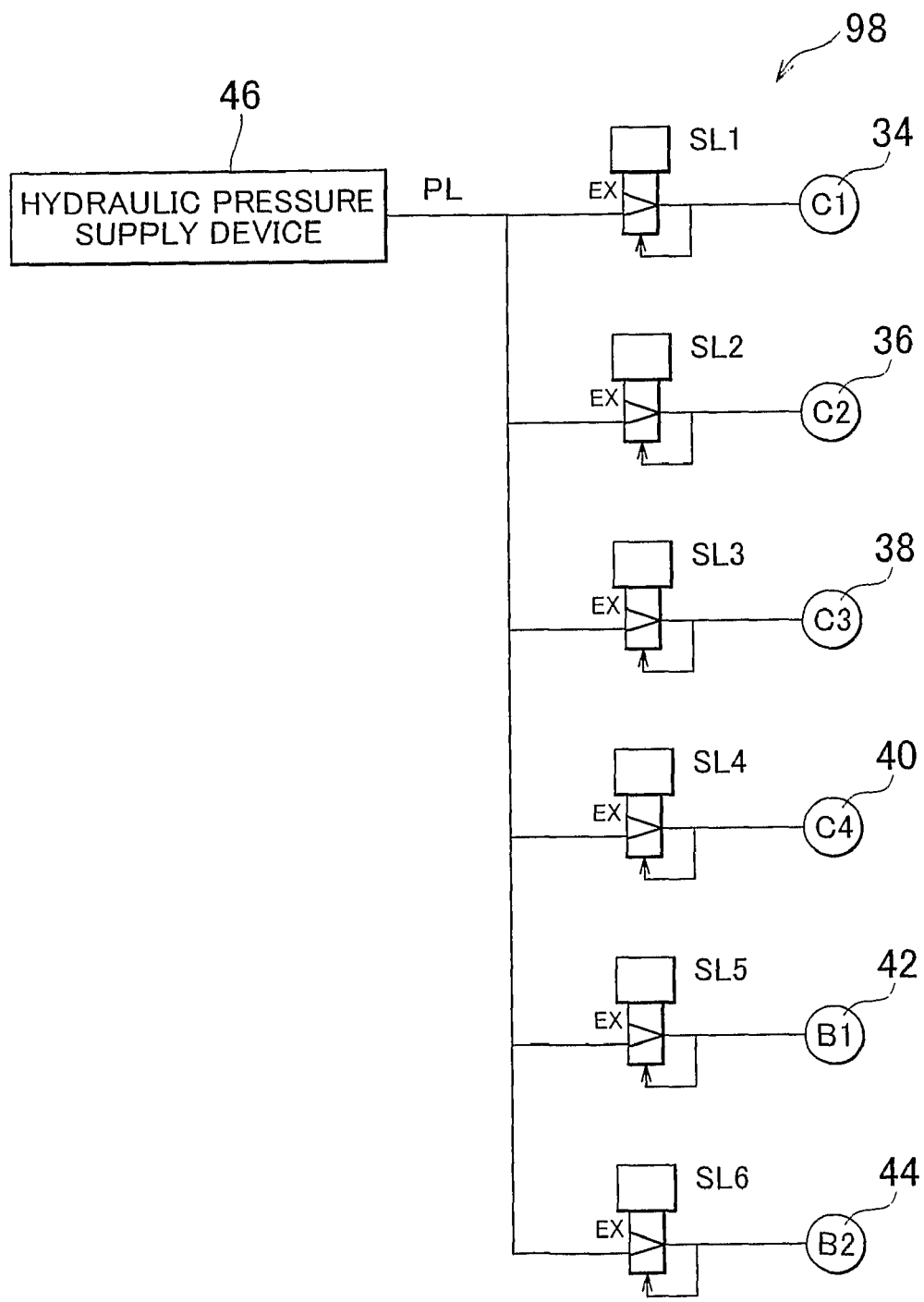
FIG. 7 is a circuit diagram that shows major portions of a hydraulic pressure control circuit shown in FIG. 4.

FIG. 7 is a circuit diagram that shows portions of the hydraulic pressure control circuit 98, related to the linear solenoid valves SL1 to SL6. Hydraulic actuators (hydraulic cylinders) 34, 36, 38, 40, 42, and 44 of the clutches C1 to C4 and the brakes B1 and B2 are supplied with hydraulic pressures that are adjusted through the respective linear solenoid valves SL1 to SL6 from a line hydraulic pressure PL output from a hydraulic pressure supply device 46. The hydraulic pressure supply device 46 includes a mechanical oil pump 48 (see FIG. 1) that is driven for rotation by the engine 30 and regulator valves that adjust the line hydraulic pressures PL. Thus, the line hydraulic pressures PL are controlled in accordance with an engine load, or the like. The linear solenoid valves SL1 to SL6 basically have similar structures, and are energized or de-energized separately on the basis of command values from the electronic control unit 90 (see FIG. 4). Thus, hydraulic pressures of the hydraulic actuators 34 to 44 are separately adjusted. Then, in the gear shift control of the automatic transmission 10, a so-called clutch to clutch gear shift, that is, for example, release and engagement of the clutches C and brakes B related to the gear shift are controlled at the same time, is performed. For example, in the downshift from the fifth gear to the fourth gear, as shown in the engagement operation table shown in FIG. 2, the clutch C2 is released while the clutch C4 is engaged, and the release transitional hydraulic pressure of the clutch C2 and the engagement transitional hydraulic pressure of the clutch C4 are appropriately controlled so as to suppress shift-shock. Note that the linear solenoid valves SL1 to SL6, when need not be separately described, are simply referred to as "linear solenoid valves SL".

Incidentally, as the accelerator pedal 50 is depressed, in order to increase a driving force $F_{DR}$, which is a propelling force of the vehicle, the automatic transmission 10 downshifts in accordance with the shift line map shown in FIG. 6 depending on the accelerator operation amount Acc. Normally, a stepwise variation in driving force $F_{DR}$ occurs during the downshift. However, a smooth variation in driving force $F_{DR}$ at the time of depressing the accelerator pedal provides a more adequate response to driver's intention. Thus, in the present embodiment, a control operation is performed to further smooth a variation (to attain a further continuous variation) in driving force $F_{DR}$ during downshift. Hereinafter, the control operation will be described with reference to FIG. 8. Note that the diameters of the driving wheels are constant, so that the driving force $F_{DR}$ is in a direct proportional relationship to a driving torque $T_{DR}$, which is a torque for rotating the driving wheels.

FIG. 8 is a functional block diagram that illustrates major control functions of the electronic control unit 90, that is, the control operation to smooth a variation in driving force $F_{DR}$ during the downshift.

Figure 9:
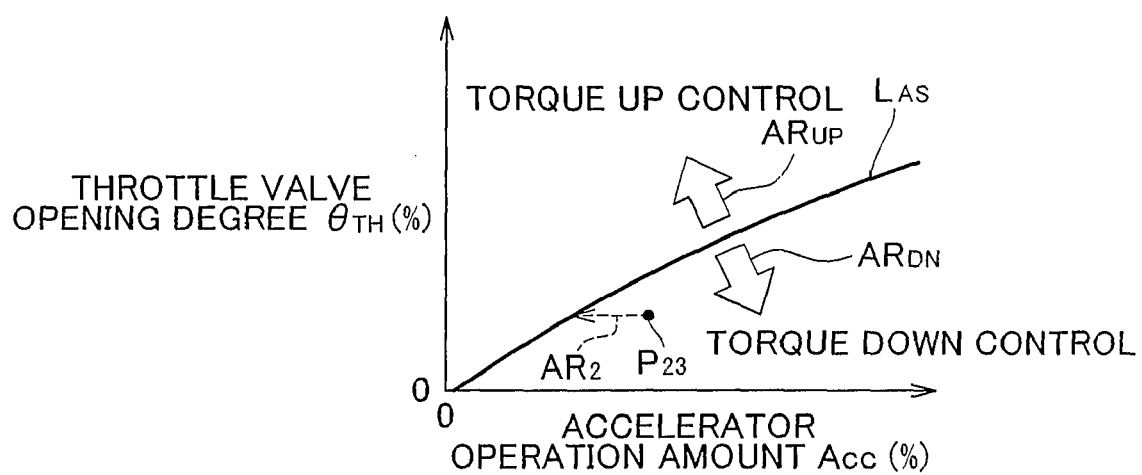
FIG. 9 is a view that shows a throttle valve reference characteristic, which is a predetermined relationship between an accelerator operation amount and a throttle valve opening degree in one-to-one correspondence with each other, in the vehicle automatic transmission shown in FIG. 1.

FIG. 9 is a view that shows a throttle valve reference characteristic $L_{AS}$, which is a predetermined relationship between an accelerator operation amount Acc and a throttle valve opening degree $A_{TH}$ in one-to-one correspondence with each other. The throttle valve of the present embodiment is the electronic throttle valve 56, of which the opening and closing are electrically controllable, and, therefore, is able to increase or decrease the throttle valve opening degree $\theta_{TH}$ irrespective of the throttle valve reference characteristic $L_{AS}$. For example, in FIG. 9, when the relationship between the accelerator operation amount Acc and the throttle valve opening degree $\theta_{TH}$ are shifted to the side indicated by arrow $AR_{UP}$, a torque up control, which will be described later, is executed to increase an actual engine torque $T_E$ as compared with the engine torque $T_E$ corresponding to the throttle valve reference characteristic $L_{AS}$. On the other hand, when the relationship between the accelerator operation amount Acc and the throttle valve opening degree $\theta_{TH}$ is shifted toward the side indicated by arrow $AR_{DN}$, a torque down control, which will be described later, is executed to reduce an actual engine torque $T_E$ as compared with the engine torque $T_E$ corresponding to the throttle valve reference characteristic $L_{AS}$.

Figure 10:
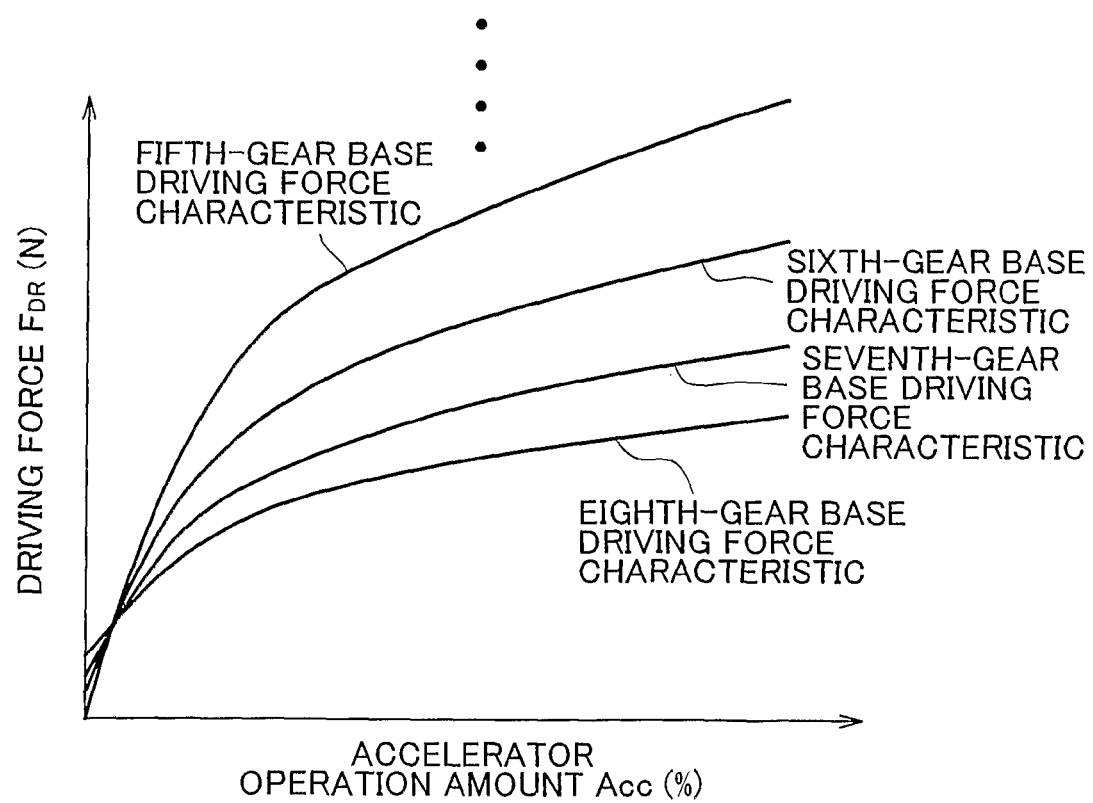
FIG. 10 is a view that exemplifies base driving force characteristics, each of which is a relationship between an accelerator operation amount and a driving force when a throttle valve opening degree varies in accordance with the throttle valve reference characteristic shown in FIG. 9 with respect to an accelerator operation amount, in the vehicle automatic transmission shown in FIG. 1.

FIG. 10 is a view that exemplifies base driving force characteristics, each of which is a relationship between an accelerator operation amount Acc and a driving force $F_{DR}$ when a throttle valve opening degree $\theta_{TH}$ varies in accordance with the throttle valve reference characteristic $L_{AS}$ (FIG. 9) with respect to the accelerator operation amount Acc. The base driving force characteristic differs depending on the gear of the automatic transmission 10, and the driving force $F_{DR}$ increases as the gear of the automatic transmission 10 decreases. Even when the throttle valve opening degree $\theta_{TH}$ (accelerator operation amount Acc) and the gear of the automatic transmission 10 do not change, the driving force $F_{DR}$ varies with the engine speed $N_E$ or vehicle speed V and a torque ratio that can be calculated from the rotation speed ratio of the input and output shafts of the torque converter 32 as parameters. Note that the base driving force characteristic map shown in FIG. 10 exemplifies base driving force characteristics of the fifth gear to the eighth gear from among the first gear to the eighth gear within which the automatic transmission 10 shifts gear.

In FIG. 8, the shift control unit 110, for example, determines whether to perform gear shift on the basis of an actual vehicle speed V and an actual accelerator operation amount Acc using the shift line map stored beforehand and shown in FIG. 6. The shift control unit 110 outputs a gear shift signal for performing the determined gear shift to the hydraulic pressure control circuit 98 to thereby automatically shift gear of the automatic transmission 10. For example, in a state where the current gear of the automatic transmission 10 is the third gear, when it is determined that an actual vehicle speed V decreases from point a to point b in FIG. 6 and the shift control unit 110 determines that the actual vehicle speed V crosses a gear shift point vehicle speed V3-2 at which the automatic transmission 10 should downshift from "3rd" to "2nd", in the downshift control, the shift control unit 110 outputs, to the hydraulic pressure control circuit 98, a command such that the third clutch C3 starts releasing engagement, starts engagement of the first brake B1 to generate an engagement torque of the first brake B1 while a certain amount of engagement torque of the third clutch C3 still remains, and then a gear ratio γ3 of the third gear is shifted to a gear ratio γ2 of the second gear while completing release of the third clutch C3 and engagement of the first brake B1.

A storage unit 112 stores the shift line map shown in FIG. 6 and the throttle valve reference characteristic $L_{AS}$ shown in FIG. 9. Furthermore, in a plurality of vehicle driving states in which parameters that influence the base driving force characteristics (FIG. 10), such as the vehicle speed V and the rotation speed ratio of the torque converter 32, are varied in a stepwise manner, a base driving force characteristic map formed of the base driving force characteristics of the respective gears as shown in FIG. 10 is obtained beforehand, and the storage unit 112 stores a plurality of the base driving force characteristic maps as well.

The accelerator depression speed detector 114 detects a rate of change at which the accelerator pedal 50 is depressed, that is, an accelerator depression speed $V_{AC}$ which is a rate of change in accelerator operation amount Acc detected by the accelerator operation amount sensor 52. Note that in the accelerator depression speed $V_{AC}$, a direction in which the accelerator pedal 50 is depressed, that is, a direction in which the accelerator operation amount Acc increases, is forward.

An accelerator operation amount determination unit 116 determines, on the basis of the accelerator depression speed $V_{AC}$ detected by the accelerator depression speed detector 114, whether the accelerator operation amount Acc is increasing.

A shift execution determining unit 117 determines which gear shift is performed in the automatic transmission 10. For example, in the description of FIG. 11, which will be described later, when downshift is performed by the shift control unit 110, the shift execution determining unit 117 determines that downshift has been performed.

Here, as the accelerator operation amount Acc increases, the automatic transmission 10 downshifts in accordance with the shift line map shown in FIG. 6. Then, as is apparent from FIG. 11 that shows a relationship between an accelerator operation amount Acc and a driving force $F_{DR}$, when the driving force $F_{DR}$ varies along the base driving force characteristic with an increase in accelerator operation amount Acc, the driving force $F_{DR}$, for example, varies in a stepwise manner as indicated by arrow FN in FIG. 11 at the time of downshift. Then, a shift output torque control unit 118 executes a shift output torque control to adjust the engine torque $T_E$ so as to reduce a driving force difference $DF_F$ (exemplified in FIG. 11), which is a variation width of the driving force $F_{DR}$ due to downshift of the automatic transmission 10. The shift output torque control may also be executed when the automatic transmission 10 upshifts. However, in the present embodiment, when the shift output torque control is not performed during upshift, and the relationship between the vehicle speed V and the accelerator operation amount Acc varies toward the upshift in the shift line map shown in FIG. 6 such as when the accelerator operation amount Acc decreases or when the vehicle speed V increases, the driving force $F_{DR}$ varies as shown in the broken line (FIG. 11) along the base driving force characteristic of each gear shown in FIG. 11 and then varies in a stepwise manner as indicated by broken line arrow (FIG. 11) during upshift. Note that the (n+2)th gear, (n+1)th gear, nth gear, and (n−1)th gear generally represent the gears of the automatic transmission 10. For example, when the nth gear corresponds to the sixth gear, the (n+1) gear corresponds to the seventh gear. The same also applies to the following description and other drawings.

The shift output torque control will be specifically described with reference to FIG. 11. As the automatic transmission 10 downshifts from the (n+2)th gear to the (n+1)th gear, the current gear (actual gear) of the automatic transmission 10 will be the (n+1)th gear. This case will be described as an example. The shift output torque control unit 118 includes a pre-shift output torque control unit 120 that executes the shift output torque control before the automatic transmission 10 shifts gear and a post-shift output torque control unit 122 that executes the shift output torque control after the automatic transmission 10 shifts gear. When the accelerator operation amount determination unit 116 determines that the accelerator operation amount Acc is increasing, the pre-shift output torque control unit 120 obtains the base driving force characteristic of the (n+1)th gear, which is the current gear (actual gear), and the base driving force characteristic of the nth gear, which is one gear lower than the current gear, in order to execute the shift output torque control for the next downshift. At this time, the driving force $F_{DR}$ corresponding to the accelerator operation amount Acc may be obtained one by one on the basis of the parameter such as the vehicle speed V. However, for example, it is assumed that the current vehicle speed V, the torque ratio of the torque converter 32, and the like, continue constantly, and the pre-shift output torque control unit 120 selects the base driving force characteristic map corresponding to the current vehicle driving state from among a plurality of the base driving force characteristic maps stored in the storage unit 112 and then obtains the base driving force characteristics of the (n+1)th gear (current gear) and nth gear.

Subsequently, the pre-shift output torque control unit 120 compares a downshift point $P_{DN}$ that indicates the accelerator operation amount Acc at which the automatic transmission 10 downshifts from the (n+2)th gear to the (n+1)th gear (current gear) with an upshift point $P_{UP}$ that indicates the accelerator operation amount Acc at which the automatic transmission 10 upshifts from the nth gear to the (n+1)th gear (current gear). When the upshift point $P_{UP}$ is smaller in accelerator operation amount Acc than the downshift point $P_{DN}$, the shift output torque control at the (n+1)th gear (current gear) is initiated from the downshift point $P_{DN}$. At this time, for example, because the immediately preceding shift of the automatic transmission 10 is downshift from the (n+2)th gear to the (n+1)th gear, the pre-shift output torque control unit 120 adopts the downshift point $P_{DN}$ from the actual (n+2)th gear to the (n+1)th gear as the downshift point $P_{DN}$ and adopts the upshift point $P_{UP}$ from the nth gear, which is predicted on the basis of the shift line map FIG. 6 on the assumption that the current vehicle speed V is constant, to the (n+1)th gear as the upshift point $P_{UP}$.

Figure 11:
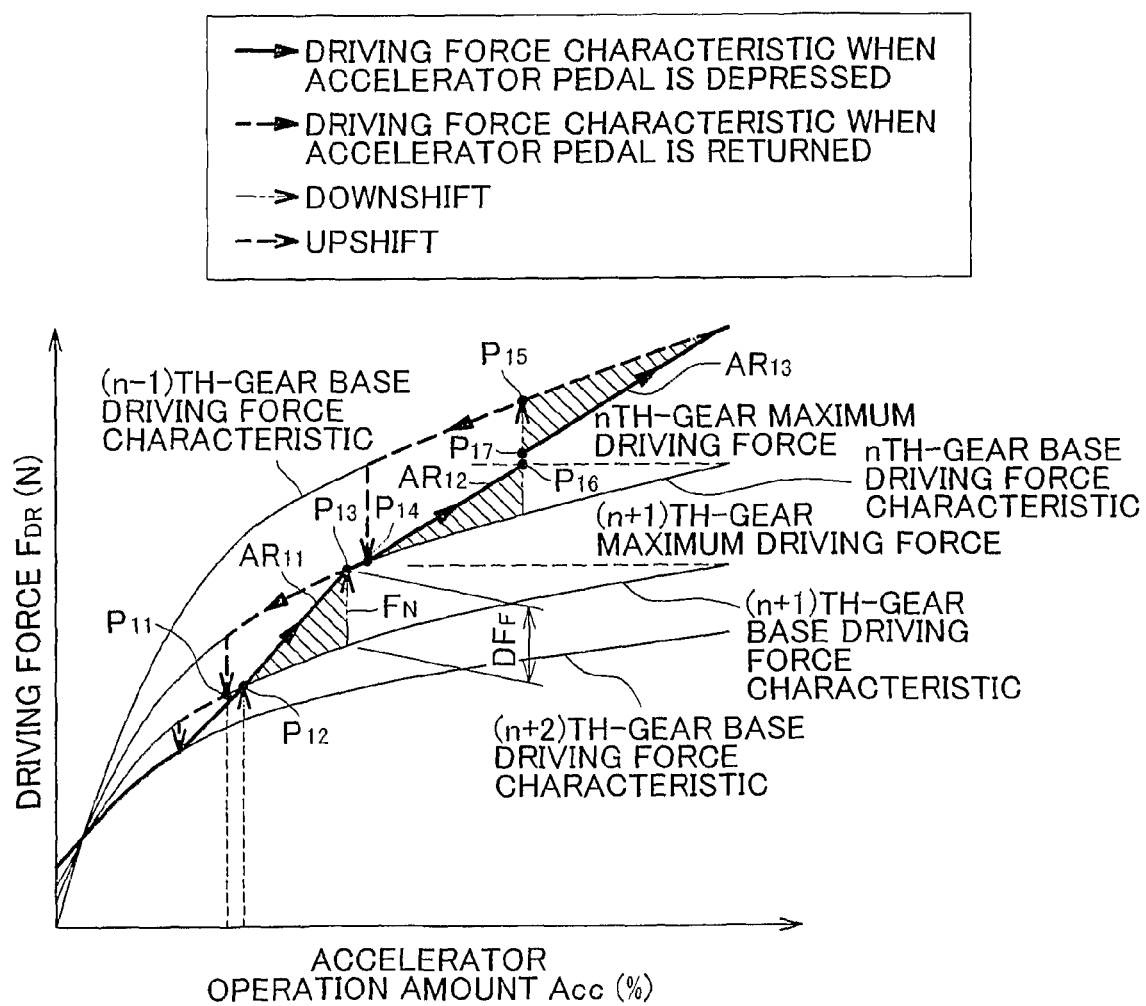
FIG. 11 is a view that illustrates a variation in driving force with respect to a variation in accelerator operation amount when the vehicle automatic transmission shown in FIG. 1 shifts gear in the first embodiment of the invention, and that also illustrates a variation in driving force when shift output torque control is executed.
Figure 12:
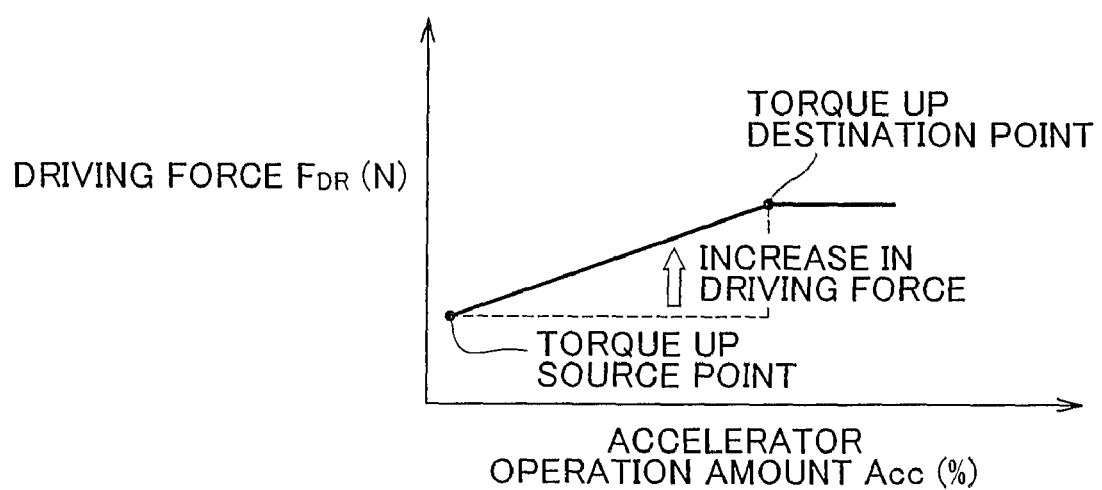
FIG. 12 is a view that schematically shows a relationship between an accelerator operation amount and a driving force in torque up control executed in the shift output torque control illustrated in FIG. 11.
Figure 13:
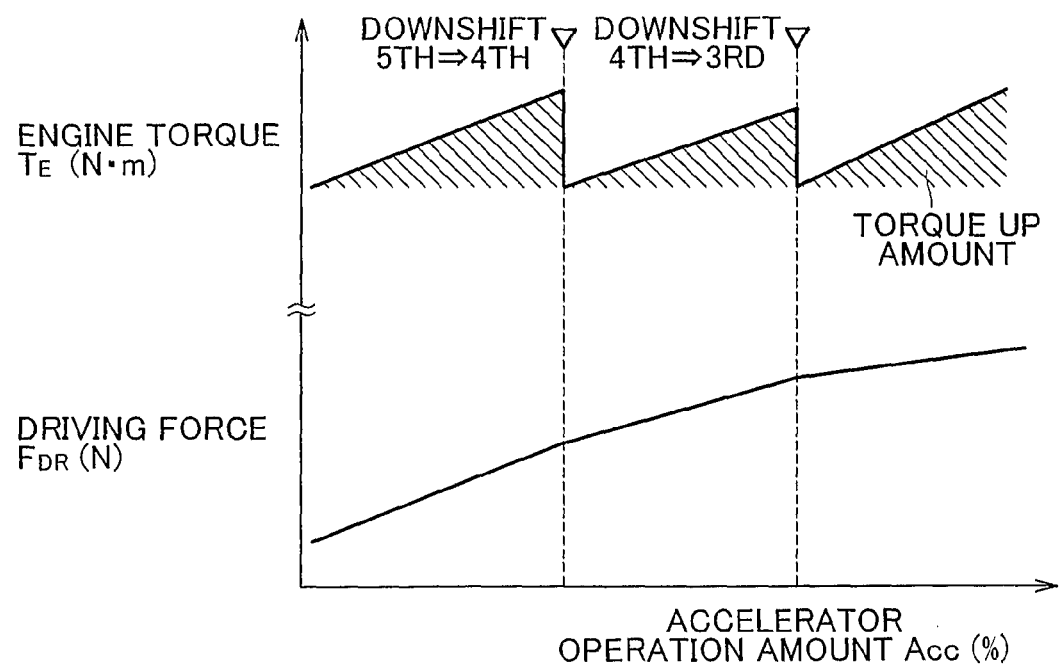
FIG. 13 is a view that exemplifies a variation in driving force and engine torque with respect to a variation in accelerator operation amount when the torque up control shown in FIG. 12 is executed.

As described with reference to FIG. 11, when the pre-shift output torque control unit 120 compares the shift points, $P_{11}$ shown in FIG. 11 is used as the upshift point $P_{UP}$ and $P_{12}$ shown in FIG. 11 is used as the downshift point $P_{DN}$. When comparing the shift points, in FIG. 11, the upshift point $P_{UP}$ ($P_{11}$) is smaller in accelerator operation amount Acc (abscissa axis in FIG. 11) than the downshift point $P_{DN}$ ($P_{12}$). Thus, the pre-shift output torque control unit 120 initiates the shift output torque control from the downshift point $P_{DN}$ ($P_{12}$) shown in FIG. 11, and in the shift output torque control, increases the driving force $F_{DR}$ as the accelerator operation amount Acc increases with respect to the base driving force characteristic of the (n+1)th gear (current gear), as shown by $AR_{11}$ in FIG. 11. In order to increase the driving force $F_{DR}$ in this way, specifically, in the shift output torque control, the pre-shift output torque control unit 120 executes a torque up control in which a downshift point $P_{DN}$ ($P_{13}$ on the nth gear base driving force characteristic in FIG. 11) from the (n+1)th gear (current gear) to the nth gear is predicted on the basis of the shift line map shown in FIG. 6 on the assumption that, for example, the current vehicle speed V remains constant, $P_{12}$ which is a start point and $P_{13}$ which is an end point are determined, the throttle valve opening degree $\theta_{TH}$ is increased irrespective of the throttle valve reference characteristic $L_{AS}$ shown in FIG. 9 so that the driving force $F_{DR}$ smoothly increases (linearly increases in FIG. 11) between $P_{12}$ and $P_{13}$, and then an actual engine torque $T_E$ is increased as compared with the engine torque $T_E$ corresponding to the throttle valve reference characteristic $L_{AS}$. The torque up control will be described with reference to FIG. 12 that schematically shows the relationship between the accelerator operation amount Acc and the driving force $F_{DR}$. A torque up source point (FIG. 12) corresponding to the start point ($P_{12}$ in FIG. 11) of the torque up control and a torque up destination point (FIG. 12) corresponding to the end point ($P_{13}$ in FIG. 11) of the torque up control are determined and are connected by a predetermined change curve, for example, a straight line, and then the driving force $F_{DR}$ is increased irrespective of the throttle valve reference characteristic $L_{AS}$ shown in FIG. 9. As the shift output torque control that is implemented by the torque up control, in which the engine torque $T_E$ is increased irrespective of the throttle valve reference characteristic $L_{AS}$ shown in FIG. 9, is executed every time the automatic transmission 10 downshifts in accordance with an increase in accelerator operation amount Acc, for example, as shown in FIG. 13, the engine torque $T_E$ decreases in a stepwise manner at the time of each downshift, the driving force difference $DF_F$ is eliminated or reduced at the time of downshift, and then the driving force $F_{DR}$ varies smoothly. Note that because the engine torque $T_E$ in the torque up control has an upper limit even when increased irrespective of the throttle valve reference characteristic $L_{AS}$ shown in FIG. 9, the maximum driving force of the (n+1)th gear (current gear) corresponding to the upper limit of the engine torque $T_E$ is set for an upper limit of the diving force $F_{DR}$ indicated by the end point ($P_{13}$ in FIG. 13) of the torque up control. In addition, when the accelerator pedal 50 is depressed to perform downshift after the torque up control and then the throttle valve opening degree $\theta_{TH}$ is accordant with the throttle valve reference characteristic $L_{AS}$ shown in FIG. 9, in order not to decrease the driving force $F_{DR}$ despite the accelerator pedal 50 being depressed, in the torque up control, the engine torque $T_E$ is controlled by taking into consideration an error of the driving force $F_{DR}$ in the torque up control so that the driving force $F_{DR}$ during the torque up control does not exceed the actual driving force $F_{DR}$ after downshift.

The case in which the upshift point $P_{UP}$ is smaller in accelerator operation amount Acc (abscissa axis in FIG. 11) than the downshift point $P_{DN}$ is described; however, the opposite case is also possible. For example, this is the case in which in FIG. 11, the automatic transmission 10 downshifts from the (n+1)th gear to the nth gear, and the current gear (actual gear) of the automatic transmission 10 is the nth gear. Next, this case will be described as an example.

In FIG. 11, as in the case of the (n+1)th gear, in the nth gear (current gear) as well, when the accelerator operation amount determination unit 116 determines that the accelerator operation amount Acc is increasing, the pre-shift output torque control unit 120 obtains the base driving force characteristic of the nth gear, which is the current gear (actual gear), and the base driving force characteristic of the (n−1)th gear, which is one gear lower than the current gear, in order to perform the shift output torque control for the next downshift. Subsequently, the pre-shift output torque control unit 120 compares a downshift point $P_{DN}$ that indicates the accelerator operation amount Acc at which the automatic transmission 10 downshifts from the (n+1)th gear to the nth gear (current gear) with an upshift point $P_{UP}$ that indicates the accelerator operation amount Acc at which the automatic transmission 10 upshifts from the (n−1)th gear to the nth gear (current gear). In the nth gear (current gear) in FIG. 11, because the upshift point $P_{UP}$ ($P_{14}$ in FIG. 11) is larger in accelerator operation amount Acc than the downshift point $P_{DN}$ ($P_{13}$ in FIG. 11), the pre-shift output torque control unit 120 initiates the shift output torque control at the nth gear (current gear) from the upshift point $P_{UP}$. Thus, the pre-shift output torque control unit 120 initiates the shift output torque control from the upshift point $P_{UP}$ ($P_{14}$) shown in FIG. 11 by executing the torque up control, and in the shift output torque control, increases the driving force $F_{DR}$ as the accelerator operation amount Acc increases with respect to the base driving force characteristic of the nth gear (current gear), as shown by $AR_{12}$ in FIG. 11. Here, because the driving force $F_{DR}$ corresponding to the downshift point $P_{DN}$ ($P_{15}$ in FIG. 11) on the (n−1)th gear base driving force characteristic is larger than the maximum driving force of the nth gear (current gear), the driving force $F_{DR}$ cannot be increased to $P_{15}$ in the nth gear (current gear), and the end point of the torque up control is set to $P_{16}$ in FIG. 11 corresponding to the maximum driving force.

When the shift execution determining unit 117 determines that downshift has been performed, that is, when the automatic transmission 10 has downshifted, the pre-shift output torque control unit 120 ends the torque up control that is executed before the downshift in order to reduce the driving force difference $DF_F$ due to the above downshift, that is, the pre-shift output torque control that is the shift output torque control executed before gear shift. Thus, once the downshift has been performed, the torque up control will not be performed after the downshift.

The torque up control executed before the downshift is described; however, when the accelerator operation amount Acc is still increasing after the downshift, the shift output torque control may be performed.

When the accelerator operation amount determination unit 116 determines that the accelerator operation amount Acc is increasing, and the shift execution determining unit 117 determines that downshift has been performed, the post-shift output torque control unit 122 determines whether the driving force difference $DF_F$ due to the downshift, which is the gear shift of the automatic transmission 10, is larger than or equal to a predetermined driving force difference determination value $X_{DF}$. Then, when the post-shift output torque control unit 122 determines that the driving force difference $DF_F$ is larger than or equal to the driving force difference determination value $X_{DF}$, the post-shift output torque control unit 122 executes the shift output torque control after the downshift so as to reduce the driving force difference $DF_F$. Specifically, the post-shift output torque control unit 122 executes a torque down control, in which the throttle valve opening degree $\theta_{TH}$ is reduced irrespective of the throttle valve reference characteristic $L_{AS}$ shown in FIG. 9, and an actual engine torque $T_E$ is increased from the engine torque $T_E$, which is smaller than the engine torque $T_E$ corresponding to the throttle valve reference characteristic $L_{AS}$ as the accelerator operation amount Acc increases, to thereby approach the engine torque $T_E$ corresponding to the throttle valve reference characteristic $L_{AS}$. Thus, the post-shift output torque control, which is the shift output torque control executed after the downshift, is implemented so as to reduce the driving force difference $DF_F$ due to the downshift. For the post-shift output torque control, referring to FIG. 11, a difference in the ordinate axis direction between $P_{15}$ and $P_{16}$ is the driving force difference $DF_F$ due to downshift from the nth gear to the (n−1)th gear. Because the post-shift output torque control unit 122 determines that the driving force difference $DF_F$ is larger than or equal to the driving force difference determination value $X_{DF}$, the post-shift output torque control unit 122 determines a start point $P_{17}$ of the post-shift output torque control (torque down control), which is determined on the basis of a predetermined condition between the base driving force characteristic of the (n−1) gear (current gear) in the (n−1)th gear, which is the gear after the downshift, and the end point $P_{16}$ of the torque up control executed before the downshift. Then, the post-shift output torque control unit 122 increases the driving force $F_{DR}$ from the start point $P_{17}$ as the accelerator operation amount Acc increases to thereby approach the (n−1)th gear (current gear) base driving force characteristic as indicated by $AR_{13}$ in FIG. 11. The method of increasing the driving force $F_{DR}$ in the post-shift output torque control (torque down control) may increase the driving force $F_{DR}$ at a predetermined gradient with respect to the accelerator operation amount Acc, or may increase the driving force $F_{DR}$ so as to linearly connect the start point and an end point of the post-shift output torque control, the end point being set on the (n−1)th (current gear) base driving force characteristic. Note that the post-shift output torque control unit 122 may use the base driving force characteristic, which is obtained by the pre-shift output torque control unit 120, when the torque down control is performed.

Then, as the post-shift output torque control (torque down control) is initiated, the post-shift output torque control unit 122 determines whether the driving force $F_{DR}$ has reached the base driving force characteristic of the (n−1)th gear (current gear). When it is determined that the driving force $F_{DR}$ has reached the base driving force characteristic of the (n−1)th gear (current gear), the post-shift output torque control unit 122 ends the post-shift output torque control (torque down control). During the torque down control, the relationship between the accelerator operation amount Acc and the throttle valve opening degree $\theta_{TH}$ is shifted so that the throttle valve opening degree $\theta_{TH}$ is smaller (arrow $AR_{DN}$ side) with respect to the throttle valve reference characteristic $L_{AS}$ shown in FIG. 9. When the above relationship coincides with the throttle valve reference characteristic $L_{AS}$, the post-shift output torque control unit 122 determines that the driving force $F_{DR}$ has reached the base driving force characteristic of the (n−1)th gear (current gear).

Normally, as the accelerator pedal 50 is depressed, the automatic transmission 10 downshifts gear by gear with an increase in accelerator operation amount Acc. However, when the accelerator pedal 50 is depressed fast, downshift may be performed by two or more gears (multiple downshift). In the multiple downshift as well, as in the case where downshift is performed gear by gear, the shift output torque control unit 118 executes the shift output torque control. When multiple downshift is performed from the nth gear (actual gear) to the (n−2)th gear, which is two gears lower than the actual gear, the pre-shift output torque control unit 120 initiates the pre-shift output torque control from a downshift point $P_{DN}$ that indicates the accelerator operation amount Acc, which is obtained from the shift line map of FIG. 6 and at which downshift from the nth gear to the (n−1)th gear is performed, so as to increase the driving force $F_{DR}$ to approach the base driving force characteristic of the post-shift (n−2)th gear.

When focusing on the relationship between the accelerator operation amount Acc and the throttle valve opening degree $\theta_{TH}$ in the shift output torque control, the shift output torque control adjusts the throttle valve opening degree $\theta_{TH}$ irrespective of the throttle valve reference characteristic $L_{AS}$ shown in FIG. 9 so as to reduce the driving force difference $DF_F$ due to gear shift of the automatic transmission 10. Specifically, in the pre-shift output torque control (torque up control), with reference to the same accelerator operation amount Acc, the actual throttle valve opening degree $\theta_{TH}$ is increased as compared with the throttle valve opening degree $\theta_{TH}$ that is determined on the basis of the throttle valve reference characteristic $L_{AS}$ of FIG. 9. In addition, in the post-shift output torque control (torque down control), with reference to the same accelerator operation amount Acc, the actual throttle valve opening degree $\theta_{TH}$ is reduced as compared with the throttle valve opening degree $\theta_{TH}$ that is determined on the basis of the throttle valve reference characteristic $L_{AS}$ of FIG. 9. In this way, between the torque up control and the torque down control, the point that indicates the relationship between the accelerator operation amount Acc and the throttle valve opening degree $\theta_{TH}$ shifts in opposite directions (arrow $AR_{UP}$ direction or arrow $AR_{DN}$ direction) with respect to the throttle valve reference characteristic $L_{AS}$ of FIG. 9 as a boundary line, so that the torque up control and the torque down control will not be executed in parallel with each other.

Figure 14:
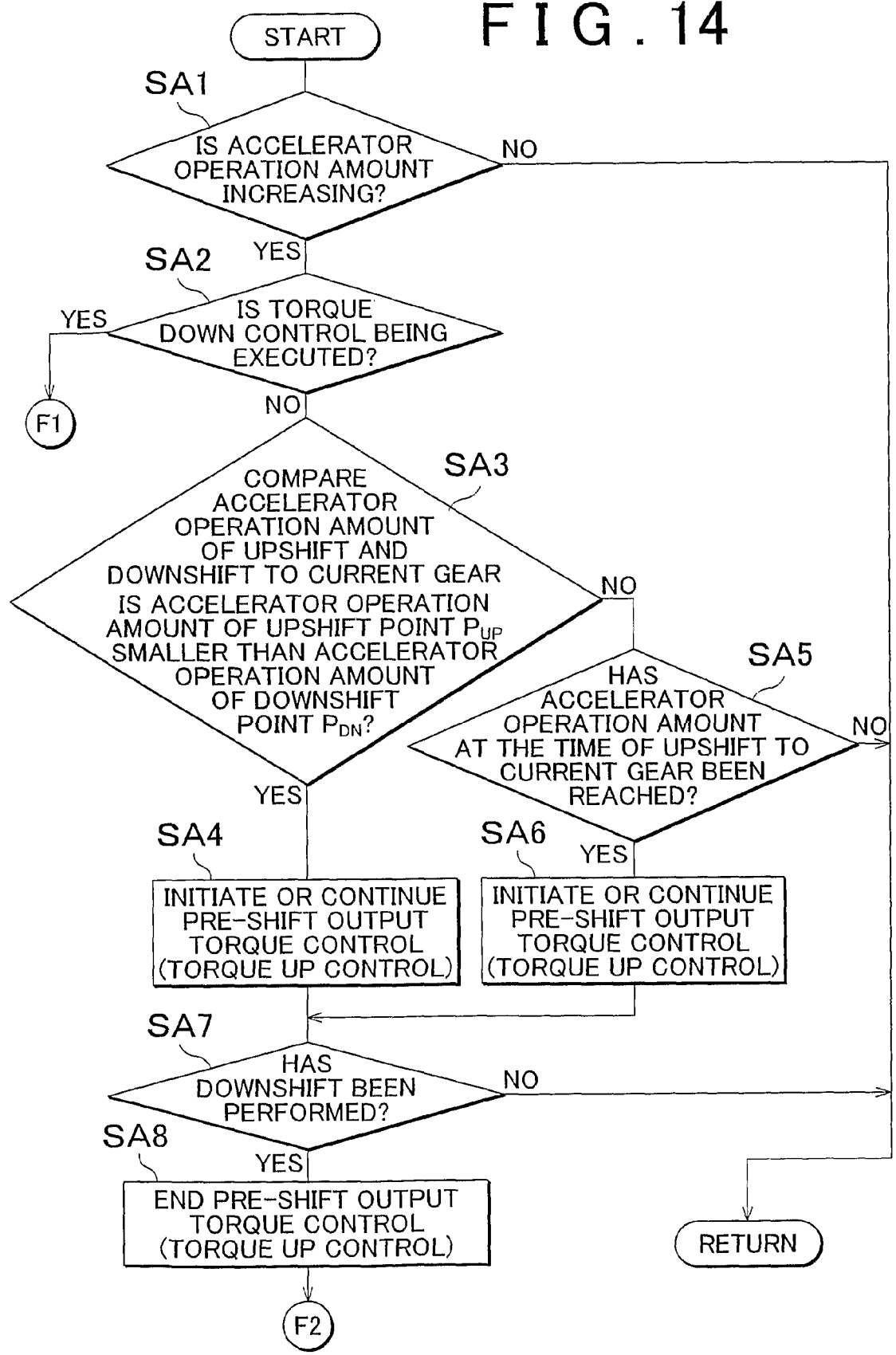
FIG. 14 is a flowchart that illustrates a main control operation of the electronic control device shown in FIG. 4, that is, a control operation that substantially smoothes a variation in driving force during downshift of the automatic transmission in the first embodiment, and is one of a set of two drawings.
Figure 15:
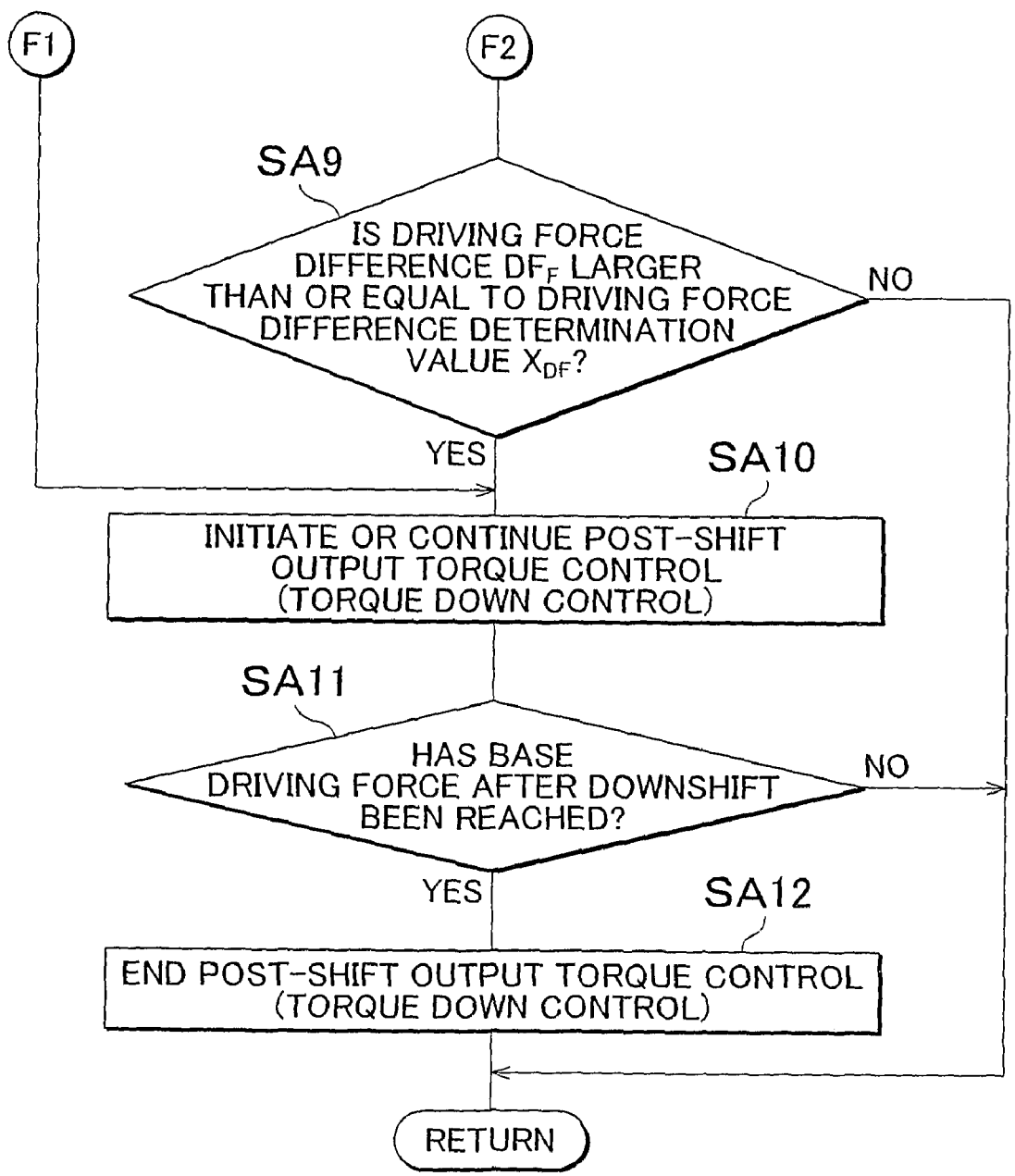
FIG. 15 is a flowchart that illustrates the main control operation of the electronic control device shown in FIG. 4, that is, the control operation that substantially smoothes a variation in driving force during downshift of the automatic transmission in the first embodiment, and is the other one of a set of two drawings.

FIG. 14 and FIG. 15 are a flowchart that illustrates the main control operation of the electronic control unit 90, that is, the control operation to smooth a variation in driving force $F_{DR}$, at the time when the automatic transmission 10 downshifts. The control operation is, for example, repeatedly executed at extremely short intervals about several milliseconds to several tens of milliseconds. Note that the flowchart assumes that the accelerator pedal 50 is depressed, the automatic transmission 10 sequentially and successively downshifts with an increase in accelerator operation amount Acc.

First, in step SA1 (hereinafter, "step" is omitted) corresponding to the accelerator depression speed detector 114 and the accelerator operation amount determination unit 116, the accelerator depression speed $V_{AC}$ is detected, and it is determined, on the basis of the detected accelerator depression speed $V_{AC}$, whether the accelerator operation amount Acc is increasing. When the determination of SA1 is affirmative, that is, when the accelerator operation amount Acc is increasing, the process proceeds to SA2. On the other hand, when the determination of SA1 is negative, the process of the flowchart ends.

In SA2, it is determined whether the torque down control, that is, the post-shift output torque control, is being executed. The above determination is made because the following SA3 to SA8 are steps of executing the torque up control, and the torque up control and the torque down control will not be executed in parallel with each other. When the determination of SA2 is affirmative, that is, when the torque down control is being executed, the process proceeds to SA11. On the other hand, when the determination of SA2 is negative, the process proceeds to SA3.

In SA3, where the current gear (actual gear) is represented by the nth gear, a downshift point $P_{DN}$ that indicates the accelerator operation amount Acc at which the automatic transmission 10 downshifts from the (n+1)th gear to the nth gear (current gear) is compared with an upshift point $P_{UP}$ that indicates the accelerator operation amount Acc at which the automatic transmission 10 upshifts from the (n−1)th gear to the nth gear (current gear). Then, it is determined whether the upshift point $P_{UP}$ is smaller in accelerator operation amount Acc than the downshift point $P_{DN}$. When the determination of SA3 is affirmative, that is, when the upshift point $P_{UP}$ is smaller in accelerator operation amount Acc than the downshift point $P_{DN}$, the process proceeds to SA4. On the other hand, when the determination of SA3 is negative, the process proceeds to SA5.

In SA4, the shift output torque control that is executed through the torque up control before downshift from the nth gear (current gear), that is, the pre-shift output torque control, is initiated. Here, although the start point of the pre-shift output torque control is not specifically limited, in the present embodiment, the pre-shift output torque control is initiated from the downshift point $P_{DN}$. For example, the case in which the current gear (actual gear) of the automatic transmission 10 is the (n+1)th gear will be described with reference to FIG. 11. Because the downshift point $P_{DN}$ is $P_{12}$ in FIG. 11, $P_{12}$ is set for the start point and then the pre-shift output torque control (torque up control) is executed as shown in $AR_{11}$. Note that the end point of the pre-shift output torque control is set to $P_{13}$ in FIG. 11 and the driving force difference $DF_F$ at the time of the downshift is brought close to zero; instead, the end point at the time of the downshift may be lower in driving force than $P_{13}$ as far as the end point is higher in driving force than the base driving force characteristic of the (n+1)th gear (current gear).

In addition, in SA4, when the pre-shift output torque control is being executed, it is continued.

In SA5, it is determined whether the increasing actual accelerator operation amount Acc has reached the accelerator operation amount Acc indicated by the upshift point $P_{UP}$. When the determination of SA5 is affirmative, that is, when the actual accelerator operation amount Acc has reached the accelerator operation amount Acc indicated by the upshift point $P_{UP}$, the process proceeds to SA6. On the other hand, the determination of SA5 is negative, the process of the flowchart ends.

In SA6, the torque up control initiates the shift output torque control that is executed before downshift from the nth gear (current gear), that is, the pre-shift output torque control, is initiated. Here, although the start point of the pre-shift output torque control is not specifically limited, in the present embodiment, the pre-shift output torque control is started immediately when the actual accelerator operation amount Acc has reached the accelerator operation amount Acc indicated by the upshift point $P_{UP}$, that is, from the upshift point $P_{UP}$. For example, the case in which the current gear (actual gear) of the automatic transmission 10 is the nth gear will be described with reference to FIG. 11. Because the upshift point $P_{UP}$ is $P_{14}$ in FIG. 11, $P_{14}$ is set for the start point and then the pre-shift output torque control (torque up control) is executed as shown in $AR_{12}$. Note that SA5 and SA6 are steps that are executed when negative determination is made in SA3, so that where the current gear (actual gear) is the nth gear, when the downshift point $P_{DN}$ from the (n+1)th gear to the nth gear (current gear) is larger in accelerator operation amount Acc than the upshift point $P_{UP}$ from the (n−1)th gear to the nth gear (current gear), SA5 and SA6 will be executed.

In addition, in SA6, when the pre-shift output torque control is being executed, it is continued.

After SA4 or SA6, SA7 is executed. In SA7 corresponding to the shift execution determining unit 117, it is determined whether the automatic transmission 10 has downshifted. When the determination of SA7 is affirmative, that is, when the automatic transmission 10 has downshifted, the process proceeds to SA8. On the other hand, when the determination of SA7 is negative, the process of the flowchart ends.

In SA8, the pre-shift output torque control (torque up control) initiated in SA4 or SA6 is ended. After SA8, the process proceeds to SA9. Note that SA2 to SA6 and SA8 correspond to the pre-shift output torque control unit 120.

In SA9, it is determined whether the driving force difference $DF_F$ due to the downshift of the automatic transmission 10, determined in SA7, is larger than or equal to the predetermined driving force difference determination value $X_{DF}$. For example, a difference in the ordinate axis direction between $P_{15}$ and $P_{16}$ in FIG. 11 is the driving force difference $DF_F$ due to the downshift from the nth gear to the (n−1)th gear, and the difference is compared with the driving force difference determination value $X_{DF}$. when the determination of SA9 is affirmative, that is, when the driving force difference $DF_F$ is larger than or equal to the driving force difference determination value $X_{DF}$, the process proceeds to SA10. On the other hand, when the determination of SA9 is negative, the process of the flowchart ends.

In SA10, the shift output torque control that is executed after the downshift by the torque down control, that is, the post-shift output torque control, is initiated. For example, the case in which the current gear (actual gear) of the automatic transmission 10, that is, the gear after the downshift, is the (n−1)th gear will be described with reference to FIG. 11. $P_{17}$ is set for the start point of the post-shift output torque control (torque down control), and the post-shift output torque control (torque down control) is executed as shown in $AR_{13}$.

In SA10, when the post-shift output torque control is being executed, it is continued.

In SA11, it is determined whether, in the post-shift output torque control initiated in SA10 after the downshift that is determined in SA7, the driving force $F_{DR}$ has reached the base driving force characteristic of the current gear. The relationship between the accelerator operation amount Acc and the throttle valve opening degree $\theta_{TH}$ is shifted by the torque down control so that the throttle valve opening degree $\theta_{TH}$ is smaller (arrow $AR_{DN}$ side) with respect to the throttle valve reference characteristic $L_{AS}$ of FIG. 9. When the above relationship coincides with the throttle valve reference characteristic $L_{AS}$, it may be determined that the driving force $F_{DR}$ has reached the base driving force characteristic of the current gear. When the determination of SA11 is affirmative, that is, when the driving force $F_{DR}$ has reached the base driving force characteristic of the current gear, the process proceeds to SA12. On the other hand, when the determination of SA11 is negative, the process of the flowchart ends.

In SA12, the post-shift output torque control (torque down control) initiated in SA10 is ended. Note that SA9 to SA12 correspond to the post-shift output torque control unit 122.

The electronic control unit 90 according to the present embodiment provides the following advantageous effects (A1) to (A7).

(A1) The shift output torque control unit 118 executes a shift output torque control to adjust the engine torque $T_E$ so as to reduce a driving force difference $DF_F$ (exemplified in FIG. 11), which is a variation width of the driving force $F_{DR}$ due to downshift of the automatic transmission 10. Thus, in comparison with the case in which the shift output torque control is not executed, it is possible to smooth a variation in driving force $F_{DR}$ associated with the downshift. As a result, occupants' comfort and controllability to driving operation may be improved.

(A2) For example, as in the case where the automatic transmission 10 downshifts from the nth gear to the (n−1)th gear in FIG. 11, (a) the shift output torque control is executed before the automatic transmission 10 shifts (downshifts) the gear, and (b) when it is determined that the driving force difference $DF_F$ due to the gear shift (downshift) is larger than or equal to the predetermined driving force difference determination value $X_{DF}$, the shift output torque control is also executed after the gear shift (downshift) so as to reduce the driving force difference $DF_F$. Thus, in comparison with the case in which the shift output torque control is executed only either before or after the automatic transmission 10 shifts (downshifts) gear, it is possible to further reduce the driving force difference $DF_F$.

(A3) In the case in which the current gear is the (n+1)th gear in FIG. 11, the pre-shift output torque control unit 120 compares a downshift point $P_{DN}$ that indicates the accelerator operation amount Acc at which the automatic transmission 10 downshifts from the (n+2)th gear to the (n+1)th gear (current gear) with an upshift point $P_{UP}$ that indicates the accelerator operation amount Acc at which the automatic transmission 10 upshifts from the nth gear to the (n+1)th gear (current gear). In the (n+1)th gear (current gear), the upshift point $P_{UP}$ is smaller in accelerator operation amount Acc than the downshift point $P_{DN}$, so that the pre-shift output torque control unit 120 initiates the shift output torque control at the (n+1)th gear (current gear) from the downshift point $P_{DN}$. Thus, as shown in FIG. 11, an increase in driving force $F_{DR}$ through the shift output torque control ($AR_{11}$ in FIG. 11) is initiated without any influence on both $P_{11}$ which is the upshift point $P_{UP}$ and $P_{12}$ which is the downshift point $P_{DN}$. Thus, it is possible to prevent the shift output torque control at the (n+1)th gear (current gear) from influencing the upshift from the nth gear to the (n+1)th gear, so that it is possible to achieve the upshift according to driver's intention. In addition, because an increase in driving force $F_{DR}$ ($AR_{11}$ in FIG. 11) is initiated from the downshift point $P_{DN}$ ($P_{12}$), the gradient of the increase is made gentle as much as possible, it is possible to smooth a variation in driving force $F_{DR}$ due to the downshift.

(A4) When the current gear is the nth gear, the pre-shift output torque control unit 120 compares a downshift point $P_{DN}$ that indicates the accelerator operation amount Acc at which the automatic transmission 10 downshifts from the (n+1)th gear to the nth gear (current gear) with an upshift point $P_{UP}$ that indicates the accelerator operation amount Acc at which the automatic transmission 10 upshifts from the (n−1)th gear to the nth gear (current gear). In the nth gear (current gear) in FIG. 11, because the upshift point $P_{UP}$ ($P_{14}$ in FIG. 11) is larger in accelerator operation amount Acc than the downshift point $P_{DN}$ ($P_{13}$ in FIG. 11), the pre-shift output torque control unit 120 initiates the shift output torque control at the nth gear (current gear) from the upshift point $P_{UP}$ ($P_{14}$). Thus, as shown in FIG. 11, an increase in driving force $F_{DR}$ through the shift output torque control ($AR_{12}$ in FIG. 11) is initiated without any influence on both the upshift point $P_{UP}$ ($P_{14}$) and the downshift point $P_{DN}$ ($P_{13}$). Thus, it is possible to prevent the shift output torque control at the nth gear (current gear) from influencing the upshift from the (n−1)th gear to the nth gear, so that it is possible to achieve the upshift according to driver's intention. In addition, because an increase in driving force $F_{DR}$ ($AR_{12}$ in FIG. 11) is initiated from the upshift point $P_{DN}$ ($P_{14}$), the gradient of the increase is made gentle as much as possible, it is possible to smooth a variation in driving force $F_{DR}$ due to the downshift.

(A5) Where the actual gear of the automatic transmission 10 is the nth gear, when multiple downshift is performed from the nth gear (actual gear) to the (n−2)th gear, which is two gears lower than the nth gear, the pre-shift output torque control unit 120 initiates the pre-shift output torque control from the downshift point $P_{DN}$ that indicates the accelerator operation amount Acc, which is obtained from the shift line map of FIG. 6 and at which the automatic transmission 10 downshifts from the nth gear (actual gear) to the (n−1)th gear, so as to increase the driving force $F_{DR}$ to approach the base driving force characteristic of the post-shift (n−2)th gear. Thus, for multiple downshift, such as downshift from the nth gear to the (n−2)th gear, as well, it is possible to smooth a variation in driving force due to the multiple downshift by executing the pre-shift output torque control.

(A6) The shift output torque control adjusts the throttle valve opening degree $\theta_{TH}$. That is, the throttle valve reference characteristic $L_{AS}$ of FIG. 9 is a predetermined relationship between the accelerator operation amount Acc and the throttle valve opening degree $\theta_{TH}$ in one-to-one correspondence with each other, and the shift output torque control adjusts the throttle valve opening degree $\theta_{TH}$ irrespective of the throttle valve reference characteristic $L_{AS}$ of FIG. 9 so as to reduce the driving force difference $DF_F$ that arises when the automatic transmission 10 shifts gear. Specifically, in the pre-shift output torque control (torque up control), with reference to the same accelerator operation amount Acc, the actual throttle valve opening degree $\theta_{TH}$ is increased as compared with the throttle valve opening degree $\theta_{TH}$ that is determined on the basis of the throttle valve reference characteristic $L_{AS}$ of FIG. 9. In addition, in the post-shift output torque control (torque down control), with reference to the same accelerator operation amount Acc, the actual throttle valve opening degree $\theta_{TH}$ is reduced as compared with the throttle valve opening degree $\theta_{TH}$ that is determined on the basis of the throttle valve reference characteristic $L_{AS}$ of FIG. 9. Thus, in the shift output torque control, it is possible to easily adjust the engine torque $T_E$ to vary the driving force $F_{DR}$ by adjusting the electronic throttle valve 56.

(A7) The driver, when intends to increase the driving force $F_{DR}$, depresses the accelerator pedal 50 and, as a result, downshift is performed. In the pre-shift output torque control (torque up control), the driving force $F_{DR}$ is increased before the automatic transmission 10 downshifts so that the driving force $F_{DR}$ approaches the driving force $F_{DR}$ after the downshift, as shown in $AR_{11}$ and $AR_{12}$ in FIG. 11. Here, when a desired driving force $F_{DR}$ is attained before downshift owing to the increase in driving force $F_{DR}$ through the pre-shift output torque control, the depression of the accelerator pedal 50 is stopped and, eventually, downshift will not be performed. Thus, gear shift of the automatic transmission 10 is less frequently performed and, as a result, operability may be improved.

Next, another embodiment of the invention will be described. Note that, in the following description, like reference numerals are assigned to like components among the embodiments, and description thereof will not be repeated.

A second embodiment will now be described. The second embodiment differs from the first embodiment in that the electronic control unit 90 is replaced with an electronic control unit 220. The functional block diagram shown in FIG. 8 is common to the first and second embodiments. Then, the second embodiment differs from the first embodiment in that the accelerator operation amount determination unit 116 and the post-shift output torque control unit 122 are respectively replaced with an accelerator operation amount determination unit 221 and a post-shift output torque control unit 222. Hereinafter, the difference will be mainly described.

Referring to FIG. 8, the post-shift output torque control unit 222, as well as the post-shift output torque control unit 122 of the first embodiment, executes, after the automatic transmission 10 downshifts, the shift output torque control, that is, the post-shift output torque control (torque down control), so as to reduce the driving force difference $DF_F$ due to the downshift. Then, the post-shift output torque control unit 222 determines the start point on the basis of the following condition, in addition to the condition that the post-shift output torque control unit 122 of the first embodiment determines the start point of the post-shift output torque control ($P_{17}$ in FIG. 11).

Where the current gear (actual gear) of the automatic transmission 10 is the (n−1)th gear, the post-shift output torque control unit 222 sets the driving force $F_{DR}$ at the (n−1)th gear (current gear) at the time when the automatic transmission 10 upshifts from the (n−1)th gear (current gear) to the nth gear for a lower limit $LF_{DR}$ of the driving force $F_{DR}$ in the post-shift output torque control (torque down control). That is, the post-shift output torque control unit 222 determines a start point of the post-shift output torque control so that the driving force $F_{DR}$ at the start point is not lower than the lower limit $LF_{DR}$ of the driving force $F_{DR}$.

The post-shift output torque control that is executed, where the current gear (actual gear) is the (n−1)th gear, after the automatic transmission 10 downshifts from the nth gear to the (n−1)th gear (current gear) will be described with reference to FIG. 16 of the present embodiment, which corresponds to FIG. 11 of the first embodiment. First, the post-shift output torque control unit 222 predicts an accelerator operation amount Acc1 (FIG. 16) at which the automatic transmission 10 upshifts from the (n−1)th gear (current gear) to the nth gear on the basis of the shift line map of FIG. 6 on the assumption that, for example, the current vehicle speed V remains constant, and sets the driving force $F_{DR}$ (pre-upshift driving force) on the base driving force characteristic of the (n−1)th gear (current gear) corresponding to the accelerator operation amount Acc1 for the lower limit $LF_{DR}$. Subsequently, the post-shift output torque control unit 222 determines $P_{22}$ corresponding to the lower limit $LF_{DR}$ as the start point of the post-shift output torque control (torque down control). However, in order to avoid reduction in driving force $F_{DR}$ despite an increase in accelerator operation amount Acc, when an end point of the pre-shift output torque control (torque up control) is higher in driving force than the lower limit $LF_{DR}$, the end point is set to the start point of the post-shift output torque control.

Figure 16:
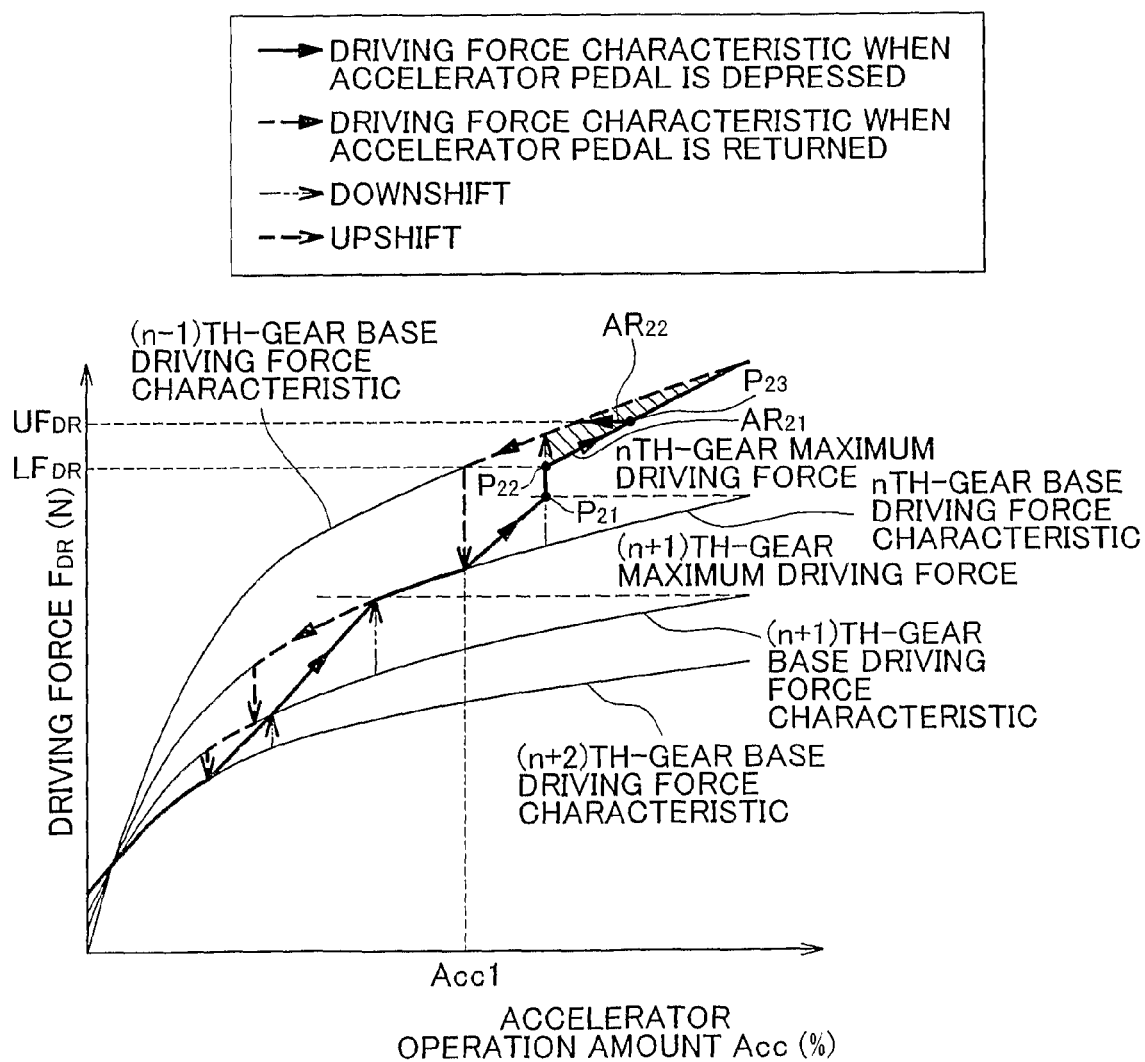
FIG. 16 is a view that illustrates a variation in driving force with respect to a variation in accelerator operation amount when the vehicle automatic transmission shown in FIG. 1 shifts gear in a second embodiment of the invention, and that also illustrates a variation in driving force when shift output torque control is executed, which corresponds to FIG. 11.

Then, the post-shift output torque control unit 222, as well as the post-shift output torque control unit 122 of the first embodiment, initiates the post-shift output torque control (torque down control) from the start point $P_{22}$ as shown by $AR_{21}$ in FIG. 16.

The accelerator operation amount Acc, which has been increasing during the post-shift output torque control (during the torque down control), may turn to a decrease. In this case, although the first embodiment does not specifically provide any limitations, the post-shift output torque control unit 222 of the present embodiment varies the driving force $F_{DR}$ with a certain limitation. Hereinafter, this will be described.

During execution of the shift output torque control that is executed, after the automatic transmission 10 downshifts, to reduce the driving force difference $DF_F$ due to the downshift, that is, during the execution of the post-shift output torque control (torque down control), when the accelerator pedal 50 is returned to reduce the accelerator operation amount Acc, the post-shift output torque control unit 222 sets the driving force $F_{DR}$, at the time the accelerator pedal 50 is returned, for an upper limit $UF_{DR}$ of the driving force $F_{DR}$.

The case in which the accelerator pedal 50 is returned at $P_{23}$ of FIG. 16 during the post-shift output torque control (during torque down control) and the accelerator operation amount Acc, which has been increasing so far, turns to a decrease, will be specifically described.

The accelerator operation amount determination unit 221, as well as the accelerator operation amount determination unit 116 of the first embodiment, determines, on the basis of the accelerator depression speed $V_{AC}$, whether the accelerator operation amount Acc is increasing. Furthermore, the accelerator operation amount determination unit 221 determines whether the accelerator operation amount Acc is decreasing.

When two conditions, that is, (1) the post-shift output torque control (torque down control) is being executed, and (2) the accelerator operation amount determination unit 221 has determined that the accelerator operation amount Acc is decreasing, are both satisfied, the post-shift output torque control unit 222 sets a driving force $F_{DR}$ indicated by $P_{23}$ at which the accelerator operation amount Acc turns to a decrease, that is, a driving force $F_{DR}$ at the time when the accelerator pedal 50 is returned, for an upper limit $UF_{DR}$ of the driving force $F_{DR}$. Then, with a decrease in accelerator operation amount Acc, the post-shift output torque control unit 222 limits the driving force $F_{DR}$ to the upper limit $UF_{DR}$ or below while returning the relationship between the accelerator operation amount Acc and the driving force $F_{DR}$ to the base driving force characteristic of the (n−1)th gear (current gear) as shown by $AR_{22}$ in FIG. 16. As for a method of limiting the driving force $F_{DR}$ to the upper limit $UF_{DR}$ or below, for example, as shown in FIG. 9, the relationship between the accelerator operation amount Acc and the throttle valve opening degree $\theta_{TH}$ is varied to the throttle valve reference characteristic $L_{AS}$ as shown by $AR_2$ (FIG. 9) so that the throttle valve opening degree $\theta_{TH}$ does not increase from $P_{23}$ of FIG. 9 corresponding to $P_{23}$ of FIG. 16.

The flowchart that shows a main control operation of the electronic control unit 220 according to the present embodiment will be described. The flowchart of the first embodiment shown in FIG. 14 and FIG. 15 also applies to the electronic control unit 220 of the present embodiment; however, portion of the flowchart is replaced with the flowchart shown in FIG. 17 as will be described below.

Figure 17:
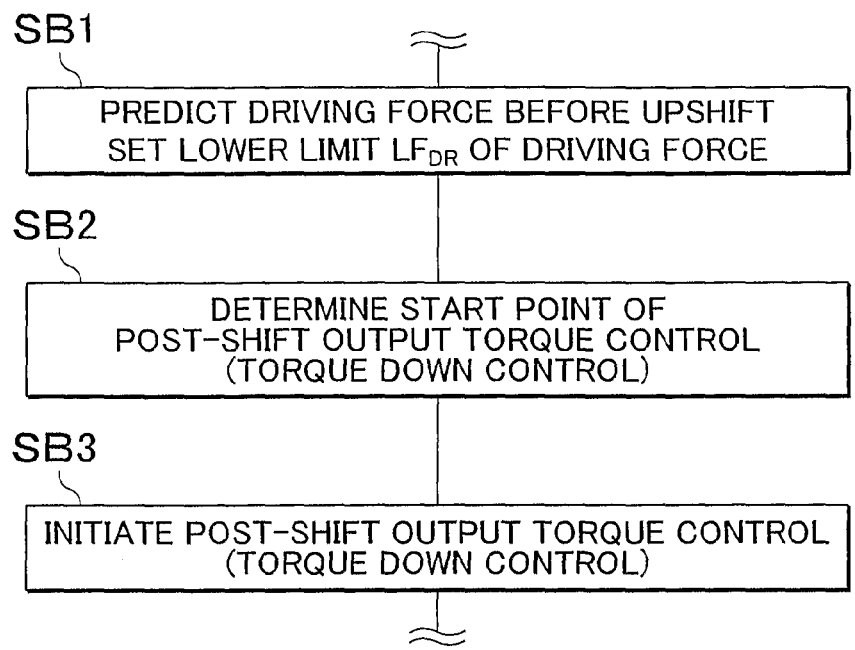
FIG. 17 is a flowchart that illustrates a major control operation of the electronic control device shown in FIG. 4 in the second embodiment of the invention and replaces portion of the flowchart shown in FIG. 15.

When the post-shift output torque control is initiated in SA10 in FIG. 15, SA10 is replaced with SB1 to SB3 shown in FIG. 17. Note that when the post-shift output torque control is being executed, it is continued. Hereinafter, the case in which the current gear (actual gear) is the (n−1)th gear in FIG. 16 will be described as an example.

In SB1, an accelerator operation amount Acc1 (FIG. 16) at which the automatic transmission 10 upshifts from the (n−1)th gear (current gear) to the nth gear on the basis of the shift line map of FIG. 6 is predicted on the assumption that, for example, the current vehicle speed V remains constant, and the driving force $F_{DR}$ (pre-upshift driving force) on the base driving force characteristic of the (n−1)th gear (current gear) corresponding to the accelerator operation amount Acc1 is set for the lower limit $LF_{DR}$ of the driving force $F_{DR}$.

In SB2 subsequent to SB1, $P_{22}$ corresponding to the lower limit $LF_{DR}$ is determined as the start point of the post-shift output torque control (torque down control). However, when an end point of the pre-shift output torque control (torque up control) is higher in driving force than the lower limit $LF_{DR}$, the end point is set to the start point of the post-shift output torque control.

In SB3 subsequent to SB2, the post-shift output torque control (torque down control) is initiated from the start point $P_{22}$ as shown by $AR_{21}$ in FIG. 16. Note that SB1 to SB3 correspond to the post-shift output torque control unit 222.

Figure 18:
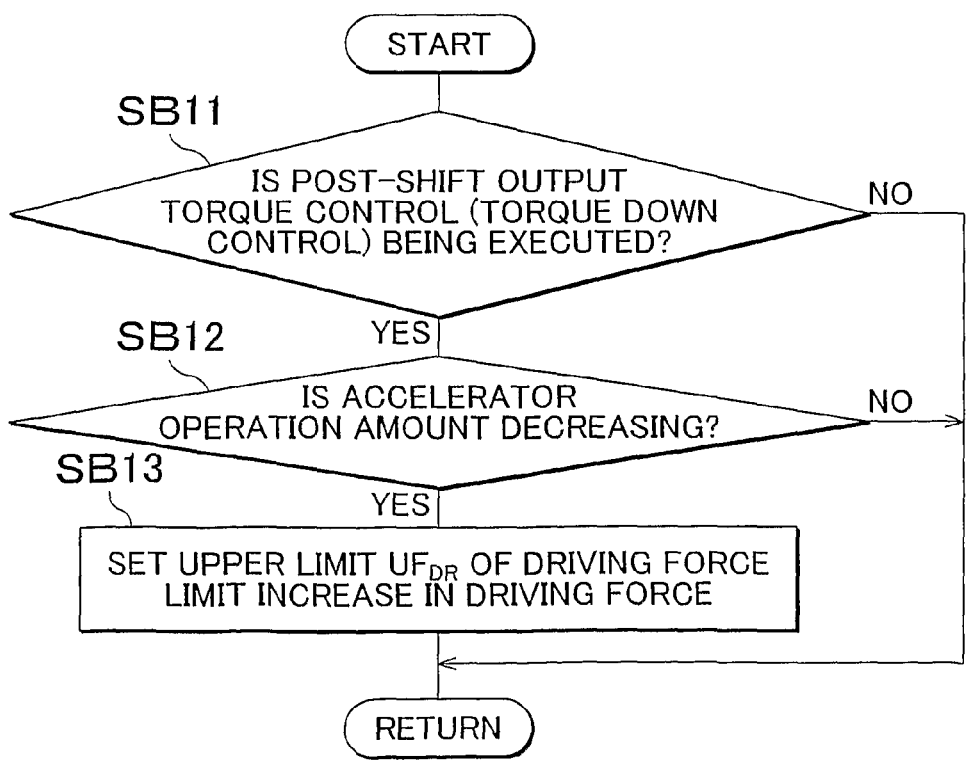
FIG. 18 is a flowchart that illustrates a control operation when an accelerator pedal is returned during a major control operation of the electronic control device shown in FIG. 4, that is, during the shift output torque control in the second embodiment of the invention and is different from the flowchart shown in FIG. 17.

FIG. 18 is a flowchart that illustrates a control operation when the accelerator pedal 50 is returned during the major control operation of the electronic control unit 220, that is, during the post-shift output torque control. The control operation is, for example, repeatedly executed at extremely short intervals about several milliseconds to several tens of milliseconds. Note that the flowchart shown in FIG. 18 may be executed only when the determination is negative in SA1 in FIG. 14. Hereinafter, the case in which the current gear (actual gear) is the (n−1)th gear in FIG. 16 will be described as an example.

In SB11, it is determined whether the post-shift output torque control (torque down control) is being executed. When the determination in SB11 is affirmative, that is, when the post-shift output torque control is being executed, the process proceeds to SB12. On the other hand, when the determination of SB11 is negative, the process of the flowchart ends.

In SB12 corresponding to the accelerator depression speed detector 114 and the accelerator operation amount determination unit 221, the accelerator depression speed $V_{AC}$ is detected, and it is determined whether the accelerator operation amount Acc is decreasing on the basis of the accelerator depression speed $V_{AC}$. When the determination in SB12 is affirmative, that is, when the accelerator operation amount Acc is decreasing, the process proceeds to SB13. On the other hand, when the determination of SB 12 is negative, the process of the flowchart ends.

In SB13, referring to FIG. 16, a driving force $F_{DR}$ indicated by $P_{23}$ at which the accelerator operation amount Acc turns to a decrease, that is, a driving force $F_{DR}$ at the time when the accelerator pedal 50 is returned, is set for an upper limit of the driving force $F_{DR}$. Then, with a decrease in accelerator operation amount Acc, the driving force $F_{DR}$ is limited to the upper limit $UF_{DR}$ or below while, as shown by $AR_{22}$ in FIG. 16, the relationship between the accelerator operation amount Acc and the driving force $F_{DR}$ is returned to the base driving force characteristic of the (n−1)th gear (current gear). Note that SB11 and SB13 correspond to the post-shift output torque control unit 222.

The electronic control unit 220 according to the present embodiment provides the following advantageous effects (B1) and (B2) in addition to the advantageous effects (A1) to (A7) of the first embodiment.

(B1) Where the current gear (actual gear) of the automatic transmission 10 is the (n−1)th gear, the post-shift output torque control unit 222 sets the driving force $F_{DR}$ at the (n−1)th gear (current gear) at the time when the automatic transmission 10 upshifts from the (n−1)th gear (current gear) to the nth gear for a lower limit $LF_{DR}$ of the driving force $F_{DR}$ in the post-shift output torque control (torque down control). That is, the post-shift output torque control unit 222 determines a start point of the post-shift output torque control so that the driving force $F_{DR}$ at the start point is not lower than the lower limit $LF_{DR}$ of the driving force $F_{DR}$. Thus, even when the accelerator operation amount Acc, which has been increasing, turns to a decrease at the start point, there is no possibility that the driving force $F_{DR}$ increases despite a decrease in accelerator operation amount Acc. Thus, by preventing the post-shift output torque control from influencing the upshift from the (n−1)th gear (current gear) to the nth gear, it is possible to achieve the upshift according to driver's intention.

(B2) When the accelerator pedal 50 is returned to reduce the accelerator operation amount Acc during execution of the post-shift output torque control (torque down control), the post-shift output torque control unit 222 sets a driving force $F_{DR}$, at the time when the accelerator pedal 50 is returned, for an upper limit $UF_{DR}$ of the driving force $F_{DR}$. Then, with a decrease in accelerator operation amount Acc, the post-shift output torque control unit 222 limits the driving force $F_{DR}$ to the upper limit $UF_{DR}$ or below while returning the relationship between the accelerator operation amount Acc and the driving force $F_{DR}$ to the base driving force characteristic of the current gear (the (n−1)th gear in FIG. 16) as shown by $AR_{22}$ in FIG. 16. Thus, it is possible to prevent a variation in driving force against driver's intension, that is, an increase in driving force $F_{DR}$ despite the accelerator pedal 50 being returned.

Note that the control operation described in the present embodiment is applicable not only to the case when downshift is performed gear by gear but also to the case when the above described multiple downshift occurs.

Figure 19:
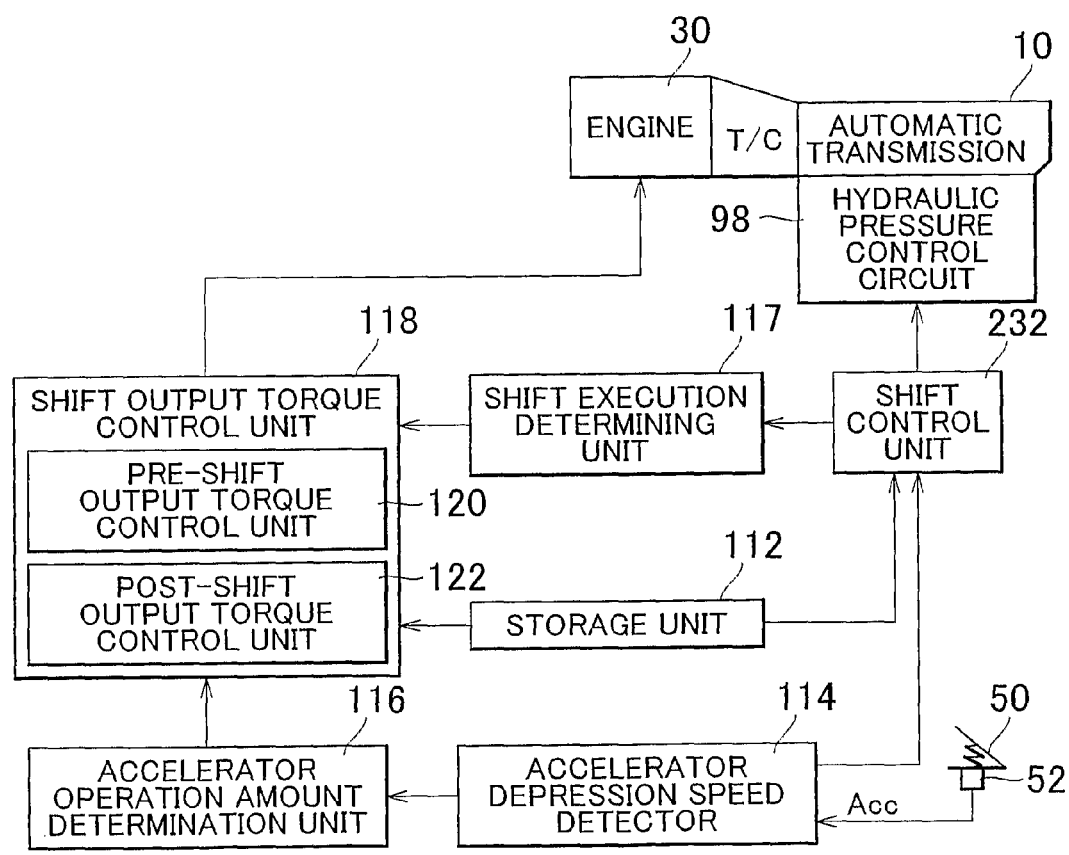
FIG. 19 is a functional block diagram that illustrates major control functions of the electronic control device shown in FIG. 4 in a third embodiment of the invention, and corresponds to the functional block diagram shown in FIG. 8.

A third embodiment will now be described. The third embodiment differs from the first embodiment in that the electronic control unit 90 is replaced with an electronic control unit 230. FIG. 19 is a functional block diagram that illustrates major control functions of the electronic control unit 230. FIG. 19 differs from FIG. 8, which is the functional block diagram of the first embodiment, in that the shift control unit 110 is replaced with a shift control unit 232, and the arrow extending from the accelerator depression speed detector 114 is directed toward the shift control unit 232. The other portions are the same as those of FIG. 8. Hereinafter, the difference will be mainly described.

The shift control unit 232 of FIG. 19, as well as the shift control unit 110 of the first embodiment, executes gear shift control on the automatic transmission 10. Furthermore, the shift control unit 232 acquires the accelerator depression speed $V_{AC}$ from the accelerator depression speed detector 114. Then, the shift control unit 232 changes the downshift point $P_{DN}$ that indicates the accelerator operation amount Acc at which the automatic transmission 10 downshifts on the basis of the acquired accelerator depression speed $V_{AC}$. This will be specifically described with reference to FIG. 20 corresponding to FIG. 11 of the first embodiment by taking the case in which the current gear (actual gear) of the automatic transmission 10 is the (n+1)th gear in FIG. 20 as an example.

First, the shift control unit 232 determines a gear shift point variation range $RP_{DN}$ that is a range in which the downshift point $P_{DN}$ may be changed. The gear shift point variation range $RP_{DN}$ will be described. The shift control unit 232 sets an accelerator operation amount Acc4 at which, when the automatic transmission 10 downshifts from the (n+1)th gear (current gear) to the nth gear, the driving force $F_{DR}$ at the time of gear shift (downshift) at the nth gear becomes the maximum driving force FMAX1 that can be generated at the (n+1)th gear (current gear) for an upper limit of the gear shift point variation range $RP_{DN}$, that is, sets an accelerator operation amount Acc4 indicated by $P_{31}$, which is the intersection of the nth gear base driving force characteristic and $L_{31}$ that indicates the maximum driving force FMAX1 in FIG. 20, for an upper limit of the gear shift point variation range $RP_{DN}$. In addition, the shift control unit 232 sets the larger one (accelerator operation amount Acc2 in FIG. 20) of an accelerator operation amount Acc1 at which the automatic transmission 10 upshifts from the nth gear to the (n+1)th gear (current gear) and an accelerator operation amount Acc2 at which the automatic transmission 10 downshifts from the (n+2)th gear to the (n+1)th gear (current gear), for a lower limit of the gear shift point variation range $RP_{DN}$.

As the shift control unit 232 determines the gear shift point variation range $RP_{DN}$, the shift control unit 232 shifts the downshift point $P_{DN}$ so as to reduce the accelerator operation amount Acc within the gear shift point variation range $RP_{DN}$ as the accelerator depression speed $V_{AC}$ increases. When shifting the downshift point $P_{DN}$, the shift control unit 232 may continuously shift the downshift point $P_{DN}$ or may shift the downshift point $P_{DN}$ in a stepwise manner, in accordance with a variation in accelerator depression speed $V_{AC}$. In addition, when the accelerator pedal 50 is depressed gently so that the accelerator depression speed $V_{AC}$ is smaller than a predetermined value, the downshift point $P_{DN}$ is shifted so as to increase the accelerator operation amount Acc; otherwise, that is, when the accelerator pedal 50 is depressed fast so that the accelerator depression speed $V_{AC}$ is larger than or equal to the predetermined value, normal downshift may be performed in accordance with the shift line map of FIG. 6, that is, without shifting the downshift point $P_{DN}$ from the reference shift line map.

Figure 20:
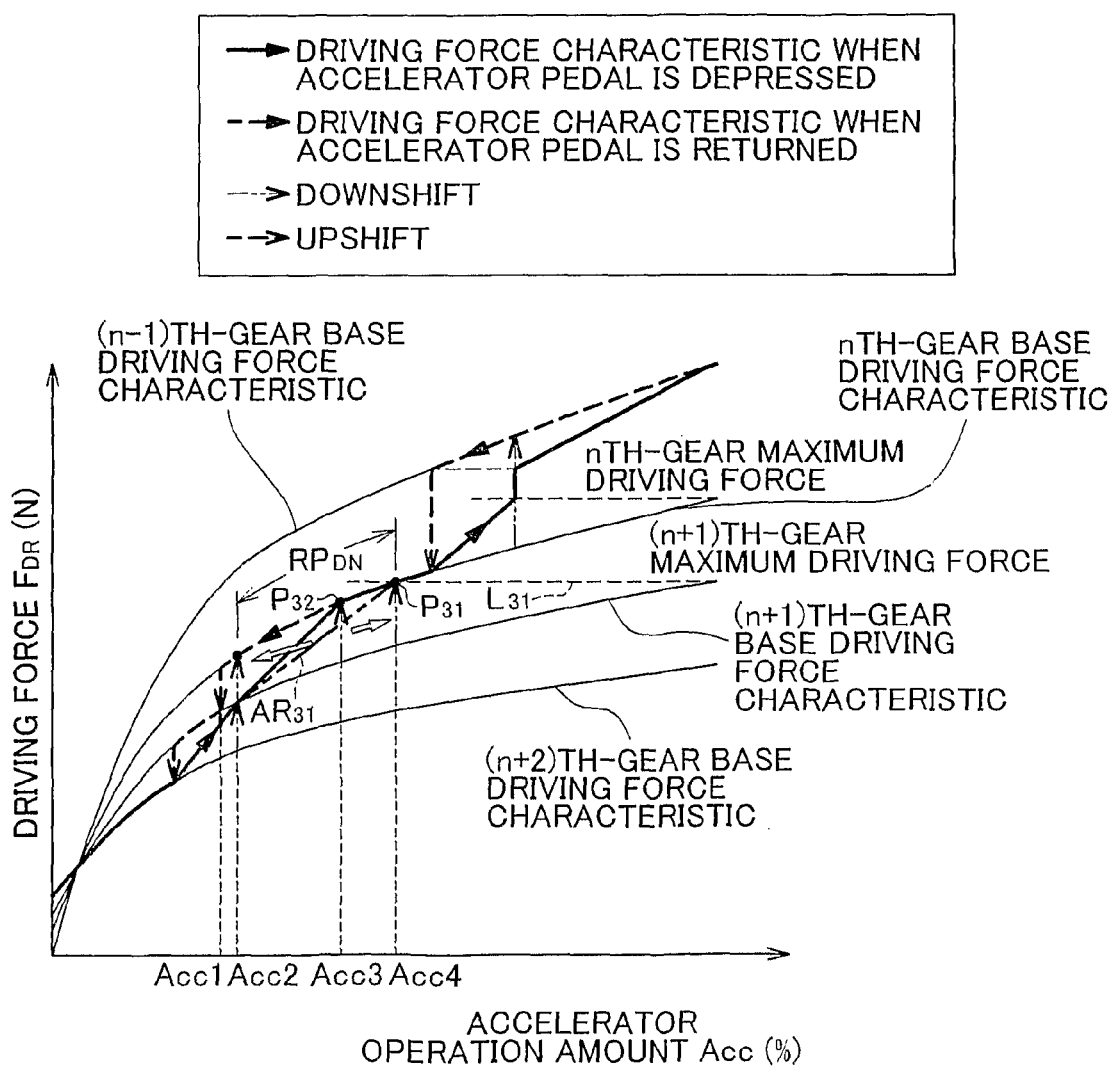
FIG. 20 is a view that illustrates a variation in driving force with respect to a variation in accelerator operation amount when the vehicle automatic transmission shown in FIG. 1 shifts gear in the third embodiment of the invention, and that also illustrates a variation in driving force when shift output torque control is executed, which corresponds to FIG. 11.

The pre-shift output torque control unit 120 is similar to the first embodiment; however, when the downshift point $P_{DN}$ is shifted as described above, the end point of the pre-shift output torque control is varied accordingly. Referring to FIG. 20, when downshift is performed in accordance with the shift line map of FIG. 6 without shifting the downshift point $P_{DN}$, for example, downshift is initiated at an accelerator operation amount Acc3, and $P_{32}$ in FIG. 20 is set as the end point of the pre-shift output torque control. When the downshift point $P_{DN}$ is shifted to $P_{31}$ in FIG. 20, the pre-shift output torque control unit 120 sets $P_{31}$ for the end point and increases the driving force $F_{DR}$ as shown by $AR_{31}$. Note that when the downshift point $P_{DN}$ is shifted not on the basis of the accelerator depression speed $V_{AC}$, that is, for example, when the downshift point $P_{DN}$ is shifted through other control as well, the pre-shift output torque control unit 120 makes the end point of the pre-shift output torque control follow the downshift point $P_{DN}$. Furthermore, when the accelerator pedal 50 is depressed fast so that the accelerator depression speed $V_{AC}$ is larger than or equal to a predetermined value, in order to rapidly increase the driving force $F_{DR}$, the post-shift output torque control unit 122 may be configured not to execute the post-shift output torque control (torque down control).

In addition, not only in the case where downshift is performed gear by gear but also in the multiple downshift, the shift control unit 232 changes the downshift point $P_{DN}$ of the automatic transmission 10 on the basis of the accelerator depression speed $V_{AC}$. In the multiple downshift, the pre-shift output torque control unit 120 and the post-shift output torque control unit 122 may be configured not to execute the pre-shift output torque control (torque up control) and the post-shift output torque control (torque down control), respectively.

Figure 21:
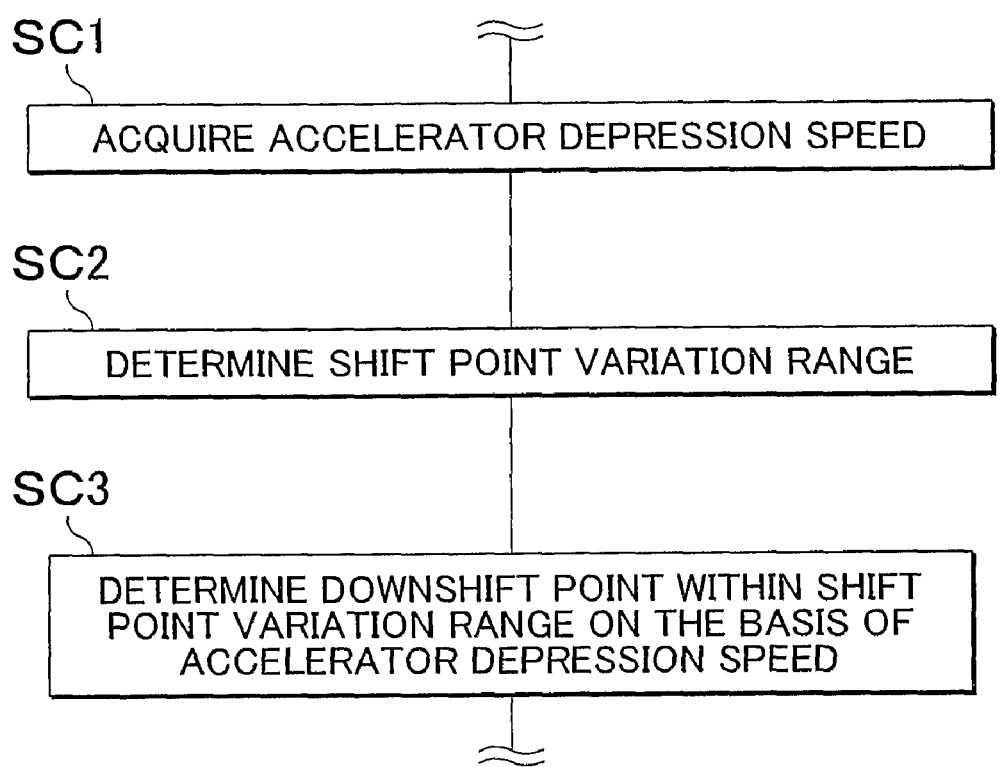
FIG. 21 is a flowchart that illustrates a major control operation of the electronic control device shown in FIG. 4 in the second embodiment of the invention and replaces portion of the flowchart shown in FIG. 14.

The flowchart that shows a main control operation of the electronic control unit 230 according to the present embodiment will be described. The flowchart of the first embodiment shown in FIG. 14 and FIG. 15 also applies to the electronic control unit 230 of the present embodiment; however, in the present embodiment, SC1 to SC3 of FIG. 21 are inserted between SA2 and SA3 of FIG. 14. Note that the following description of the flowchart will be made with reference to FIG. 20 by taking the case in which the current gear (actual gear) of the automatic transmission 10 is the (n+1)th gear as an example.

When the determination of SA2 in FIG. 14 is negative, the process proceeds to SC1 in FIG. 21. In SC1, the accelerator depression speed $V_{AC}$ is acquired. After SC1, the process proceeds to SC2.

In SC2, the gear shift point variation range $RP_{DN}$ is determined. In this case, an accelerator operation amount Acc4 at which, when the automatic transmission 10 downshifts from the (n+1)th gear (current gear) to the nth gear, the driving force $F_{DR}$ at the time of gear shift (downshift) at the nth gear becomes the maximum driving force FMAX1 that can be generated at the (n+1)th gear (current gear) is set for an upper limit of the gear shift point variation range $RP_{DN}$, that is, an accelerator operation amount Acc4 indicated by $P_{31}$, which is the intersection of the nth gear base driving force characteristic and $L_{31}$ that indicates the maximum driving force FMAX1 in FIG. 20, is set for an upper limit of the gear shift point variation range $RF'_{DN}$. In addition, the larger one (accelerator operation amount Acc2 in FIG. 20) of an accelerator operation amount Acc1 at which the automatic transmission 10 upshifts from the nth gear to the (n+1)th gear (current gear) and an accelerator operation amount Acc2 at which the automatic transmission 10 downshifts from the (n+2)th gear to the (n+1)th gear (current gear), is set for a lower limit of the gear shift point variation range $RP_{DN}$. After SC2, the process proceeds to SC3.

In SC3, the downshift point $P_{DN}$ is shifted so as to reduce the accelerator operation amount Acc within the gear shift point variation range $RP_{DN}$ as the accelerator depression speed $V_{AC}$ increases, thus determining the downshift point $P_{DN}$. After SC3, the process proceeds to SA3 in FIG. 14. Note that SC1 to SC3 correspond to the shift control unit 232.

In SA4 or SA6 in FIG. 14, the pre-shift output torque control (torque up control) is initiated as in the case of the first embodiment; however, when the downshift point $P_{DN}$ is shifted, the end point of the pre-shift output torque control is changed accordingly. Referring to FIG. 20, when downshift is performed in accordance with the shift line map of FIG. 6 without shifting the downshift point $P_{DN}$, for example, downshift is initiated at an accelerator operation amount Acc3, and $P_{32}$ in FIG. 20 is set for the end point of the pre-shift output torque control. When the downshift point $P_{DN}$ is shifted to $P_{31}$ in FIG. 20, the $P_{31}$ is set for the end point and the pre-shift output torque control (torque up control) is initiated to increase the driving force $F_{DR}$ as shown by $AR_{31}$.

The electronic control unit 230 according to the present embodiment provides the following advantageous effects (C1) to (C3) in addition to the advantageous effects (A1) to (A7) of the first embodiment.

(C1) The shift control unit 232 changes the downshift point $P_{DN}$ that indicates the accelerator operation amount Acc at which the automatic transmission 10 downshifts on the basis of the acquired accelerator depression speed $V_{AC}$. Thus, it is possible to early obtain a driving force requested by the driver.

(C2) When the current gear (actual gear) of the automatic transmission 10 is the (n+1)th gear, the shift control unit 232 determines the gear shift point variation range $RP_{DN}$ in which the downshift point $P_{DN}$ may be changed. Specifically, the shift control unit 232 sets an accelerator operation amount Acc4 at which, when the automatic transmission 10 downshifts from the (n+1)th gear (current gear) to the nth gear in FIG. 20, the driving force $F_{DR}$ at the time of gear shift (downshift) at the nth gear becomes the maximum driving force FMAX1 that can be generated at the (n+1)th gear (current gear) for an upper limit of the gear shift point variation range $RP_{DN}$, that is, sets an accelerator operation amount Acc4 indicated by $P_{31}$, which is the intersection of the nth gear base driving force characteristic and $L_{31}$ that indicates the maximum driving force FMAX1 in FIG. 20, for an upper limit of the gear shift point variation range $RP_{DN}$. In addition, the shift control unit 232 sets the larger one (accelerator operation amount Acc2 in FIG. 20) of an accelerator operation amount Acc1 at which the automatic transmission 10 upshifts from the nth gear to the (n+1)th gear (current gear) and an accelerator operation amount Acc2 at which the automatic transmission 10 downshifts from the (n+2)th gear to the (n+1)th gear (current gear), for a lower limit of the gear shift point variation range $RP_{DN}$. Then, as the shift control unit 232 determines the gear shift point variation range $RP_{DN}$, the shift control unit 232 shifts the downshift point $P_{DN}$ so as to reduce the accelerator operation amount Acc within the gear shift point variation range $RP_{DN}$ as the accelerator depression speed $V_{AC}$ increases. That is, as the accelerator depression speed $V_{AC}$ increases, downshift is more early initiated to early increase the driving force $F_{DR}$, whereas as the accelerator depression speed $V_{AC}$ decreases, downshift is not initiated until the accelerator pedal 50 is further depressed. Thus, it is possible to reduce the frequency of gear shift by the pre-shift output torque control (torque up control) that is executed before the automatic transmission 10 downshifts from the (n+1)th gear (current gear) to the nth gear. In addition, even when the downshift point $P_{DN}$ is shifted to the lower limit of the gear shift point variation range $RP_{DN}$, it is possible to prevent the shifted downshift point $P_{DN}$ from influencing the upshift from the nth gear to the (n+1)th gear (current gear).

(C3) In the multiple downshift, the pre-shift output torque control unit 120 and the post-shift output torque control unit 122 may be configured not to execute the pre-shift output torque control (torque up control) and the post-shift output torque control (torque down control), respectively. In that case, it is possible to have the driver feel so that the driving force $F_{DR}$ responsively varies to the operation of the accelerator pedal 50.

Figure 22:
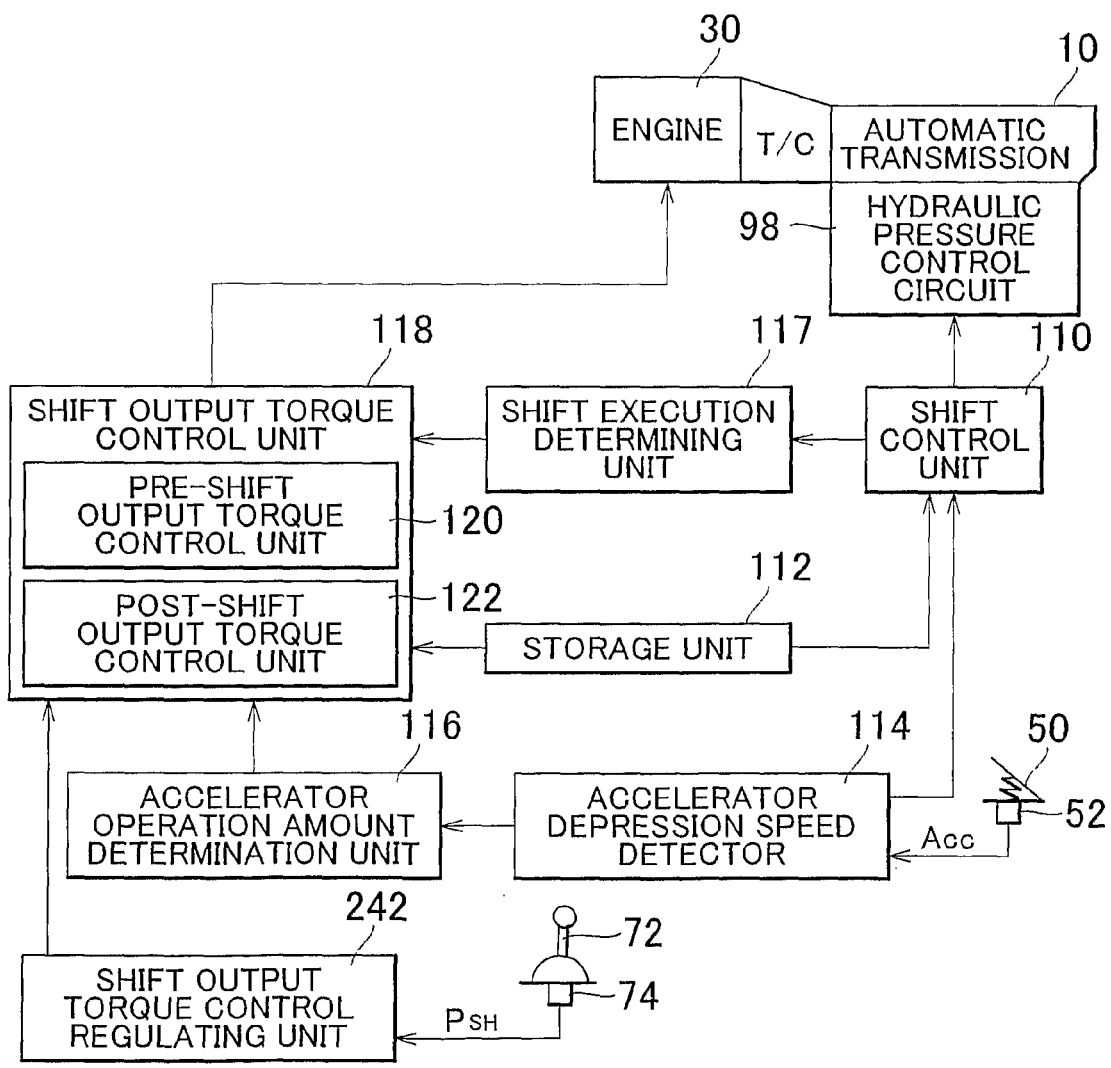
FIG. 22 is a functional block diagram that illustrates major control functions of the electronic control device shown in FIG. 4 in a fourth embodiment of the invention, and corresponds to the functional block diagram shown in FIG. 8.

A fourth embodiment will now be described. The fourth embodiment differs from the first embodiment in that the electronic control unit 90 is replaced with an electronic control unit 240. FIG. 22 is a functional block diagram that illustrates major control functions of the electronic control unit 240, which differs from FIG. 8, which is the functional block diagram of the first embodiment, in that a shift output torque control regulating unit 242 is additionally provided. The other portions are the same as those of FIG. 8. Hereinafter, the difference will be mainly described.

The shift output torque control regulating unit 242 of FIG. 22 determines whether manual range operation, in which the gear of the automatic transmission 10 is manually fixed or a shiftable high-speed side gear is manually set on the basis of the signal $P_{SH}$ from the shift position sensor 74, is being performed. For example, when the shift lever 72 is at the "S" position in FIG. 5, that is, when the gear range of the automatic transmission 10 is an S range, the manual range operation is being performed. Other than the above, though not shown in FIG. 5, the manual range operation is being performed when the shift lever 72 is operated to an M range at which the gear of the automatic transmission 10 is fixed or to a D range paddle at which the gear range of the automatic transmission 10 is determined as in the case of the S range through a paddle switch provided near a steering wheel.

Furthermore, when the shift output torque control regulating unit 242 determines that the manual range operation is being performed, the shift output torque control regulating unit 242 prohibits execution of the shift output torque control. Thus, as the execution of the shift output torque control is prohibited, the shift output torque control unit 118 that includes the pre-shift output torque control unit 120 and the post-shift output torque control unit 122 will not execute the shift output torque control. Note that while the manual range operation is being performed, execution of the shift output torque control may not be prohibited completely. For example, execution of the torque up control or torque down control of the shift output torque control may be differently enabled or disabled depending on the specified range, such as the S range, M range, and D range paddle.

Figure 23:
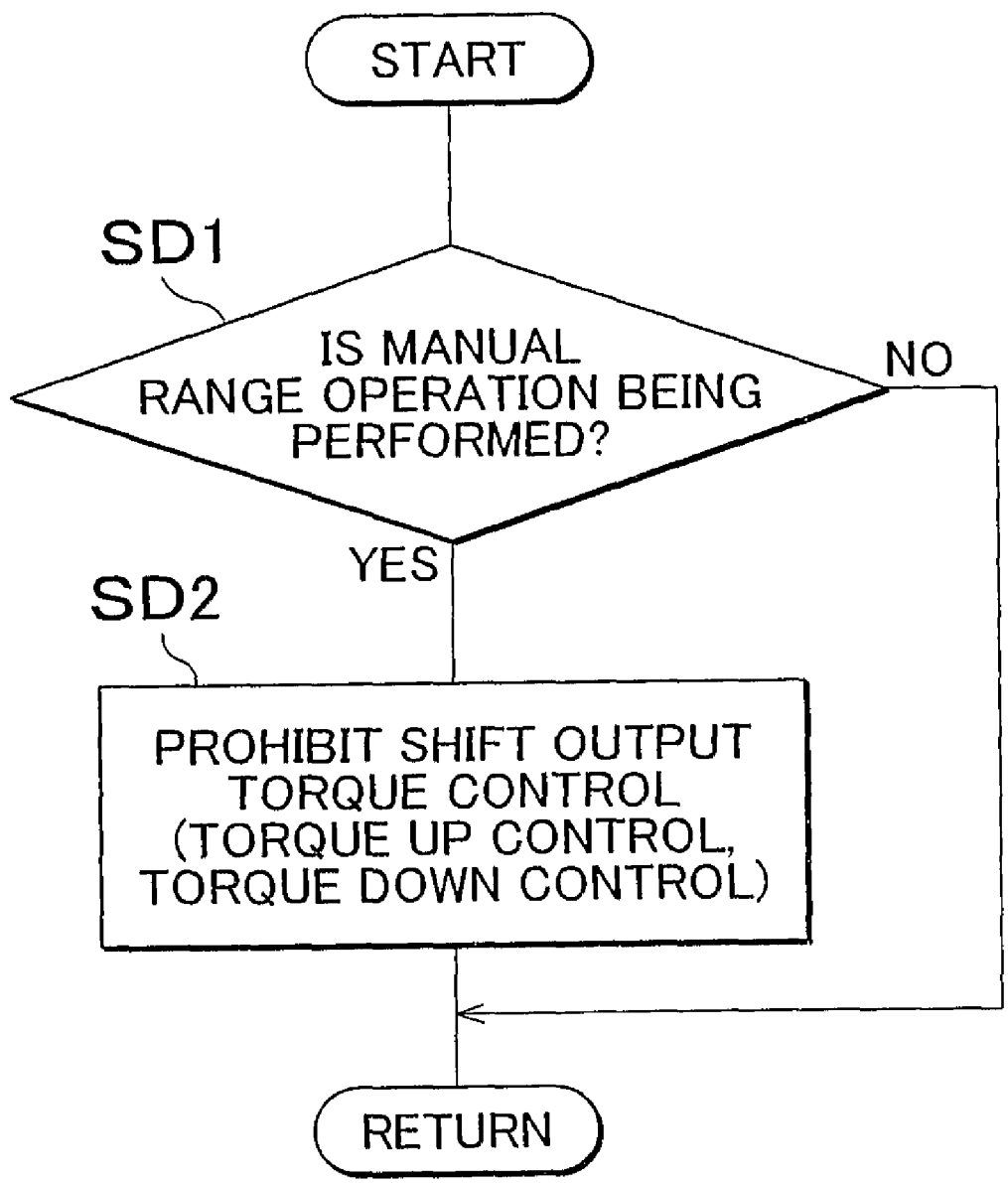
FIG. 23 is a flowchart that illustrates a control operation that determines whether execution of the main control operation of the electronic control device shown in FIG. 4, that is, execution of the flowchart shown in FIG. 14 and FIG. 15, is prohibited in the fourth embodiment of the invention.

The flowchart that shows a main control operation of the electronic control unit 240 according to the present embodiment will be described. The flowchart of the first embodiment shown in FIG. 14 and FIG. 15 is also executed in the electronic control unit 240 of the present embodiment; however, in the present embodiment, other than the above flowchart, the flowchart shown in FIG. 23 is executed. FIG. 23 is a flowchart that determines whether execution of the shift output torque control is prohibited, that is, a flowchart that determines whether execution of the flowchart of FIG. 14 and FIG. 15 is prohibited. Hereinafter, the flowchart of FIG. 23, which is the difference from the first embodiment, will be mainly described.

In SD1, it is determined whether the manual range operation is being performed on the basis of the signal $P_{SH}$ from the shift position sensor 74. when the determination of SD1 is affirmative, that is, when the manual range operation is being performed, the process proceeds to SD2. On the other hand, when the determination of SD1 is negative, the process of the flowchart ends.

In SD2, execution of the shift output torque control (torque up control, torque down control) is prohibited. Thus, through the execution of SD2, execution of the flowchart in FIG. 14 and FIG. 15 is prohibited. Note that SD1 and SD2 correspond to the shift output torque control regulating unit 242.

The electronic control unit 240 according to the present embodiment provides the following advantageous effect (D1) in addition to the advantageous effects (A1) to (A7) of the first embodiment.

(D1) When the shift output torque control regulating unit 242 determines that the manual range operation is being performed, the shift output torque control regulating unit 242 prohibits execution of the shift output torque control. Thus, because the shift output torque control will not be executed when the manual range operation is being performed, it is possible to provide operational feeling such that a driving force directly varies in response to driver's operation according to driver's intention.

Figure 24:
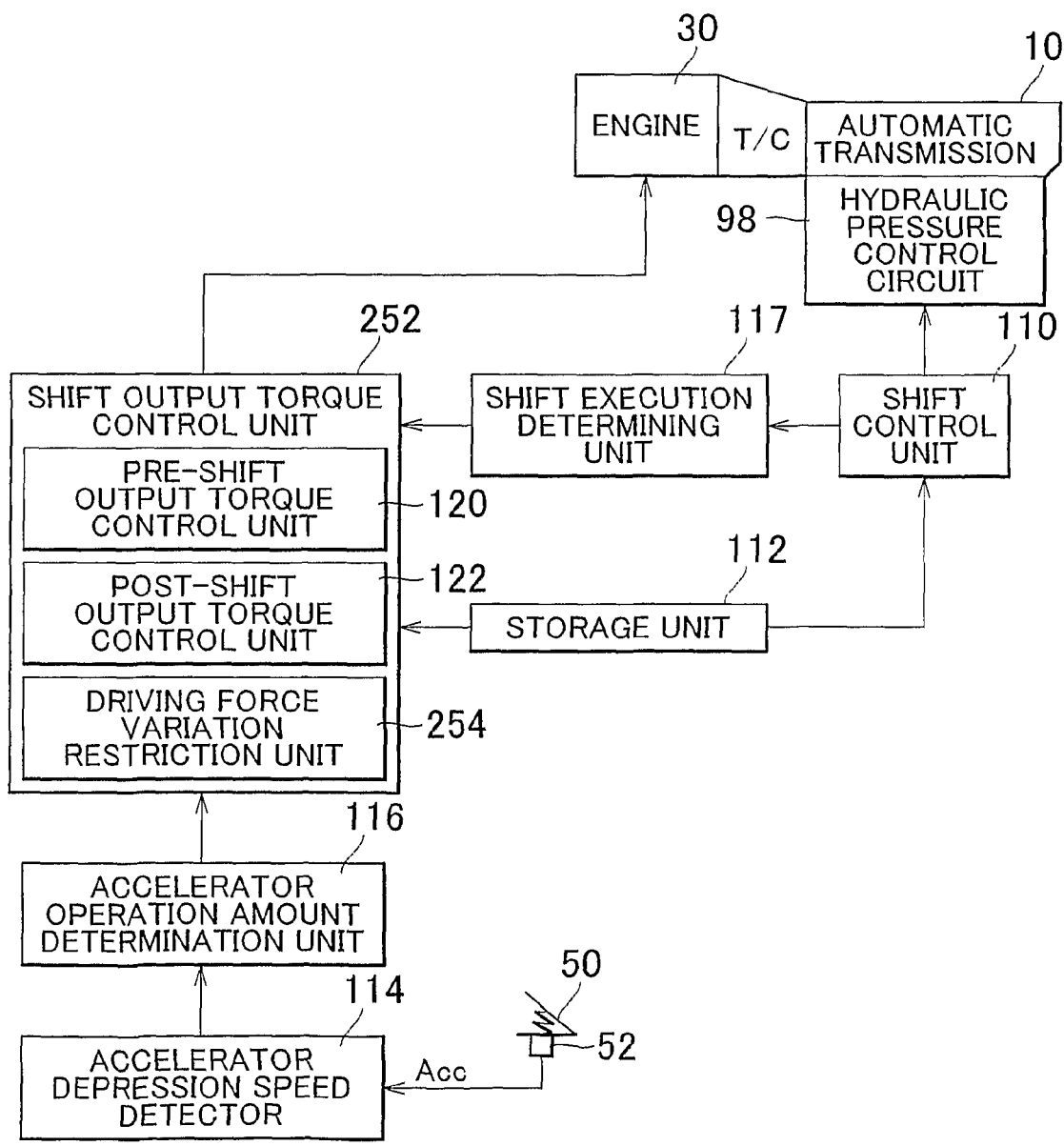
FIG. 24 is a functional block diagram that illustrates major control functions of the electronic control device shown in FIG. 4 in a fifth embodiment of the invention, and corresponds to the functional block diagram shown in FIG. 8.

A fifth embodiment will now be described. The fifth embodiment differs from the first embodiment in that the electronic control unit 90 is replaced with an electronic control unit 250. FIG. 24 is a functional block diagram that illustrates major control functions of the electronic control unit 250, in which the shift output torque control unit 118 in FIG. 8, which is the functional block diagram of the first embodiment, is replaced with a shift output torque control unit 252 that includes a driving force variation restriction unit 254. The other portions are the same as those of FIG. 8. Hereinafter, the difference will be mainly described.

The shift output torque control unit 252 of FIG. 24, as well as the shift output torque control unit 118 (FIG. 8), includes the pre-shift output torque control unit 120 and the post-shift output torque control unit 122, and further includes the driving force variation restriction unit 254. The shift output torque control unit 252 executes the shift output torque control so that, as the accelerator operation amount Acc increases, a driving force variation gradient $SL_F$, which is a variation in driving force $F_{DR}$ to a variation in accelerator operation amount Acc, remains unchanged or decreases. This will be specifically described as follows.

The driving force variation restriction unit 254 detects a preceding driving force variation gradient $SL_F$ on the basis of an actual driving force $F_{DR}$ and a variation in accelerator operation amount Acc each time before the pre-shift output torque control (torque up control) is initiated and each time before the post-shift output torque control (torque down control) is initiated, and then sets the driving force variation gradient $SL_F$ or a gradient that is smaller by a predetermined amount than the driving force variation gradient $SL_F$ for a variation guard $LMT_{SL}$, which is an upper limit of the driving force variation gradient $SL_F$ in the pre-shift output torque control or in the post-shift output torque control. Note that because the variation guard $LMT_{SL}$ is set each time the pre-shift output torque control or post-shift output torque control is initiated, the variation guard $LMT_{SL}$ varies in each pre-shift output torque control or each post-shift output torque control.

The pre-shift output torque control unit 120 executes the pre-shift output torque control as in the case of the first embodiment. When the pre-shift output torque control is initiated, the pre-shift output torque control unit 120 determines the driving force variation gradient $SL_F$ so as to be smaller than or equal to the variation guard $LMT_{SL}$ and then initiates the pre-shift output torque control. That is, when the driving force variation gradient $SL_F$ determined without taking into consideration the variation guard $LMT_{SL}$ is smaller than or equal to the variation guard $LMT_{SL}$, the pre-shift output torque control unit 120 uses the driving force variation gradient $SL_F$ to initiate the pre-shift output torque control as in the case of the first embodiment. On the other hand, when the driving force variation gradient $SL_F$ determined without taking into consideration the variation guard $LMT_{SL}$ exceeds the variation guard $LMT_{SL}$, the pre-shift output torque control unit 120 determines the variation guard $LMT_{SL}$ as the driving force variation gradient $SL_F$ and then initiates the pre-shift output torque control at the driving force variation gradient $SL_F$ that has been corrected to the variation guard $LMT_{SL}$. At this time, although a method of correcting the driving force variation gradient $SL_F$ is not specifically limited, in the pre-shift output torque control of the present embodiment, the start point of the pre-shift output torque control is not changed and the end point of the pre-shift output torque control is changed, thus correcting the driving force variation gradient $SL_F$.

Figure 25:
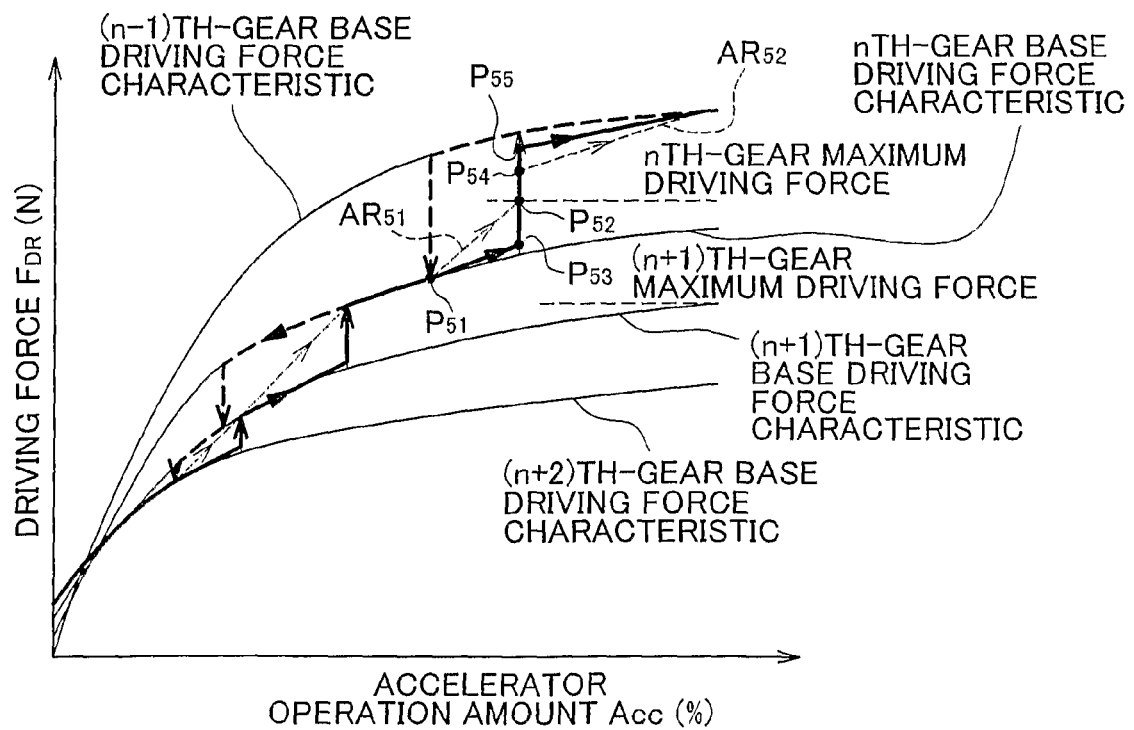
FIG. 25 is a view that illustrates a variation in driving force with respect to a variation in accelerator operation amount when the vehicle automatic transmission shown in FIG. 1 shifts gear in the fifth embodiment of the invention, and that also illustrates a variation in driving force when shift output torque control is executed, which corresponds to FIG. 11.

Determination of the driving force variation gradient $SL_F$ in the pre-shift output torque control will be specifically described with reference to FIG. 25, which corresponds to FIG. 11 of the first embodiment, by taking the case in which the current gear is the nth gear as an example. In this case, the start point of the pre-shift output torque control (torque up control) is $P_{51}$ in FIG. 25. The driving force variation restriction unit 254 detects the driving force variation gradient $SL_F$ at $P_{51}$, that is, immediately before the pre-shift output torque control is initiated and, for example, sets the detected driving force variation gradient $SL_F$ as the variation guard $LMT_{SL}$. Then, if the variation guard $LMT_{SL}$ is not considered, the pre-shift output torque control unit 120 would start the pre-shift output torque control at the driving force variation gradient $SL_F$ of $AR_{51}$ in FIG. 25; however, because the driving force variation gradient $SL_F$ of $AR_{51}$ exceeds the variation guard $LMT_{SL}$ (driving force variation gradient $SL_F$ at $P_{51}$), the pre-shift output torque control unit 120 corrects the end point of the pre-shift output torque control from $P_{52}$ to $P_{53}$ in FIG. 25 and then initiates the pre-shift output torque control at the driving force variation gradient $SL_F$ that has been corrected to the variation guard $LMT_{SL}$.

The post-shift output torque control unit 122, as well as the first embodiment, executes the post-shift output torque control. The post-shift output torque control unit 122 determines the driving force variation gradient $SL_F$ so as to be smaller than or equal to the variation guard $LMT_{SL}$ as in the case of the pre-shift output torque control, and then initiates the post-shift output torque control. That is, when the driving force variation gradient $SL_F$ determined without taking into consideration the variation guard $LMT_{SL}$ is smaller than or equal to the variation guard $LMT_{SL}$, the post-shift output torque control unit 122 uses the driving force variation gradient $SL_F$ to initiate the post-shift output torque control as in the case of the first embodiment. On the other hand, when the driving force variation gradient $SL_F$ determined without taking into consideration the variation guard $LMT_{SL}$ exceeds the variation guard $LMT_{SL}$, the post-shift output torque control unit 122 determines the variation guard $LMT_{SL}$ as the driving force variation gradient $SL_F$ and then initiates the post-shift output torque control at the driving force variation gradient $SL_F$ that has been corrected to the variation guard $LMT_{SL}$. At this time, although a method of correcting the driving force variation gradient $SL_F$ is not specifically limited, in the post-shift output torque control of the present embodiment, the end point of the post-shift output torque control is not changed and the start point of the post-shift output torque control is changed, thus correcting the driving force variation gradient $SL_F$.

Determination of the driving force variation gradient $SL_F$ in the post-shift output torque control will be specifically described with reference to FIG. 25 by taking the case in which the current gear is the (n−1)th gear as an example. The driving force variation restriction unit 254 detects the driving force variation gradient $SL_F$ at $P_{53}$, that is, immediately before downshift is performed from the nth gear to the (n−1)th gear (current gear) and, for example, sets the detected driving force variation gradient $SL_F$ as the variation guard $LMT_{SL}$. Then, if the variation guard $LMT_{SL}$ is not considered, the post-shift output torque control unit 122 would initiate the post-shift output torque control at the driving force variation gradient $SL_F$ of $AR_{52}$ in FIG. 25; however, because the driving force variation gradient $SL_F$ of $AR_{52}$ exceeds the variation guard $LMT_{SL}$ (driving force variation gradient $SL_F$ at $P_{53}$), the post-shift output torque control unit 122 corrects the start point of the post-shift output torque control from $P_{54}$ to $P_{55}$ in FIG. 25 and then initiates the post-shift output torque control at the driving force variation gradient $SL_F$ that has been corrected to the variation guard $LMT_{SL}$.

The flowchart that shows a main control operation of the electronic control unit 250 according to the present embodiment will be described. The flowchart of the first embodiment shown in FIG. 14 and FIG. 15 also applies to the electronic control unit 250 of the present embodiment; however, portion of the flowchart is replaced with the flowchart shown in FIG. 26 and FIG. 27 as will be described below.

Figure 26:
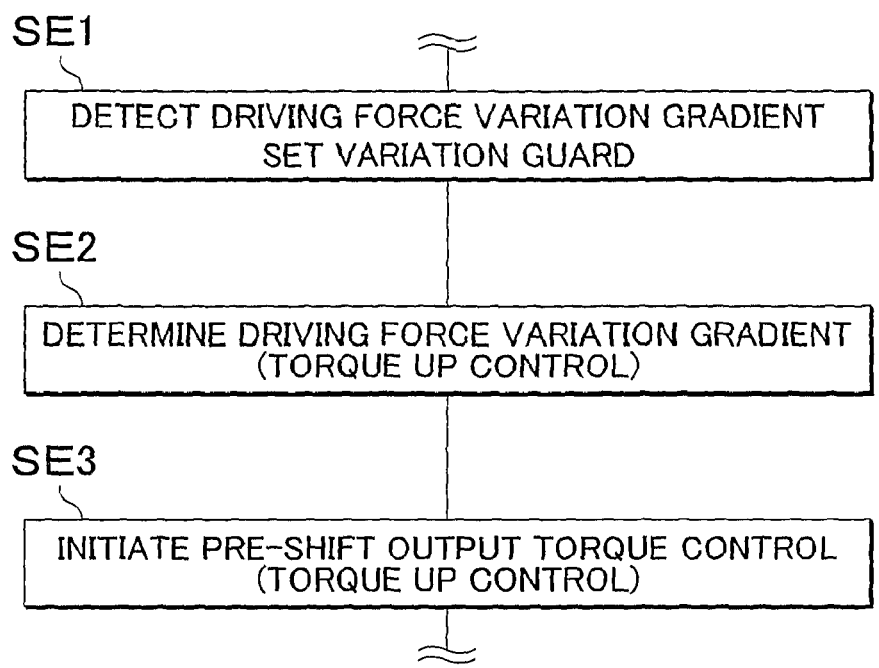
FIG. 26 is a flowchart that illustrates a major control operation of the electronic control device shown in FIG. 4 in the fifth embodiment of the invention and replaces portion of the flowchart shown in FIG. 14.

When the pre-shift output torque control is initiated in SA4 and SA6 in FIG. 14, SA4 and SA6 each are replaced with SE1 to SE3 in FIG. 26. When the post-shift output torque control is initiated in SA10 in FIG. 15, SA10 is replaced with SE11 to SE13 in FIG. 27. Note that when the pre-shift output torque control or the post-shift output torque control is being executed, it is continued.

In SE1 in FIG. 26, the variation guard $LMT_{SL}$ is set. Specifically, the preceding driving force variation gradient $SL_F$ is detected on the basis of an actual driving force $F_{DR}$ and a variation in accelerator operation amount Acc, and sets the driving force variation gradient $SL_F$ or a gradient that is smaller by a predetermined amount than the driving force variation gradient $SL_F$ as the variation guard $LMT_{SL}$. Note that SE1 corresponds to the driving force variation restriction unit 254.

In SE2 subsequent to SE1, the driving force variation gradient $SL_F$ of the pre-shift output torque control is determined to be smaller than or equal to the variation guard $LMT_{SL}$. At this time, the start point of the pre-shift output torque control is not changed irrespective of the variation guard $LMT_{SL}$, and the end point of the pre-shift output torque control is changed to thereby correct the driving force variation gradient $SL_F$ so as to be smaller than or equal to the variation guard $LMT_{SL}$.

In SE3 subsequent to SE2, the pre-shift output torque control (torque up control) is started at the determined driving force variation gradient $SL_F$. Note that SE2 and SE3 correspond to the pre-shift output torque control unit 120.

Figure 27:
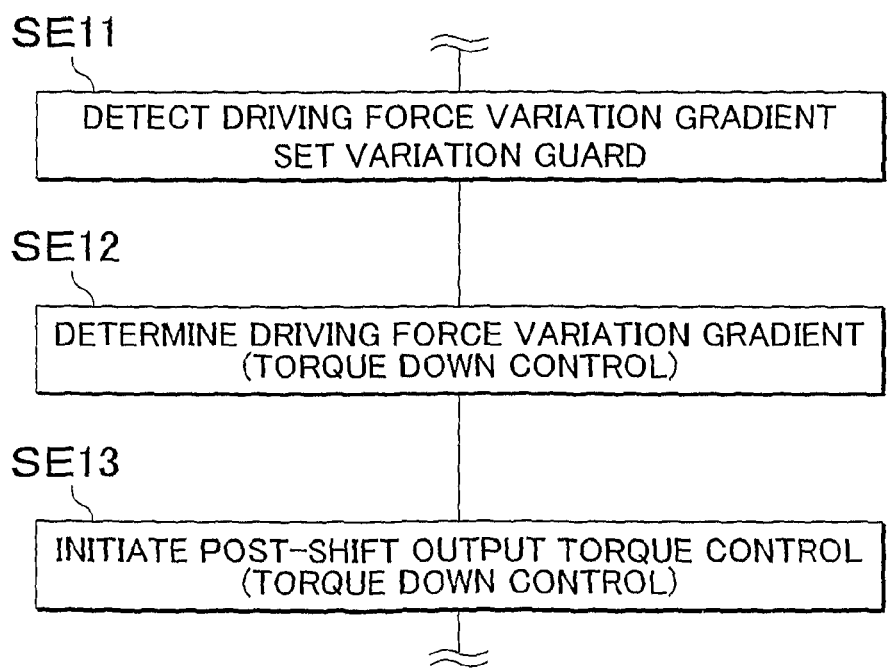
FIG. 27 is a flowchart that illustrates a major control operation of the electronic control device shown in FIG. 4 in the fifth embodiment of the invention and replaces portion of the flowchart shown in FIG. 15.

In SE11 in FIG. 27, as in the case of SE1, the variation guard $LMT_{SL}$ is set. Note that SE11 corresponds to the driving force variation restriction unit 254.

In SE12 subsequent to SE11, the driving force variation gradient $SL_F$ of the post-shift output torque control is determined so as to be smaller than or equal to the variation guard $LMT_{SL}$. At this time, the end point of the post-shift output torque control is not changed irrespective of the variation guard $LMT_{SL}$, and the start point of the post-shift output torque control is changed to thereby correct the driving force variation gradient $SL_F$ so as to be smaller than or equal to the variation guard $LMT_{SL}$.

In SE13 subsequent to SE12, the post-shift output torque control (torque down control) is initiated at the determined driving force variation gradient $SL_F$. Note that SE12 and SE13 correspond to the post-shift output torque control unit 122.

The electronic control unit 250 according to the present embodiment provides the following advantageous effects (E1) to (E3) in addition to the advantageous effects (A1) to (A7) of the first embodiment.

(E1) The shift output torque control unit 252 executes the shift output torque control so that, as the accelerator operation amount Acc increases, a driving force variation gradient $SL_F$, which is a variation in driving force $F_{DR}$ to a variation in accelerator operation amount Acc, remains unchanged or decreases. Thus, when the accelerator operation amount Acc is large, that is, when the engine torque $T_E$ is large, a variation in driving force $F_{DR}$ to the operation of the accelerator pedal 50 is gentle and, therefore, the controllability of the vehicle may be ensured.

(E2) When the driving force variation gradient $SL_F$ of the pre-shift output torque control (torque up control) is limited to the variation guard $LMT_{SL}$ or below, the start point of the pre-shift output torque control is not changed, and the end point of the pre-shift output torque control is changed to thereby limit the driving force variation gradient $SL_F$. Thus, the driving force $F_{DR}$ may be increased as much as possible at the driving force variation gradient $SL_F$ that is smaller than or equal to the variation guard $LMT_{SL}$, to thereby make it possible to reduce the driving force difference $DF_F$ at the time of downshift.

(E3) When the driving force variation gradient $SL_F$ of the post-shift output torque control (torque down control) is limited to the variation guard $LMT_{SL}$ or below, the end point of the post-shift output torque control is not changed, and the start point of the post-shift output torque control is changed to thereby limit the driving force variation gradient $SL_F$. Thus, owing to the post-shift output torque control (torque down control), without expanding the variation range of the accelerator operation amount Acc for which the driving force $F_{DR}$ is decreased against the base driving force characteristic, a decrease in response is suppressed.

A sixth embodiment will now be described. The sixth embodiment differs from the first embodiment in that the electronic control unit 90 is replaced with an electronic control unit 260. FIG. 19 is a functional block diagram that illustrates major control functions of the electronic control unit 260, which corresponds to FIG. 8 of the first embodiment. The accelerator depression speed detector 114 and the accelerator operation amount determination unit 116 are the same as those of FIG. 8; however, the other portions are different from those of FIG. 8. Hereinafter, the difference will be mainly described.

Figure 29:
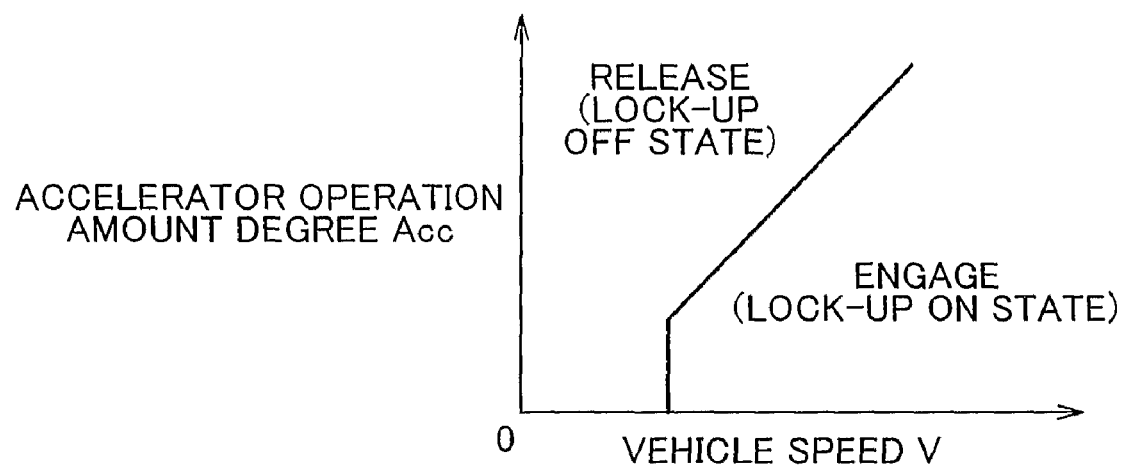
FIG. 29 is a view that shows a lock-up map that is predetermined using a vehicle speed and an accelerator operation amount as a parameter in the vehicle automatic transmission shown in FIG. 1.

FIG. 29 is a view that shows a lock-up map that is predetermined using a vehicle speed V and an accelerator operation amount Acc as parameters. For example, the lock-up mechanism 31 is engaged or released in accordance with the lock-up map of FIG. 29, and then the lock-up mechanism 31 is switched to any one of a lock-up on state in which the lock-up mechanism 31 is engaged or a lock-up off state in which the lock-up mechanism 31 is released. As the accelerator pedal 50 is depressed to increase the accelerator operation amount Acc when the lock-up mechanism 31 is in the lock-up on state, the lock-up mechanism 31 is switched to the lock-up off state in accordance with the lock-up map of FIG. 29. Then, as the lock-up mechanism 31 is switched from the lock-up on state to the lock-up off state, a difference in rotation speed occurs between the input and output shafts of the torque converter 32, the engine torque $T_E$, which is the input torque of the torque converter 32, is increased and transmitted to the driving wheels, and then the driving force $F_{DR}$ increases in a stepwise manner through the switching of the lock-up state. From such the relationship between the accelerator operation amount Acc and the driving force $F_{DR}$, switching of the lock-up mechanism 31 from the lock-up on state to the lock-up off state is similar to downshift of the automatic transmission 10. Thus, the engine torque control (lock-up switching output torque control, which will be described later) as in the case of the shift output torque control of the above described first embodiment may be applied to switching from the lock-up on state to the lock-up off state. Hereinafter, the control operation will be described.

Figure 28:
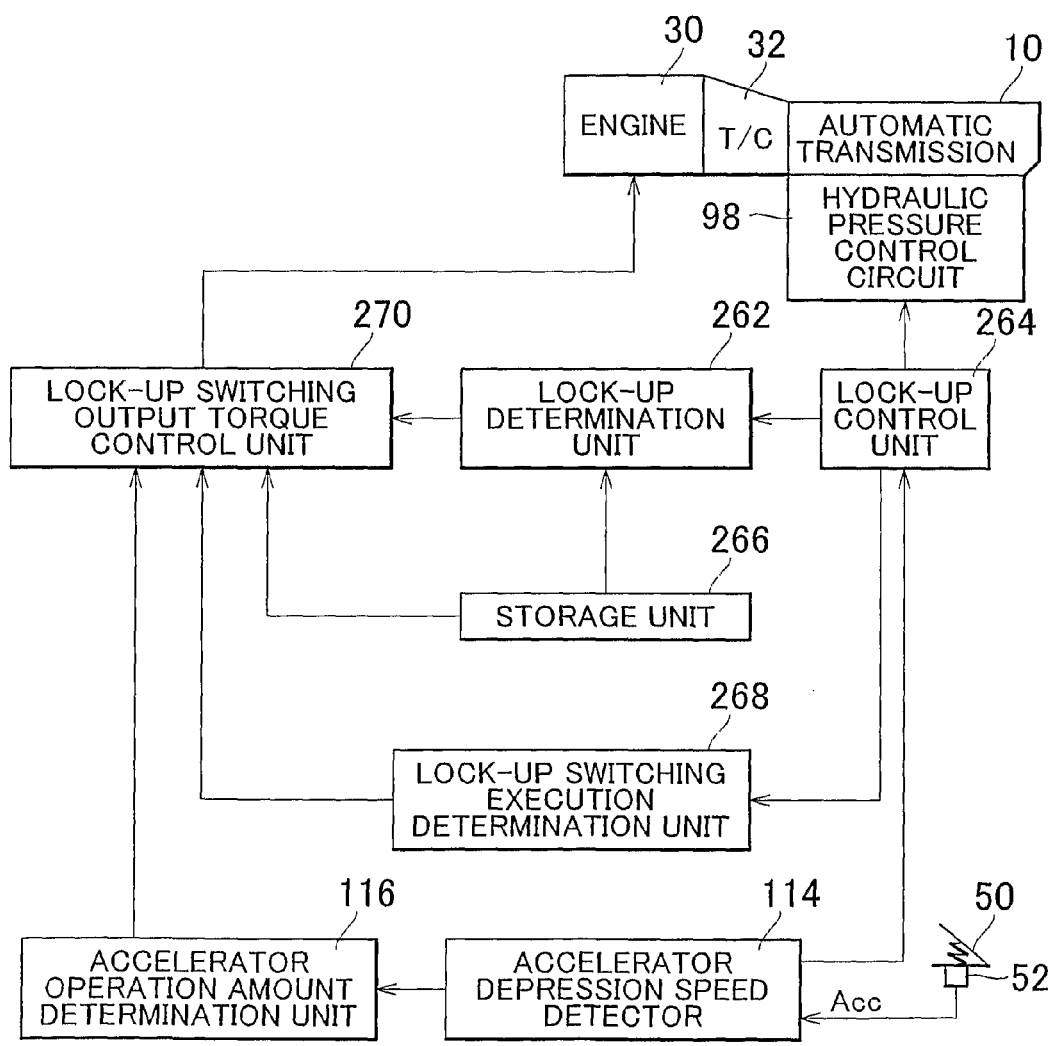
FIG. 28 is a functional block diagram that illustrates major control functions of the electronic control device shown in FIG. 4 in a sixth embodiment of the invention, and corresponds to the functional block diagram shown in FIG. 8.

A lock-up determination unit 262 of FIG. 28 determines which lock-up state the lock-up mechanism 31 should be switched to, the lock-up on state or the lock-up off state, in accordance with the lock-up map of FIG. 29 on the basis of the vehicle speed V and the accelerator operation amount Acc.

A lock-up control unit 264 switches the lock-up state of the lock-up mechanism 31 in accordance with the determination of the lock-up determination unit 262. Specifically, in the lock-up on state, when the lock-up determination unit 262 determines that it should be switched to the lock-up off state, the lock-up control unit 264 outputs a command to switch the lock-up on state to the lock-up off state, to the hydraulic pressure control circuit 98 provided with the electromagnetic valves to switch engagement or release of the lock-up mechanism 31, thus switching the lock-up state to the lock-up off state. On the other hand, in the lock-up off state, when the lock-up determination unit 262 determines that it should be switched to the lock-up on state, the lock-up control unit 264 outputs a command to switch the lock-up off state to the lock-up on state, to the hydraulic pressure control circuit 98, thus switching the lock-up state to the lock-up on state. Note that in order to give time to execute lock-up switching output torque control, which will be described later, to a lock-up switching output torque control unit 270, which will be described later, the lock-up control unit 264, for example, executes switching of the lock-up state at a predetermined interval from time when the lock-up determination unit 262 makes determination.

Furthermore, the lock-up control unit 264 acquires the accelerator depression speed $V_{AC}$ from the accelerator depression speed detector 114. Then, the lock-up control unit 264 changes a lock-up off point $P_{OFF}$ that indicates the accelerator operation amount Acc at which the lock-up mechanism 31 is switched from the lock-up on state to the lock-up off state on the basis of the acquired accelerator depression speed $V_{AC}$. This will be specifically described with reference to FIG. 30, which corresponds to FIG. 20 of the third embodiment, by taking the case in which the lock-up mechanism 31 is currently in the lock-up on state in FIG. 30 as an example.

Figure 30:
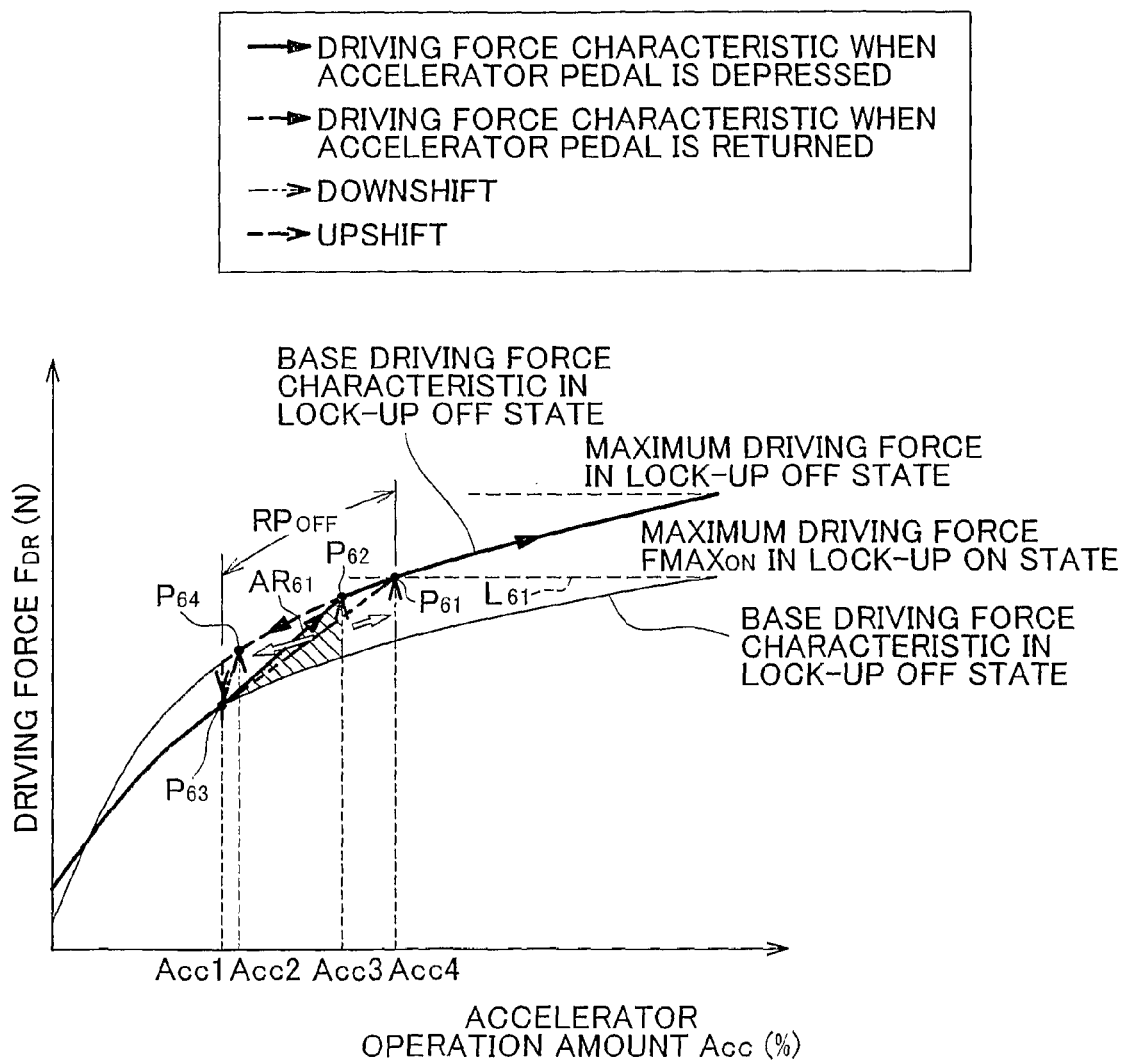
FIG. 30 is a view that illustrates a variation in driving force with respect to a variation in accelerator operation amount when the lock-up state of a lock-up mechanism of the vehicle automatic transmission shown in FIG. 1 is switched in the sixth embodiment of the invention and that also illustrates a variation in driving force when lock-up switching output torque control is executed, which corresponds to FIG. 11.

FIG. 30 is a view that shows a relationship between an accelerator operation amount Acc and a driving force $F_{DR}$ in the lock-up on state and in the lock-up off state. The base driving force characteristics of those states each show the relationship between the accelerator operation amount Acc and the driving force $F_{DR}$ when the throttle valve opening degree $\theta_{TH}$ varies in accordance with the throttle valve reference characteristic $L_{AS}$ (FIG. 9) with respect to the accelerator operation amount Acc as in the case of the first embodiment. Then, in FIG. 30, the wide solid line arrow shows a variation in driving force $F_{DR}$ with respect to the accelerator operation amount Acc when the lock-up mechanism 31 is switched from the lock-up on state to the lock-up off state with an increase in accelerator operation amount Acc when the accelerator pedal 50 is depressed. The wide broken line arrow shows a variation in driving force $F_{DR}$ with respect to the accelerator operation amount Acc when the lock-up mechanism 31 is switched from the lock-up off state to the lock-up on state with a decrease in accelerator operation amount Acc when the accelerator pedal 50 is returned.

First, the lock-up control unit 264 determines a lock-up off point variation range $RP_{OFF}$ in which the lock-up off point $P_{OFF}$ may be changed. The lock-up off point variation range $RP_{OFF}$ will be described. The lock-up control unit 264 sets an accelerator operation amount Acc4 at which, when the lock-up on state is switched to the lock-up off state, the driving force $F_{DR}$ at the time of switching in the lock-up off state takes the maximum driving force $FMAX_{ON}$ that can be generated in the lock-up on state, that is, sets an accelerator operation amount Acc4 indicated by $P_{61}$, which is the intersection of the base driving force characteristic of the lock-up off state and $L_{61}$ that indicates the maximum driving force $FMAX_{ON}$ in FIG. 30, for an upper limit of the lock-up off point variation range $RP_{OFF}$. In addition, the lock-up control unit 264 sets a predetermined accelerator operation amount Acc1, at which the lock-up off state is switched to the lock-up on state, for a lower limit of the lock-up off point variation range $RP_{OFF}$.

As the lock-up control unit 264 determines the lock-up off point variation range $RP_{OFF}$, the lock-up control unit 264 shifts the lock-up off point $P_{OFF}$ within the lock-up off point variation range $RP_{OFF}$ so as to reduce the accelerator operation amount Acc as the accelerator depression speed $V_{AC}$ increases. When the lock-up off point $P_{OFF}$ is shifted, the lock-up control unit 264 may continuously shift the lock-up off point $P_{OFF}$ or may shift the lock-up off point $P_{OFF}$ in a stepwise manner, in accordance with a variation in accelerator depression speed $V_{AC}$. In addition, when the accelerator pedal 50 is depressed gently so that the accelerator depression speed $V_{AC}$ is smaller than a predetermined value, the lock-up off point $P_{OFF}$ is shifted so as to increase the accelerator operation amount Acc; otherwise, that is, when the accelerator pedal 50 is depressed fast so that the accelerator depression speed $V_{AC}$ is larger than or equal to the predetermined value, the lock-up off point $P_{OFF}$ may be, for example, set to $P_{62}$ in FIG. 30 and may be configured not to shift the lock-up off point $P_{OFF}$ so as to reduce the accelerator operation amount Acc beyond the accelerator operation amount Acc3 indicated by $P_{62}$.

The storage unit 266 stores the throttle valve reference characteristic $L_{AS}$ of FIG. 9. Furthermore, in a plurality of vehicle driving states in which parameters that influence the base driving force characteristic (FIG. 30), such as the vehicle speed V and the gear ratio $\gamma$ of the automatic transmission 10, are varied in a stepwise manner, a base driving force characteristic map formed of the base driving force characteristics of the respective lock-up on state and lock-up off state as shown in FIG. 30 is obtained beforehand, and the storage unit 266 stores a plurality of the base driving force characteristic maps as well.

A lock-up switching execution determining unit 268 determines whether the lock-up state of the lock-up mechanism 31 has been switched from the lock-up on state to the lock-up off state by the lock-up control unit 264. For example, in the description with reference to FIG. 30, which will be described later, when the lock-up state has been switched from the lock-up on state to the lock-up off state, the determination will be affirmative.

In a state where the lock-up mechanism 31 is in the lock-up on state, when the accelerator operation amount determination unit 116 determines that the accelerator operation amount Acc is increasing, and when the lock-up determination unit 262 determines that it should be switched to the lock-up off state, the lock-up switching output torque control unit 270 executes a lock-up switching output torque control that adjusts the engine torque $T_E$ so as to reduce the driving force difference $DF_F$ due to switching of the lock-up mechanism 31 from the lock-up on state to the lock-up off state.

The lock-up switching output torque control will be specifically described with reference to FIG. 30. To execute the lock-up switching output torque control, the lock-up switching output torque control unit 270 obtains the base driving force characteristics of the lock-up on state and lock-up off state shown in FIG. 30. For example, from among the plurality of base driving force characteristic maps stored in the storage unit 266, the base driving force characteristic map corresponding to the current vehicle driving state is selected, and the above respective base driving force characteristics are obtained.

Subsequently, the lock-up switching output torque control unit 270, as well as the pre-shift output torque control unit 120 of the first embodiment, determines the start point and end point of the torque up control, and then executes the lock-up switching output torque control, which is the torque up control, so that the driving force $F_{DR}$ smoothly increases (linearly increases in FIG. 30) between the start and end points. For example, when the start point is set to $P_{63}$ (FIG. 30) and the end point is set to $P_{62}$ (FIG. 30), the driving force $F_{DR}$ is increased as shown by $AR_{61}$ (FIG. 30) with an increase in accelerator operation amount Acc. At this time, the lock-up switching output torque control unit 270, in the lock-up switching output torque control (torque up control), increases the driving force $F_{DR}$ in the lock-up on state so as to reach the driving force $F_{DR}$ in the lock-up off state at the time of switching from the lock-up on state to the lock-up off state. In other words, the lock-up switching output torque control unit 270 increases the driving force $F_{DR}$ so that the driving force $F_{DR}$ immediately before switching from the lock-up on state to the lock-up off state reaches the driving force $F_{DR}$ in the lock-up off state, that is, reaches the driving force $F_{DR}$ on the base driving force characteristic (FIG. 30) in the lock-up off state. For this reason, the lock-up switching output torque control unit 270, when the lock-up control unit 264 has shifted the lock-up off point $P_{OFF}$, determines the end point of the torque up control following the shifted lock-up off point $P_{OFF}$. For example, when the lock-up control unit 264 shifts the lock-up off point $P_{OFF}$ to the accelerator operation amount Acc4 and switching of the lock-up state to the lock-up off state will be performed at the accelerator operation amount Acc4, the lock-up switching output torque control unit 270 sets $P_{61}$ (FIG. 30) for the end point of the torque up control. Alternatively, when the lock-up control unit 264 shifts the lock-up off point $P_{OFF}$ to the accelerator operation amount Acc2 and switching of the lock-up state to the lock-up off state will be performed at the accelerator operation amount Acc2, the lock-up switching output torque control unit 270 sets $P_{64}$ (FIG. 30) for the end point of the torque up control. Note that the lock-up switching output torque control unit 270 determines the start point of the torque up control in such a manner that the accelerator operation amount Acc of the start point is not smaller than the accelerator operation amount Acc1 (FIG. 30) at which the lock-up mechanism 31 switches from the lock-up off state to the lock-up on state.

In addition, when the accelerator pedal 50 is depressed to switch the lock-up state to the lock-up off state after the torque up control and then the throttle valve opening degree $\theta_{TH}$ is according to the throttle valve reference characteristic $L_{AS}$ shown in FIG. 9, in order not to decrease the driving force $F_{DR}$ despite the accelerator pedal 50 being depressed, in the torque up control, the engine torque $T_E$ is controlled by taking into consideration an error of the driving force $F_{DR}$ in the torque up control so that the driving force $F_{DR}$ during the torque up control does not exceed the actual driving force $F_{DR}$ after switching to the lock-up off state.

When the lock-up switching execution determining unit 268 makes affirmative determination, that is, when the lock-up mechanism 31 has been switched from the lock-up on state to the lock-up off state, the lock-up switching output torque control unit 270 ends the lock-up switching output torque control (torque up control).

When focusing on the relationship between the accelerator operation amount Acc and the throttle valve opening degree $\theta_{TH}$ in the lock-up switching output torque control (torque up control), the lock-up switching output torque control adjusts the throttle valve opening degree $\theta_{TH}$ irrespective of the throttle valve reference characteristic $L_{AS}$ shown in FIG. 9 so as to reduce the driving force difference $DF_F$ due to switching of the lock-up mechanism 31 from the lock-up on state to the lock-up off state. Specifically, in the lock-up switching output torque control (torque up control), with reference to the same accelerator operation amount Acc, the actual throttle valve opening degree $\theta_{TH}$ is increased as compared with the throttle valve opening degree $\theta_{TH}$ that is determined on the basis of the throttle valve reference characteristic $L_{AS}$ of FIG. 9.

Figure 31:
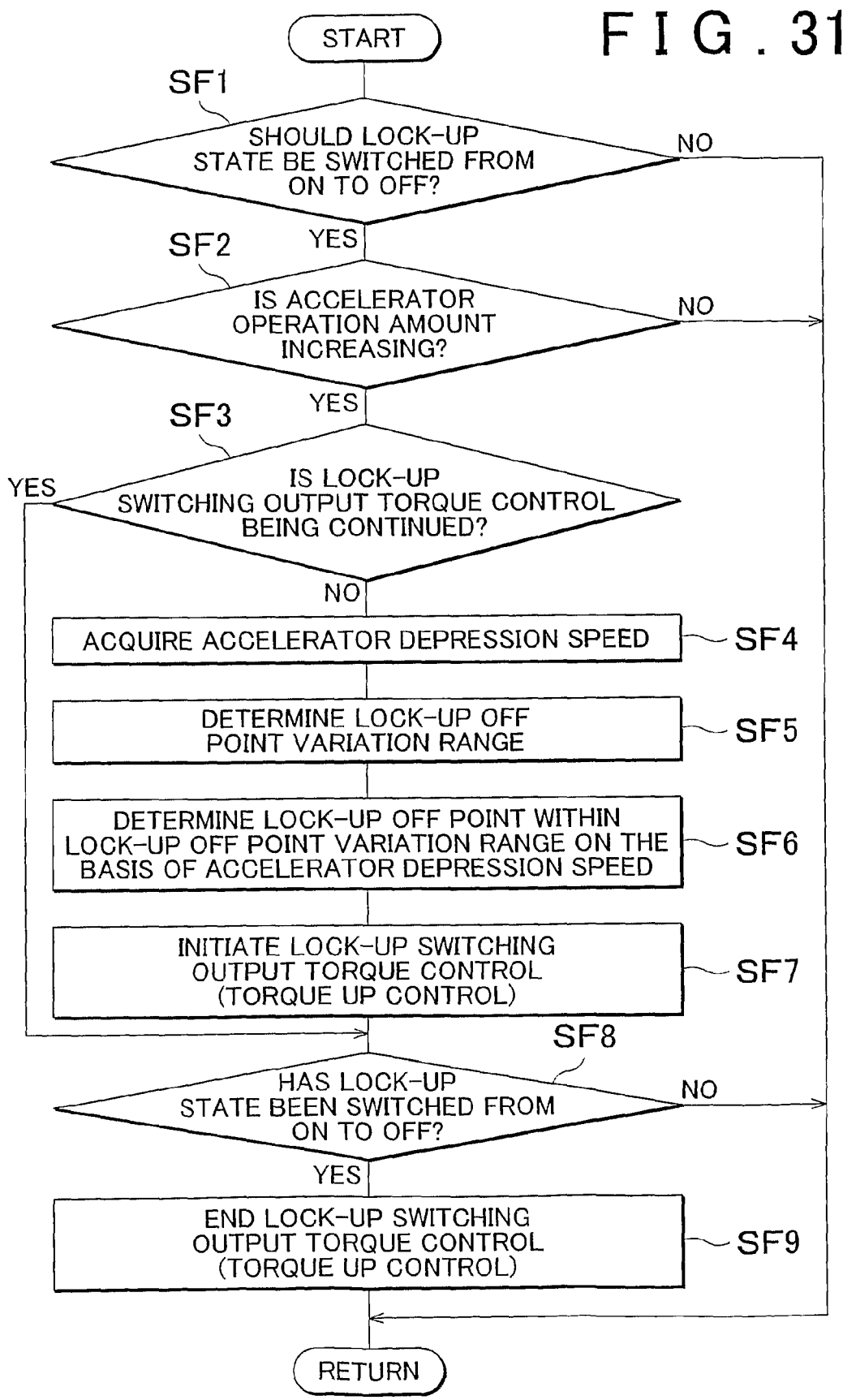
FIG. 31 is a flowchart that illustrates a control operation that reduces a driving force difference when a major control operation of the electronic control device shown in FIG. 4 is performed, that is, the lock-up mechanism is switched from a lock-up on state to a lock-up off state in the sixth embodiment of the invention, which corresponds to the flowchart shown in FIG. 14 and FIG. 15.

FIG. 31 is a flowchart of the present embodiment, which corresponds to FIG. 14 and FIG. 15 of the first embodiment, and is a flowchart that illustrates a major control operation of the electronic control unit 260, that is, a control operation to reduce the driving force difference $DF_F$ that arises when the lock-up mechanism 31 is switched from the lock-up on state to the lock-up off state. The control operation is, for example, repeatedly executed at extremely short intervals about several milliseconds to several tens of milliseconds. Note that the above flowchart may be executed only when the lock-up mechanism 31 is in the lock-up on state, for example.

In SF1 corresponding to the lock-up determination unit 262, in the lock-up on state of the lock-up mechanism 31, it is determined, on the basis of the vehicle speed V and the accelerator operation amount Acc in accordance with the lock-up map of FIG. 29, whether the lock-up mechanism 31 should be switched from the lock-up on state to the lock-up off state. When the determination of SF1 is affirmative, that is, when the lock-up mechanism 31 should be switched from the lock-up on state to the lock-up off state, the process proceeds to SF2. On the other hand, when the determination of SF1 is negative, the process of the flowchart ends.

In step SF2 corresponding to the accelerator depression speed detector 114 and the accelerator operation amount determination unit 116, the accelerator depression speed $V_{AC}$ is detected, and it is determined, on the basis of the detected accelerator depression speed $V_{AC}$, whether the accelerator operation amount Acc is increasing. When the determination of SF2 is affirmative, that is, when the accelerator operation amount Acc is increasing, the process proceeds to SF3. On the other hand, when the determination of SF2 is negative, the process of the flowchart ends.

In SF3, it is determined whether the lock-up switching output torque control (torque up control) has been already initiated, that is, the lock-up switching output torque control (torque up control) is being continued. When the determination of SF3 is affirmative, that is, when the lock-up switching output torque control is being continued, the process proceeds to SF8. On the other hand, when the determination of SF3 is negative, the process proceeds to SF4. This is because the following SF4 to SF7 are steps of initiating the lock-up switching output torque control (torque up control).

In SF4, the accelerator depression speed $V_{AC}$ is acquired. After SF4, the process proceeds to SF5.

In SF5, the lock-up off point variation range $RP_{OFF}$, in which the lock-up off point $P_{OFF}$ may be changed, is determined. In this case, an accelerator operation amount Acc4 at which, when the lock-up mechanism 31 is switched from the lock-up on state to the lock-up off state, the driving force $F_{DR}$ at the time of switching in the lock-up off state takes the maximum driving force $FMAX_{ON}$ that can be generated in the lock-up on state, that is, an accelerator operation amount Acc4 indicated by $P_{61}$, which is the intersection of the base driving force characteristic of the lock-up off state and $L_{61}$ that indicates the maximum driving force $FMAX_{ON}$ in FIG. 30, is set for an upper limit of the lock-up off point variation range $RP_{OFF}$. In addition, a predetermined accelerator operation amount Acc1, at which the lock-up off state is switched to the lock-up on state, is set for a lower limit of the lock-up off point variation range $RP_{OFF}$. After SF5, the process proceeds to SF6.

In SF6, the lock-up off point $P_{OFF}$ is shifted within the lock-up off point variation range $RP_{OFF}$ so as to reduce the accelerator operation amount Acc as the accelerator depression speed $V_{AC}$ increases, thus determining the lock-up off point $P_{OFF}$. After SF6, the process proceeds to SF7. Note that SF4 to SF6 correspond to the lock-up control unit 264.

In SF7, the start point and end point of the torque up control are determined, and then the lock-up switching output torque control, which is the torque up control, is executed so that the driving force $F_{DR}$ smoothly increases between the start and end points. Note that when the lock-up off point $P_{OFF}$ is shifted, the end point of the torque up control is determined following the shifted lock-up off point $P_{OFF}$. After SF7, the process proceeds to SF8.

In SF8 corresponding to the lock-up switching execution determining unit 268, it is determined whether the lock-up mechanism 31 has been switched from the lock-up on state to the lock-up off state. When the determination of SF8 is affirmative, that is, when the lock-up mechanism 31 has been switched from the lock-up on state to the lock-up off state, the process proceeds to SF9. On the other hand, when the determination of SF8 is negative, the process of the flowchart ends.

In SF9, the lock-up switching output torque control (torque up control) initiated in SF7 is ended. Note that SF3, SF7 and SF9 correspond to the lock-up switching output torque control unit 270.

The electronic control unit 260 of the present embodiment provides the following advantageous effects (F1) to (F7).

(F1) In a state where the lock-up mechanism 31 is in the lock-up on state, when the accelerator operation amount determination unit 116 determines that the accelerator operation amount Acc is increasing, and when the lock-up determination unit 262 determines that it should be switched to the lock-up off state, the lock-up switching output torque control unit 270 executes a lock-up switching output torque control to adjust the engine torque $T_E$ so as to reduce the driving force difference $DF_F$ due to switching of the lock-up mechanism 31 from the lock-up on state to the lock-up off state. Thus, in comparison with the case in which the lock-up switching output torque control is not executed, it is possible to smooth a variation in driving force $F_{DR}$ associated with switching of the lock-up state of the lock-up mechanism 31. As a result, occupants' comfort may be improved.

(F2) The lock-up switching output torque control unit 270, in the lock-up switching output torque control (torque up control), increases the driving force $F_{DR}$ in the lock-up on state so as to reach the driving force $F_{DR}$ in the lock-up off state at the time of switching from the lock-up on state to the lock-up off state. Thus, it is possible to further reduce the driving force difference $DF_F$ due to switching from the lock-up on state to the lock-up off state.

(F3) The lock-up control unit 264 changes a lock-up off point $P_{OFF}$ that indicates the accelerator operation amount Acc at which the lock-up mechanism 31 is switched from the lock-up on state to the lock-up off state on the basis of the acquired accelerator depression speed $V_{AC}$. Thus, it is possible to early obtain a driving force requested by the driver.

(F4) The lock-up control unit 264 determines a lock-up off point variation range $RP_{OFF}$ in which the lock-up off point $P_{OFF}$ may be changed. Specifically, the lock-up control unit 264 sets an accelerator operation amount Acc4 at which, when the lock-up on state is switched to the lock-up off state, the driving force $F_{DR}$ at the time of switching in the lock-up off state takes the maximum driving force $FMAX_{ON}$ that can be generated in the lock-up on state, that is, sets an accelerator operation amount Acc4 indicated by $P_{61}$, which is the intersection of the base driving force characteristic of the lock-up off state and $L_{61}$ that indicates the maximum driving force $FMAX_{ON}$ in FIG. 30, for an upper limit of the lock-up off point variation range $RP_{OFF}$. In addition, the lock-up control unit 264 sets a predetermined accelerator operation amount Acc1, at which the lock-up off state is switched to the lock-up on state, for a lower limit of the lock-up off point variation range $RP_{OFF}$. As the lock-up control unit 264 determines the lock-up off point variation range $RP_{OFF}$, the lock-up control unit 264 shifts the lock-up off point $P_{OFF}$ within the lock-up off point variation range $RP_{OFF}$ so as to reduce the accelerator operation amount Acc as the accelerator depression speed $V_{AC}$ increases. Thus, it is possible to reduce the frequency of switching of the lock-up state owing to the lock-up switching output torque control that is executed before the lock-up on state is switched to the lock-up off state. Hence, it is possible to prevent shifting of the lock-up off point $P_{OFF}$ from influencing the switching from the lock-up off state to the lock-up on state.

(F5) The lock-up switching output torque control adjusts the throttle valve opening degree $\theta_{TH}$. That is, the throttle valve reference characteristic $L_{AS}$ of FIG. 9 is a predetermined relationship between the accelerator operation amount Acc and the throttle valve opening degree $\theta_{TH}$ in one-to-one correspondence with each other, and the lock-up switching output torque control adjusts the throttle valve opening degree $\theta_{TH}$ irrespective of the throttle valve reference characteristic $L_{AS}$ of FIG. 9 so as to reduce the driving force difference $DF_F$ that arises when the lock-up mechanism 31 switches from the lock-up on state to the lock-up off state. Specifically, in the lock-up switching output torque control (torque up control), with reference to the same accelerator operation amount Acc, the actual throttle valve opening degree $\theta_{TH}$ is increased as compared with the throttle valve opening degree $\theta_{TH}$ that is determined on the basis of the throttle valve reference characteristic $L_{AS}$ of FIG. 9. Thus, in the lock-up switching output torque control, it is possible to easily adjust the engine torque $T_E$ so as to vary the driving force $F_{DR}$ by controlling the electronic throttle valve 56.

(F6) Referring to FIG. 30, the lock-up switching output torque control unit 270 determines the start point of the torque up control in such a manner that the accelerator operation amount Acc of the start point is not smaller than the accelerator operation amount Acc1 (FIG. 30) at which the lock-up mechanism 31 switches from the lock-up off state to the lock-up on state. Thus, it is possible to prevent an increase in driving force $F_{DR}$ due to the lock-up switching output torque control from influencing the switching of the lock-up mechanism 31 from the lock-up off state to the lock-up on state.

(F7) The present embodiment and the first embodiment may be implemented in combination with each other. In this case, the advantageous effects (A1) to (A7) of the first embodiment may also be obtained.

The embodiments of the invention are described in detail with reference to the accompanying drawings; however, these embodiments are illustrative. The aspects of the invention may be implemented in various forms with modifications or improvements on the basis of the knowledge of the person skilled in the art.

For example, in the first to sixth embodiments, the engine torque $T_E$ and the gear (gear ratio γ) of the automatic transmission are determined on the basis of the accelerator operation amount Acc, and the like, and, as a result, the driving force $F_{DR}$ is output. Instead, it is applicable that a target driving force is determined on the basis of the accelerator operation amount Acc, and the like, and a target engine torque $T_E$ and a target gear (gear ratio γ) of the automatic transmission are determined on the basis of the target driving force.

In addition, in the first to fifth embodiments, the pre-shift output torque control (torque up control) is executed before the automatic transmission 10 downshifts, and the post-shift output torque control (torque down control) is executed after the downshift. Instead, the shift output torque control may be configured so that either the pre-shift output torque control or the post-shift output torque control is not executed. Note that the shift output torque control is executed when the automatic transmission 10 downshifts, and it is only necessary that the shift output torque control reduces the driving force difference $DF_F$ (illustrated in FIG. 11) due to the downshift in comparison with the case in which the shift output torque control is not executed. The driving force difference $DF_F$ does not have to be zero.

In the first to fifth embodiments, the shift output torque control (torque up control and torque down control) is executed when the automatic transmission 10 downshifts. Instead, the shift output torque control may be executed when the automatic transmission 10 upshifts. When the shift output torque control is executed at the time of upshift, the torque down control is executed before the upshift and the torque up control is executed after the upshift.

In the sixth embodiment, the lock-up switching output torque control is executed by the torque up control before the lock-up mechanism 31 switches from the lock-up on state to the lock-up off state. Instead, the lock-up switching output torque control may be executed by torque down control after the switching of the lock-up state. Note that the lock-up switching output torque control is executed when the lock-up mechanism 31 switches the lock-up state, and it is only necessary that the lock-up switching output torque control reduces the driving force difference $DF_F$ due to the switching of the lock-up state in comparison with the case in which the lock-up switching output torque control is not executed. The driving force difference $DF_F$ does not have to be zero.

In the sixth embodiment, the lock-up switching output torque control is executed when the lock-up mechanism 31 switches from the lock-up on state to the lock-up off state.

Conversely, when the lock-up mechanism 31 switches from the lock-up off state to the lock-up on state, the lock-up switching output torque control may be executed so as to reduce the driving force difference $DF_F$ at that moment.

The first to sixth embodiments may be implemented in combination with each other, for example, by giving priority to the embodiments.

The invention claimed is:

1. A vehicle driving force control device for a vehicle that includes an engine that is varied in output torque by an electronic throttle valve, of which opening and closing are electrically controllable, and an automatic transmission having fixed gear ratios, comprising:
   a controller that executes shift output torque control to control the output torque of the engine so as to reduce a driving force difference, which is a variation width of a driving force due to gear shift of the automatic transmission, wherein
   the controller executes the shift output torque control before gear shift of the automatic transmission, and wherein
   when it is determined that the driving force difference due to the gear shift is larger than or equal to a predetermined driving force difference determination value, the controller executes the shift output torque control again after the gear shift so as to reduce the driving force difference.

2. The vehicle driving force control device according to claim 1, wherein
   where a gear to which the automatic transmission is actually shifted is an nth gear, when a downshift point that indicates an accelerator operation amount at which the automatic transmission downshifts from an (n+1)th gear to the nth gear is compared with an upshift point that indicates an accelerator operation amount at which the automatic transmission upshifts from an (n−1)th gear to the nth gear, and when the upshift point is smaller in accelerator operation amount than the downshift point, the controller initiates the shift output torque control at the nth gear from the downshift point.

3. The vehicle driving force control device according to claim 1, wherein
   where a gear to which the automatic transmission is actually shifted is an nth gear, when a downshift point that indicates an accelerator operation amount at which the automatic transmission downshifts from an (n+1)th gear to the nth gear is compared with an upshift point that indicates an accelerator operation amount at which the automatic transmission upshifts from an (n−1)th gear to the nth gear, and when the upshift point is larger in accelerator operation amount than the downshift point, the controller initiates the shift output torque control at the nth gear from the upshift point.

4. The vehicle driving force control device according to claim 1, wherein
   where a gear to which the automatic transmission is actually shifted is an nth gear, when the automatic transmission downshifts from the nth gear to an (n−2)th gear, the controller initiates the shift output torque control from a downshift point that indicates an accelerator operation amount at which the automatic transmission downshifts from the nth gear to an (n—1)th gear.

5. The vehicle driving force control device according to claim 1, wherein
   where a gear to which the automatic transmission is actually shifted is an nth gear, in the shift output torque control that is executed, after the automatic transmission downshifts from an (n+1)th gear to the nth gear, to reduce the driving force difference due to the downshift, the controller sets a lower limit of the driving force in the shift output torque control to a driving force at the nth gear, at which the automatic transmission upshifts from the nth gear to the (n+1)th gear.

6. The vehicle driving force control device according to claim 1, wherein
   when the accelerator pedal is returned to reduce the accelerator operation amount during the shift output torque control that is executed, after the automatic transmission downshifts, to reduce the driving force difference due to the downshift, the controller sets an upper limit of the driving force in the shift output torque control to a driving force, at the time when the accelerator pedal is returned.

7. The vehicle driving force control device according to claim 1, wherein
   the controller executes the shift output torque control so that, as an accelerator operation amount increases, a driving force variation gradient which is a variation in driving force is equal to or smaller than the variation in accelerator operation amount.

8. The vehicle driving force control device according to claim 1, wherein
   the controller adjusts a throttle valve opening degree which is a degree of opening of the electronic throttle valve.

9. The vehicle driving force control device according to claim 1, further comprising:
   an accelerator depression speed detector that detects an accelerator depression speed which is a rate of change at which the accelerator pedal is depressed, wherein
   the controller changes a downshift point that indicates an accelerator operation amount at which the automatic transmission downshifts on the basis of the detected accelerator depression speed.

10. The vehicle driving force control device according to claim 9, wherein
    where a gear to which the automatic transmission is actually shifted is an nth gear, within a shift point variation range that has an upper limit set to an accelerator operation amount at which, when the automatic transmission downshifts from the nth gear to an (n−1)th gear, a driving force when gear shift is performed at the (n−1)th gear takes a maximum driving force that can be generated at the nth gear, and that has a lower limit set to the larger one of an accelerator operation amount at which the automatic transmission upshifts from the (n−1)th gear to the nth gear or an accelerator operation amount at which the automatic transmission downshifts from the (n+1)th gear to the nth gear, the controller shifts the downshift point so as to reduce the accelerator operation amount as the accelerator depression speed increases.

11. A vehicle driving force control device for a vehicle that includes an engine that is varied in output torque by an electronic throttle valve, of which opening and closing are electrically controllable, and an automatic transmission having fixed gear ratios, comprising:
    a controller that executes shift output torque control to control the output torque of the engine so as to reduce a driving force difference, which is a variation width of a driving force due to gear shift of the automatic transmission, wherein
    the controller does not execute the shift output torque control during a manual range operation in which a gear of the automatic transmission is manually fixed or a high-speed side shiftable gear of the automatic transmission is manually set.

12. A vehicle driving force control device for a vehicle that includes an engine that is varied in output torque by an electronic throttle valve, of which opening and closing are electrically controllable, and an automatic transmission having fixed gear ratios, comprising:
- a controller that executes shift output torque control to control the output torque of the engine so as to reduce a driving force difference, which is a variation width of a driving force due to gear shift of the automatic transmission;
- a torque converter that has a lock-up mechanism provided between the engine and the automatic transmission; and
- a lock-up determination unit that determines whether to be switched to a lock-up on state in which the lock-up mechanism is engaged or to a lock-up off state in which the lock-up mechanism is released, wherein
- in the lock-up on state, when the lock-up determination unit determines to be switched to the lock-up off state, the controller executes lock-up switching output torque control to control an output torque of the engine so as to reduce the driving force difference due to switching from the lock-up on state of the lock-up mechanism to the lock-up off state of the lock-up mechanism, and wherein
- in the lock-up switching output torque control, the controller increases a driving force in the lock-up on state to reach a driving force in the lock-up off state at the time when switching from the lock-up on state to the lock-up off state.

13. The vehicle driving force control device according to claim 12, wherein
- in the lock-up switching output torque control the controller adjusts a throttle valve opening degree which is a degree of opening of the electronic throttle valve.

14. The vehicle driving force control device according to claim 12, further comprising:
- an accelerator depression speed detector that detects an accelerator depression speed which is a rate of change at which the accelerator pedal is depressed, wherein
- the controller changes a lock-up off point that indicates an accelerator operation amount at which the lock-up on state is switched to the lock-up off state on the basis of the detected accelerator depression speed.

15. The vehicle driving force control device according to claim 14, wherein
- within a lock-up off point variation range that has an upper limit set to an accelerator operation amount at which, when the lock-up on state is switched to the lock-up off state, a driving force in the lock-up off state at the time of the switching takes a maximum driving force that can be generated in the lock-up on state, and that has a lower limit set to a predetermined accelerator operation amount at which the lock-up off state is switched to the lock-up on state, the controller shifts the lock-up off point so as to reduce the accelerator operation amount as the accelerator depression speed increases.

\* \* \* \* \*